US012785344B2

(12) United States Patent
Ito et al.

(10) Patent No.: US 12,785,344 B2
(45) Date of Patent: Nov. 3, 2026

(54) RELAY DEVICE AND CONNECTOR ASSEMBLY

(71) Applicant: Yamaichi Electronics Co., Ltd., Tokyo (JP)

(72) Inventors: Toshiyasu Ito, Tokyo (JP); Toshitaka Kuroda, Tokyo (JP); Masaaki Saito, Tokyo (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 399 days.

(21) Appl. No.: 18/375,038

(22) Filed: Sep. 29, 2023

(65) Prior Publication Data

US 2025/0112428 A1 Apr. 3, 2025

(51) Int. Cl.

| | |
|---|---|
| ***H01R 31/06*** | (2006.01) |
| ***H01R 12/71*** | (2011.01) |
| ***H01R 13/04*** | (2006.01) |
| ***H01R 13/10*** | (2006.01) |
| ***H01R 13/506*** | (2006.01) |
| ***H01R 13/6461*** | (2011.01) |

(52) U.S. Cl.

CPC ........... *H01R 31/06* (2013.01); *H01R 12/716* (2013.01); *H01R 13/04* (2013.01); *H01R 13/10* (2013.01); *H01R 13/506* (2013.01); *H01R 13/6461* (2013.01)

(58) Field of Classification Search

CPC ...... H01R 31/06; H01R 12/716; H01R 13/04; H01R 13/10; H01R 13/506; H01R 13/6461; H01R 12/721; H01R 12/58; H01R 12/53; H01R 12/73; H01R 12/75

See application file for complete search history.

(56) References Cited

U.S. PATENT DOCUMENTS

| | | | |
|---|---|---|---|
| 7,896,659 | B1 | 3/2011 | Westman et al. |
| 10,114,182 | B2 | 10/2018 | Zbinden et al. |
| 11,500,168 | B2 | 11/2022 | Zbinden et al. |
| 11,646,513 | B2 | 5/2023 | Huang et al. |
| 2016/0218455 | A1 | 7/2016 | Sayre et al. |
| 2023/0063499 | A1 | 3/2023 | Huang et al. |

FOREIGN PATENT DOCUMENTS

| | | | | | |
|---|---|---|---|---|---|
| JP | 11067392 | A | * | 3/1999 | |
| TW | 202437608 | A | * | 9/2024 | ........... H01R 13/502 |
| WO | WO-2017192146 | A1 | * | 11/2017 | ........... H05K 5/0069 |

OTHER PUBLICATIONS

Wantanabe JP-11067392A (Year: 1997).*

* cited by examiner

*Primary Examiner* — Travis S Chambers

(74) *Attorney, Agent, or Firm* — Muncy, Geissler, Olds & Lowe, P.C.

(57) ABSTRACT

Provided are a relay device and a connector assembly that can electrically connect a connector and an external circuit board to each other without using terminals bent at a right angle. A relay device configured to electrically connect a plurality of contact pins to a plurality of cables and a host board includes a paddle board and a connection part, the paddle board electrically connects some of the plurality of contact pins to the plurality of cables, the connection part has a plurality of press-fit pins, and the plurality of press-fit pins electrically connect the paddle board to the host board.

18 Claims, 38 Drawing Sheets

RELAY DEVICE AND CONNECTOR ASSEMBLY

BACKGROUND

1. Technical Field

The present invention relates to a relay device and a connector assembly.

2. Description of Related Art

Optical modules for converting electrical signals into optical signals and vice versa (also referred to as optical transceivers) may be, for example, electrically connected to a printed wiring board using a connector and thereby electrically connected to an application specific integrated circuit (ASIC) mounted on the printed wiring board via a circuit (patterns) formed in the printed wiring board.

However, when transmitted signals are high-speed signals (for example, high-speed transmission exceeding 100 Gbps), signals transmitted via patterns may deteriorate. In particular, when a long distance from a connector to an integrated circuit requires connection using patterns for the long distance, transmitted signals tend to easily deteriorate.

Accordingly, one conceivable form is to connect a connector to an ASIC via a cable (jumper cable) instead of patterns formed in a printed wiring board. Specifically, this is a form in which a second connector connected to the ASIC via patterns or the like is provided near the ASIC, and a connector having an optical module inserted and the second connector provided near the ASIC are connected to each other via the cable.

U.S. Pat. No. 11,646,513 discloses a connector whose terminals for signals and terminals for ground are connected to cables via an adapting board and whose terminals for power supply are directly connected to an external circuit board.

While the configuration disclosed in U.S. Pat. No. 11,646,513 is to connect some of the terminals of the connector to the adapting board and connect some other terminals of the connector to the external circuit board, the terminals connected to the adapting board and the terminals connected to the external circuit board significantly differ in shape from each other. Specifically, the terminals connected to the external circuit board are configured to project out of an insulating body by being bent at a right angle.

Thus, in the configuration disclosed in U.S. Pat. No. 11,646,513, terminals bent at a right angle and terminals not bent at a right angle are mixed. This causes concerns about deterioration in ease of assembly, an increased number of components, and the like, which leads to a major problem of reduced productivity and increased costs.

Accordingly, the present invention intends to provide a relay device and a connector assembly that can electrically connect a connector and an external circuit board to each other without using a terminal bent at a right angle.

BRIEF SUMMARY

To achieve the above object, the relay device and the connector assembly of the present invention employ the following solutions.

A relay device according to the first aspect of the present invention is a relay device configured to electrically connect a plurality of external terminals to a plurality of external cables and an external circuit board, the relay device includes: an adapting board; and a connection part, the adapting board electrically connects some of the plurality of external terminals to the plurality of external cables, the connection part has a plurality of connection terminals, and the plurality of connection terminals electrically connect the adapting board to the external circuit board.

Since the connection part has a plurality of connection terminals and the plurality of connection terminals electrically connect the adapting board to the external circuit board, it is possible to electrically connect the external terminals to the external circuit board via the relay device (the adapting board and the connection terminals of the connection part) without bending the external terminals toward the external circuit board.

Further, since no clearance used for passing the bent external terminals therethrough is required to be provided on the adapting board, the flexibility in routing of patterns in the adapting board can be improved. If the adapting board has a clearance, patterns would be required to be routed avoiding the clearance, which would reduce the flexibility in routing.

In the relay device according to the second aspect of the present invention dependent on the first aspect, the adapting board has a plurality of first terminal-adapting electrodes, a plurality of second terminal-adapting electrodes, a plurality of first cable-adapting electrodes, and a plurality of second cable-adapting electrodes and a plurality of connection terminal-adapting electrodes, the plurality of first terminal-adapting electrodes are electrodes for the plurality of external terminals to be connected and are provided on a first face of the adapting board, the plurality of second terminal-adapting electrodes are electrodes for the plurality of external terminals to be connected and are provided on a second face of the adapting board, the second face being located opposite to the first face, the plurality of first cable-adapting electrodes are electrodes for the plurality of external cables to be connected and are provided on the first face, the plurality of second cable-adapting electrodes are electrodes for the plurality of external cables to be connected and are provided on the second face, the plurality of connection terminal-adapting electrodes are electrodes to which the plurality of connection terminals of the connection part are in connection, some of the plurality of first terminal-adapting electrodes are electrically connected to the plurality of first cable-adapting electrodes via a circuit formed in the adapting board, some of the plurality of second terminal-adapting electrodes are electrically connected to the plurality of second cable-adapting electrodes via the circuit, the plurality of first terminal-adapting electrodes which are not electrically connected to the first cable-adapting electrodes are electrically connected to the plurality of connection terminal-adapting electrodes via the circuit, and the plurality of second terminal-adapting electrodes which are not electrically connected to the second cable-adapting electrodes are electrically connected to the plurality of connection terminal-adapting electrodes via the circuit.

The plurality of first terminal-adapting electrodes are electrodes for the plurality of external terminals to be connected and are provided on a first face of the adapting board, the plurality of second terminal-adapting electrodes are electrodes for the plurality of external terminals to be connected and are provided on a second face of the adapting board, the second face being located opposite to the first face, the plurality of first cable-adapting electrodes are electrodes for the plurality of external cables to be connected and are provided on the first face, and the plurality of second cable-adapting electrodes are electrodes for the plurality of external cables to be connected and are provided on the second face. It is thus possible to connect the external terminals and the external cables to both the faces (the first face and the second face) of the adapting board.

Further, the plurality of first terminal-adapting electrodes which are not electrically connected to the first cable-adapting electrodes are electrically connected to the plurality of connection terminal-adapting electrodes via the circuit formed in the adapting board, and the plurality of second terminal-adapting electrodes which are not electrically connected to the second cable-adapting electrodes are electrically connected to the plurality of connection terminal-adapting electrodes via the circuit formed in the adapting board. It is thus possible to electrically connect some of the external terminals connected to both the faces of the adapting board to the external circuit board.

In the relay device according to the third aspect of the present invention dependent on the second aspect, the plurality of first terminal-adapting electrodes which are electrically connected to the connection terminal-adapting electrodes are electrodes for signals other than high-speed signals input from the plurality of external terminals, and/or the plurality of second terminal-adapting electrodes which are electrically connected to the connection terminal-adapting electrodes are electrodes for signals other than high-speed signals input from the plurality of external terminals.

The plurality of first terminal-adapting electrodes which are electrically connected to the connection terminal-adapting electrodes are electrodes for signals other than high-speed signals input from the plurality of external terminals, and thus the high-speed signals can be transmitted from the external terminals to the external cables via the adapting board, and the signals (low-speed signals, a power supply, a ground) other than the high-speed signals can be transmitted to the external circuit board via the adapting board and the connection terminals of the connection part.

In the relay device according to the fourth aspect of the present invention dependent on the second aspect or the third aspect, the plurality of first terminal-adapting electrodes and the plurality of second terminal-adapting electrodes are aligned along a first direction, and the plurality of connection terminal-adapting electrodes are arranged at the center portion in the first direction.

Since the plurality of connection terminal-adapting electrodes are arranged at the center portion in the first direction, it is possible to connect the external terminals to the connection terminal-adapting electrodes by using the shortest distance patterns when external terminals for signals other than high-speed signals are present at the center portion due to the relationship with an optical module, for example.

In the relay device according to the fifth aspect of the present invention dependent on any one of the second aspect to the fourth aspect, the plurality of first terminal-adapting electrodes are aligned along a first direction on the first face, the plurality of first cable-adapting electrodes are aligned, on the first face, along the first direction and apart from the plurality of first terminal-adapting electrodes in a second direction orthogonal to the first direction, the plurality of second terminal-adapting electrodes are aligned on the opposite side to the plurality of first terminal-adapting electrodes, the plurality of second cable-adapting electrodes are aligned on the opposite side to the plurality of first cable-adapting electrodes, and the plurality of first cable-adapting electrodes and the plurality of second cable-adapting electrodes are provided, in the second direction, at positions closer to the plurality of first terminal-adapting electrodes and the plurality of second terminal-adapting electrodes than to the connection terminal-adapting electrodes or at approximately the same positions as the plurality of connection terminal-adapting electrodes.

The plurality of first cable-adapting electrodes and the plurality of second cable-adapting electrodes are provided, in the second direction, at positions closer to the plurality of first terminal-adapting electrodes and the plurality of second terminal-adapting electrodes than to the connection terminal-adapting electrodes or at approximately the same positions as the plurality of connection terminal-adapting electrodes, and this can relatively reduce the distance from the first terminal-adapting electrodes to the first cable-adapting electrodes and the distance from the second terminal-adapting electrodes to the second cable-adapting electrodes. Thus, the length of each of patterns connecting the first terminal-adapting electrodes and the first cable-adapting electrodes to each other and the length of each of patterns connecting the second terminal-adapting electrodes and the second cable-adapting electrodes to each other can be reduced. Accordingly, since high-speed signal lines can be connected over a short distance, transmission characteristics can be improved.

A connector assembly according to the sixth aspect of the present invention includes: the relay device according to any one of the first aspect to the fifth aspect; a connector having the plurality of external terminals connected to the relay device and a housing that houses the plurality of external terminals; and the plurality of external cables connected to the relay device.

A relay device according to the seventh aspect of the present invention is a relay device configured to electrically connect a plurality of external terminals to a plurality of external cables and an external circuit board, the relay device includes: a first adapting board; a second adapting board; a first connection part; and a second connection part, the first adapting board electrically connects some of the plurality of external terminals to the plurality of external cables, the second adapting board electrically connects some of the plurality of external terminals to the plurality of external cables, the first connection part has a plurality of first connection terminals, the plurality of first connection terminals electrically connect the first adapting board to the external circuit board, the second connection part has a plurality of second connection terminals, and the plurality of second connection terminals electrically connect the second adapting board to the external circuit board.

Since the first connection part has a plurality of first connection terminals, the plurality of first connection terminals electrically connect the first adapting board to the external circuit board, the second connection part has a plurality of second connection terminals, and the plurality of second connection terminals electrically connect the second adapting board to the external circuit board, it is possible to electrically connect the external terminals to the external circuit board via the relay device (the adapting board and the connection terminals of the connection part) without bending the external terminals toward the external circuit board.

In the relay device according to the eighth aspect of the present invention dependent on the seventh aspect, the first connection part has a first housing, the first housing houses the plurality of first connection terminals, the second connection part has a second housing, and the second housing houses the plurality of second connection terminals.

Since the first connection part has a first housing, the first housing houses the plurality of first connection terminals, the second connection part has a second housing, and the second housing houses the plurality of second connection terminals, the possibility of a foreign material attaching to the connection terminals can be reduced.

In the relay device according to the ninth aspect of the present invention dependent on the eighth aspect, the first connection terminals are press-fit pins, respectively, each of the press-fit pins extending from the first adapting board toward the external circuit board, and the second connection terminals are press-fit pins, respectively, each of the press-fit pins extending from the second adapting board toward the external circuit board.

Each of the plurality of first connection terminals is a press-fit pin extending from the first adapting board toward the external circuit board, and each of the plurality of second connection terminals is a press-fit pin extending from the second adapting board toward the external circuit board. It is thus possible to connect the connection terminals to the first adapting board and the second adapting board and to the external circuit board in a simplified manner.

In the relay device according to the tenth aspect of the present invention dependent on the ninth aspect, the first adapting board is arranged on the external circuit board, the second adapting board is arranged on the first adapting board, the first adapting board is provided with a plurality of holes through which the plurality of press-fit pins as the plurality of second connection terminals are individually inserted, and the second housing is arranged between the first adapting board and the second adapting board and houses portions of the press-fit pins as the second connection terminals, the portions being present between the first adapting board and the second adapting board.

Since the first adapting board is provided with a plurality of holes through which the plurality of press-fit pins as the plurality of second connection terminals are individually inserted, it is possible to allow the press-fit pins as the second connection terminals to reach the external circuit board while minimizing the area of the first adapting board to be removed.

Further, the second housing is arranged between the first adapting board and the second adapting board and houses portions, which are present between the first adapting board and the second adapting board, of the press-fit pins as the second connection terminals, and thus the structure is simplified and ease of assembly can be improved compared to a case where another portion of the press-fit pins is housed in another housing. Further, since the second adapting board can be supported by the second housing, occurrence of deformation (for example, deflection) of the second adapting board can be reduced.

In the relay device according to the eleventh aspect of the present invention dependent on the tenth aspect, the second connection part has a third housing, and the third housing is arranged between the external circuit board and the first adapting board and houses portions of the press-fit pins as the second connection terminals, the portions being present between the external circuit board and the first adapting board.

The third housing is arranged between the external circuit board and the first adapting board and houses portions, which are present between the external circuit board and the first adapting board, of the press-fit pins as the second connection terminals, and thus the possibility of a foreign material attaching to a part of each press-fit pin (a portion present between the external circuit board and the first adapting board) can be reduced.

In the relay device according to the twelfth aspect of the present invention dependent on the ninth aspect, the first adapting board is arranged on the external circuit board, the second adapting board is arranged on the first adapting board, the first adapting board is provided with an opening through which the second housing is inserted, and the second housing is arranged between the external circuit board and the second adapting board and houses the press-fit pins as the second connection terminals present between the external circuit board and the second adapting board.

Since the first adapting board is provided with an opening through which the second housing is inserted, this enables the second housing to reach the external circuit board.

Further, since the second housing is arranged between the external circuit board and the second adapting board and houses the press-fit pins as the second connection terminals present between the external circuit board and the second adapting board, the possibility of a foreign material attaching to the entire press-fit pin can be reduced.

Further, since the second housing is not divided in a region between the external circuit board and the second adapting board, the structure can be simplified, and ease of assembly can be improved.

In the relay device according to the thirteenth aspect of the present invention dependent on the tenth aspect or the eleventh aspect, the plurality of holes are arranged at positions farther from the plurality of external terminals than the press-fit pins as the plurality of first connection terminals.

Since the plurality of holes are arranged at positions farther from the plurality of external terminals than the press-fit pins as the plurality of first connection terminals, no hole is formed between the external terminals and the press-fit pins as the first connection terminals in the first adapting board. This can improve flexibility in routing of patterns formed in the region between the external terminals and the press-fit pins as the first connection terminals in the first adapting board.

In the relay device according to the fourteenth aspect of the present invention dependent on the twelfth aspect, the opening is arranged at a position farther from the plurality of external terminals than the press-fit pins as the plurality of first connection terminals.

Since the opening is arranged at a position farther from the plurality of external terminals than the press-fit pins as the plurality of first connection terminals, no opening is formed between the external terminals and the press-fit pins as the first connection terminals in the first adapting board. This can improve flexibility in routing of patterns formed in the region between the external terminals and the press-fit pins as the first connection terminals in the first adapting board.

In the relay device according to the fifteenth aspect of the present invention dependent on any one of the seventh aspect to the fourteenth aspect, the first adapting board has a plurality of first-first terminal-adapting electrodes, a plurality of first-second terminal-adapting electrodes, a plurality of first-first cable-adapting electrodes, and a plurality of first-second cable-adapting electrodes and also a plurality of first connection terminal-adapting electrodes, and the second adapting board has a plurality of second-first terminal-adapting electrodes, a plurality of second-second terminal-adapting electrodes, a plurality of second-first cable-adapting electrodes, and a plurality of second-second cable-adapting electrodes and also a plurality of second connection terminal-adapting electrodes. The plurality of first-first terminal-adapting electrodes are electrodes for the plurality of external terminals to be connected and are provided on a first-first face of the first adapting board, the plurality of first-second terminal-adapting electrodes are electrodes for the plurality of external terminals to be connected and are provided on a first-second face of the first adapting board, the first-second face being located opposite to the first-first face, the plurality of first-first cable-adapting electrodes are electrodes for the plurality of external cables to be connected and are provided on the first-first face, the plurality of first-second cable-adapting electrodes are electrodes for the plurality of external cables to be connected and are provided on the first-second face, the plurality of first connection terminal-adapting electrodes are electrodes to which the plurality of first connection terminals of the first connection part are in connection, the plurality of second-first terminal-adapting electrodes are electrodes for the plurality of external terminals to be connected and are provided on a second-first face of the second adapting board, the plurality of second-second terminal-adapting electrodes are electrodes for the plurality of external terminals to be connected and are provided on a second-second face of the second adapting board, the second-second face being located opposite to the second-first face, the plurality of second-first cable-adapting electrodes are electrodes for the plurality of external cables to be connected and are provided on the second-first face, the plurality of second-second cable-adapting electrodes are electrodes for the plurality of external cables to be connected and are provided on the second-second face, the plurality of second connection terminal-adapting electrodes are electrodes to which the plurality of second connection terminals of the second connection part are in connection, some of the plurality of first-first terminal-adapting electrodes are connected to the plurality of first-first cable-adapting electrodes via a circuit formed in the first adapting board, some of the plurality of first-second terminal-adapting electrodes are connected to the plurality of first-second cable-adapting electrodes via the circuit, the plurality of first-first terminal-adapting electrodes which are not connected to the first-first cable-adapting electrodes are connected to the plurality of first connection terminal-adapting electrodes via the circuit, the plurality of first-second terminal-adapting electrodes which are not connected to the first-second cable-adapting electrodes are connected to the plurality of first connection terminal-adapting electrodes via the circuit, some of the plurality of second-first terminal-adapting electrodes are connected to the plurality of second-first cable-adapting electrodes via a circuit formed in the second adapting board, some of the plurality of second-second terminal-adapting electrodes are connected to the plurality of second-second cable-adapting electrodes via the circuit, the plurality of second-first terminal-adapting electrodes which are not connected to the second-first cable-adapting electrodes are connected to the plurality of second connection terminal-adapting electrodes via the circuit, and the plurality of second-second terminal-adapting electrodes which are not connected to the second-second cable-adapting electrodes are connected to the plurality of second connection terminal-adapting electrodes via the circuit.

The plurality of first-first terminal-adapting electrodes are electrodes for the plurality of external terminals to be connected and are provided on a first-first face of the first adapting board, the plurality of first-second terminal-adapting electrodes are electrodes for the plurality of external terminals to be connected and are provided on a first-second face of the first adapting board, the first-second face being located opposite to the first-first face, the plurality of first-first cable-adapting electrodes are electrodes for the plurality of external cables to be connected and are provided on the first-first face, and the plurality of first-second cable-adapting electrodes are electrodes for the plurality of external cables to be connected and are provided on the first-second face. It is thus possible to connect the external terminals and the external cables to both the faces (the first-first face and the first-second face) of the first adapting board.

Further, similarly, the plurality of second-first terminal-adapting electrodes are electrodes for the plurality of external terminals to be connected and are provided on a second-first face of the second adapting board, the plurality of second-second terminal-adapting electrodes are electrodes for the plurality of external terminals to be connected and are provided on a second-second face of the second adapting board, the second-second face being located opposite to the second-first face, the plurality of second-first cable-adapting electrodes are electrodes for the plurality of external cables to be connected and are provided on the second-first face, and the plurality of second-second cable-adapting electrodes are electrodes for the plurality of external cables to be connected and are provided on the second-second face. It is thus possible to connect the external terminals and the external cables to both the faces (the second-first face and the second-second face) of the second adapting board.

Further, the plurality of first-first terminal-adapting electrodes which are not electrically connected to the first-first cable-adapting electrodes are electrically connected to the plurality of first connection terminal-adapting electrodes via the circuit formed in the adapting board, and the plurality of first-second terminal-adapting electrodes which are not electrically connected to the first-second cable-adapting electrodes are electrically connected to the plurality of first connection terminal-adapting electrodes via the circuit formed in the adapting board. It is thus possible to electrically connect some of the external terminals connected to both the faces of the first adapting board to the external circuit board.

Further, the plurality of second-first terminal-adapting electrodes which are not electrically connected to the second-first cable-adapting electrodes are electrically connected to the plurality of second connection terminal-adapting electrodes via the circuit formed in the adapting board, and the plurality of second-second terminal-adapting electrodes which are not electrically connected to the second-second cable-adapting electrodes are electrically connected to the plurality of second connection terminal-adapting electrodes via the circuit formed in the adapting board. It is thus possible to electrically connect some of the external terminals connected to both the faces of the second adapting board to the external circuit board.

In the relay device according to the sixteenth aspect of the present invention dependent on the fifteenth aspect, the plurality of first-first terminal-adapting electrodes are aligned along a first direction on the first-first face, the plurality of first-first cable-adapting electrodes are aligned, on the first-first face, along the first direction and apart from the plurality of first-first terminal-adapting electrodes in a second direction orthogonal to the first direction, the plurality of first-second terminal-adapting electrodes are aligned on the opposite side to the first-first terminal-adapting electrodes, the plurality of first-second cable-adapting electrodes are aligned on the opposite side to the first-first cable-adapting electrodes, the plurality of first-first cable-adapting electrodes and the plurality of first-second cable-adapting electrodes are provided, in the second direction, at positions closer to the plurality of first-first terminal-adapting electrodes and the plurality of first-second terminal-adapting electrodes than to the first connection terminal-adapting electrodes or at approximately the same positions as the plurality of first connection terminal-adapting electrodes, the plurality of second-first terminal-adapting electrodes are aligned along the first direction on the second-first face, the plurality of second-first cable-adapting electrodes are aligned, on the second-first face, along the first direction and apart from the plurality of second-first terminal-adapting electrodes in the second direction, the plurality of second-second terminal-adapting electrodes are aligned on the opposite side to the plurality of second-first terminal-adapting electrodes, the plurality of second-second cable-adapting electrodes are aligned on the opposite side to the plurality of second-first cable-adapting electrodes, and the plurality of second-first cable-adapting electrodes and the plurality of second-second cable-adapting electrodes are provided, in the second direction, at positions closer to the plurality of second-first terminal-adapting electrodes and the plurality of second-second terminal-adapting electrodes than to the second connection terminal-adapting electrodes or at approximately the same positions as the plurality of second connection terminal-adapting electrodes.

The plurality of first-first cable-adapting electrodes and the plurality of first-second cable-adapting electrodes are provided, in the second direction, at positions closer to the plurality of first-first terminal-adapting electrodes and the plurality of first-second terminal-adapting electrodes than to the first connection terminal-adapting electrodes or at approximately the same positions as the plurality of first connection terminal-adapting electrodes, and this can relatively reduce the distance from the first-first terminal-adapting electrodes to the first-first cable-adapting electrodes and the distance from the first-second terminal-adapting electrodes to the first-second cable-adapting electrodes. Thus, the length of each of patterns connecting the first-first terminal-adapting electrodes and the first-first cable-adapting electrodes to each other and the length of each of patterns connecting the first-second terminal-adapting electrodes and the first-second cable-adapting electrodes to each other can be reduced. Accordingly, since high-speed signal lines can be connected over a short distance, transmission characteristics can be improved.

Further, similarly, the length of each of patterns connecting the second-first terminal-adapting electrodes and the second-first cable-adapting electrodes to each other and the length of each of patterns connecting the second-second terminal-adapting electrodes and the second-second cable-adapting electrodes to each other can be reduced. Accordingly, since high-speed signal lines can be connected over a short distance, transmission characteristics can be improved.

Further, since the first adapting board and the second adapting board can be reduced in size, the first adapting board and the second adapting board and thus the connector assembly can be reduced in cost.

Further, since the reduction in size of the first adapting board and the second adapting board enables the reduction in size of the connector assembly, this increases the freely available space on the external circuit board.

A connector assembly according to the seventeenth aspect of the present invention includes: the relay device according to any one of the seventh aspect to the sixteenth aspect; a connector having the plurality of external terminals connected to the relay device and a housing that houses the plurality of external terminals; and the plurality of external cables connected to the relay device.

A connector assembly according to the eighteenth aspect of the present invention is a connector assembly electrically connected to a plurality of external cables, the connector assembly includes: a first adapting board; a second adapting board; and a connector having a plurality of terminals and a housing that houses the plurality of terminals, the plurality of terminals are connected to the first adapting board or the second adapting board, the first adapting board electrically connects some of the plurality of terminals to the plurality of external cables, the second adapting board electrically connects some of the plurality of terminals to the plurality of external cables, the plurality of terminals form a first terminal line on which some of the plurality of terminals are aligned, a second terminal line on which some of the plurality of terminals are aligned, a third terminal line on which some of the plurality of terminals are aligned, and a fourth terminal line on which some of the plurality of terminals are aligned, the first adapting board and the second adapting board are arranged substantially parallel to each other, the first terminal line is connected to a first-first face of the first adapting board, the second terminal line is connected to a first-second face of the first adapting board, the first-second face being located opposite to the first-first face, the third terminal line is connected to a second-first face of the second adapting board, and the fourth terminal line is connected to a second-second face of the second adapting board, the second-second face being located opposite to the second-first face.

The first adapting board and the second adapting board are arranged substantially parallel to each other, the first terminal line is connected to the first-first face of the first adapting board, the second terminal line is connected to the first-second face of the first adapting board located opposite to the first-first face, the third terminal line is connected to the second-first face of the second adapting board, and the fourth terminal line is connected to the second-second face of the second adapting board located opposite to the second-first face. Thus, only a single set of terminal lines is required to be connected to each of the first-first face to the second-second face, and the impact of crosstalk can be reduced compared to a case where two sets of terminal lines are connected to a single face, for example. If two sets of terminal lines are connected to a single face, the two terminal lines would be close to each other in the height direction, which would result in larger crosstalk.

DETAILED DESCRIPTION

Relay devices and connector assemblies according to a first embodiment and a second embodiment of the present invention will be described below with reference to the drawings.

Note that an insertion-extraction direction Die, a depth direction Dd, a width direction Dw, and a height direction Dh used in the following description are intended to assist in understanding the description and not intended to limit actual postures or positions.

First Embodiment

The relay device and the connector assembly according to the first embodiment of the present invention will be described below with reference to the drawings.

<<Overview>>

Figure 1:
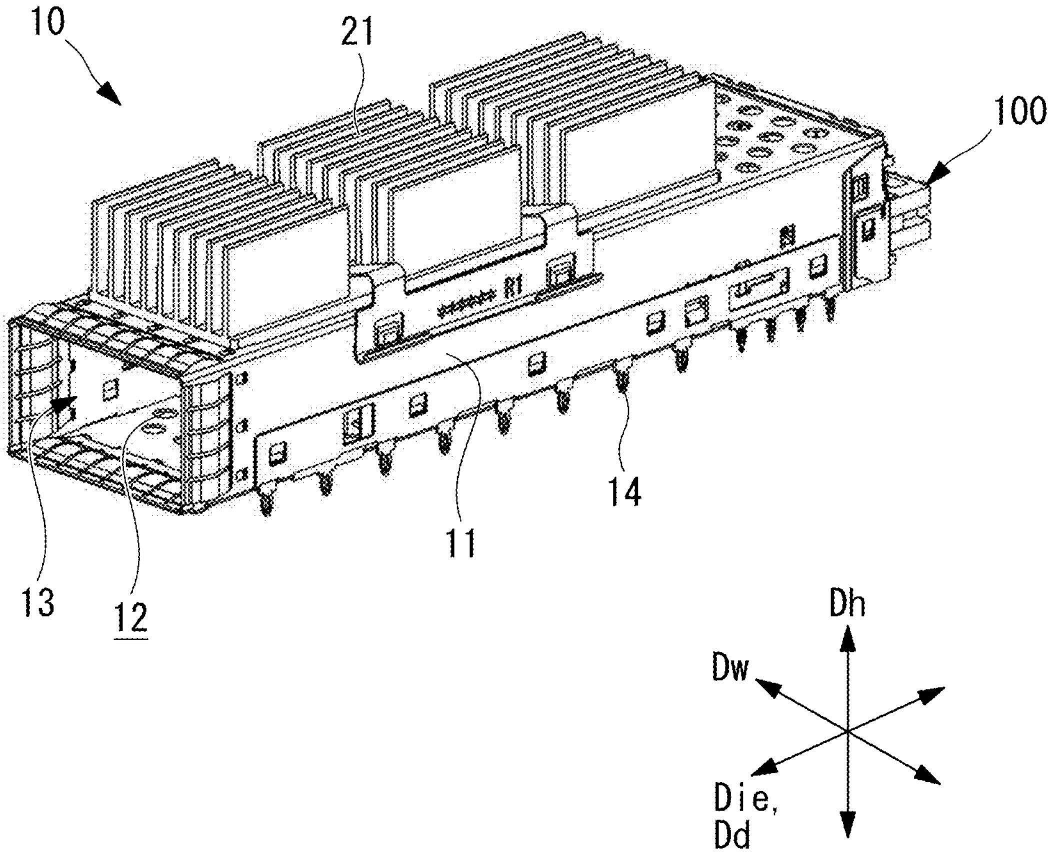
FIG. 1 is a perspective view of a receptacle assembly including a connector assembly having a relay device according to a first embodiment of the present invention when viewed from above.
Figure 2:
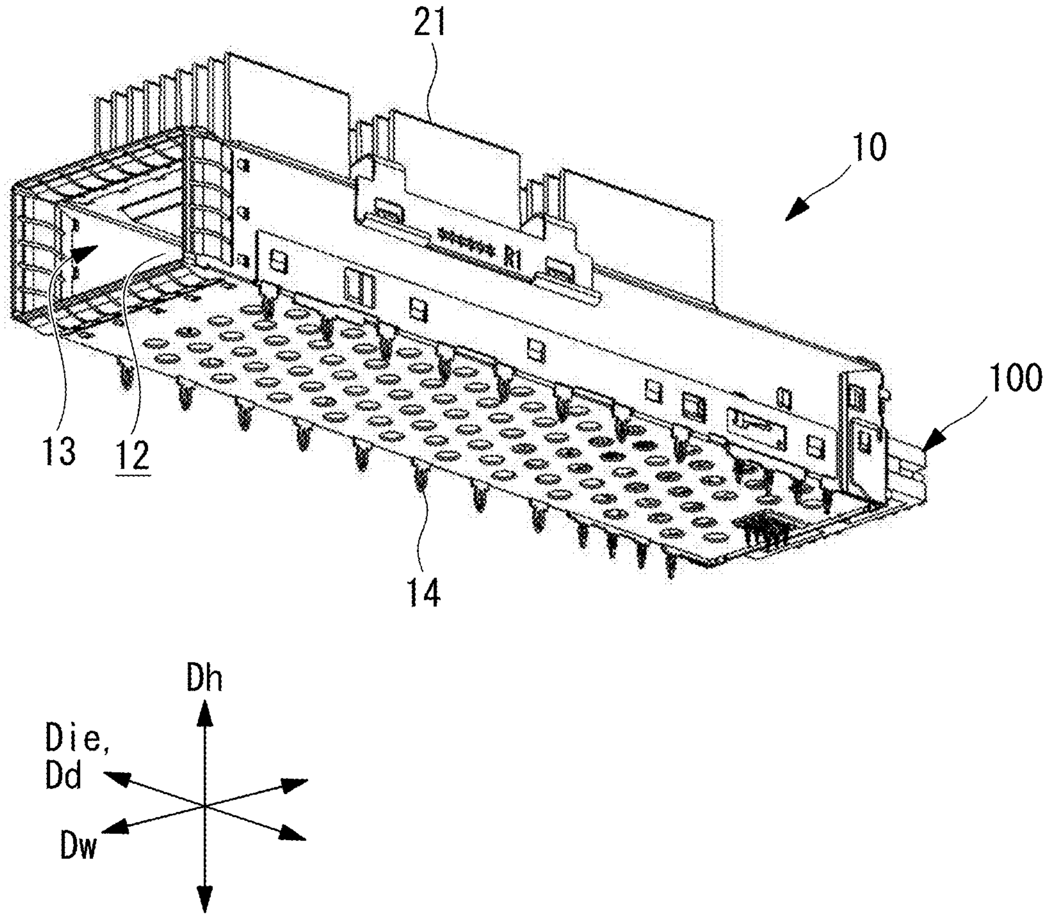
FIG. 2 is a perspective view of the receptacle assembly including the connector assembly having the relay device according to the first embodiment of the present invention when viewed from below.

As illustrated in FIG. 1 and FIG. 2, a connector assembly 100 having a relay device 120 is one of devices included in a receptacle assembly 10.

The receptacle assembly 10 is an apparatus for electrically connecting an optical module compatible to a form factor such as OSFP to a host board 51 (external circuit board) and cables 181 (external cables).

The receptacle assembly 10 has a cage 11, a heat sink 21, and a connector assembly 100.

The cage 11 is a rectangular cylindrical casing defining a slot 12 as a space into which an optical module is inserted.

A slot opening 13 is formed in the front part of the cage 11. The optical module is inserted from the slot opening 13.

The connector assembly 100 is attached to the rear part of the cage 11. In this state, a portion of the connector assembly 100 is arranged in the slot 12, and the remaining portion of the connector assembly 100 is arranged outside the slot 12 (outside the cage 11).

The bottom face of the cage 11 is provided with a plurality of fixing pins 14 projecting along the height direction Dh toward the host board 51. When the fixing pins 14 have been inserted into the host board 51, the cage 11 is fixed to the host board 51.

An optical module is inserted into the slot 12 via the slot opening 13 and connected to the connector assembly 100 present in the rear part. Further, the optical module inserted in the slot 12 is fixed to the cage 11.

In this state, the heat sink 21 attached to the cage 11 is configured to be in thermal contact with an optical module inserted in the slot 12.

Note that, when the direction in which an optical module is inserted/extracted is defined as the insertion-extraction direction Die, the depth direction Dd (second direction) matches the insertion-extraction direction Die, the height direction Dh is orthogonal to the depth direction Dd, and the width direction Dw (first direction) is orthogonal to the depth direction Dd and the height direction Dh.

Further, the out-of-plane direction of the host board 51 matches the height direction Dh. Thus, the host board 51 extends in the depth direction Dd and the width direction Dw and has a thickness in the height direction Dh. The same as the host board 51 applies to paddle boards 130, 230, and 250 described later.

<<Relay Device and Connector Assembly>>

The connector assembly 100 is a device for electrically connecting an optical module to the host board 51 and the cables 181.

As illustrated in FIG. 3 to FIG. 7, the connector assembly 100 has a connector 110 and the relay device 120.

<<<Connector>>>

The connector 110 is an element for electrically connecting a circuit board of an optical module (hereafter, referred to as "module board") to the relay device 120.

Figure 7:
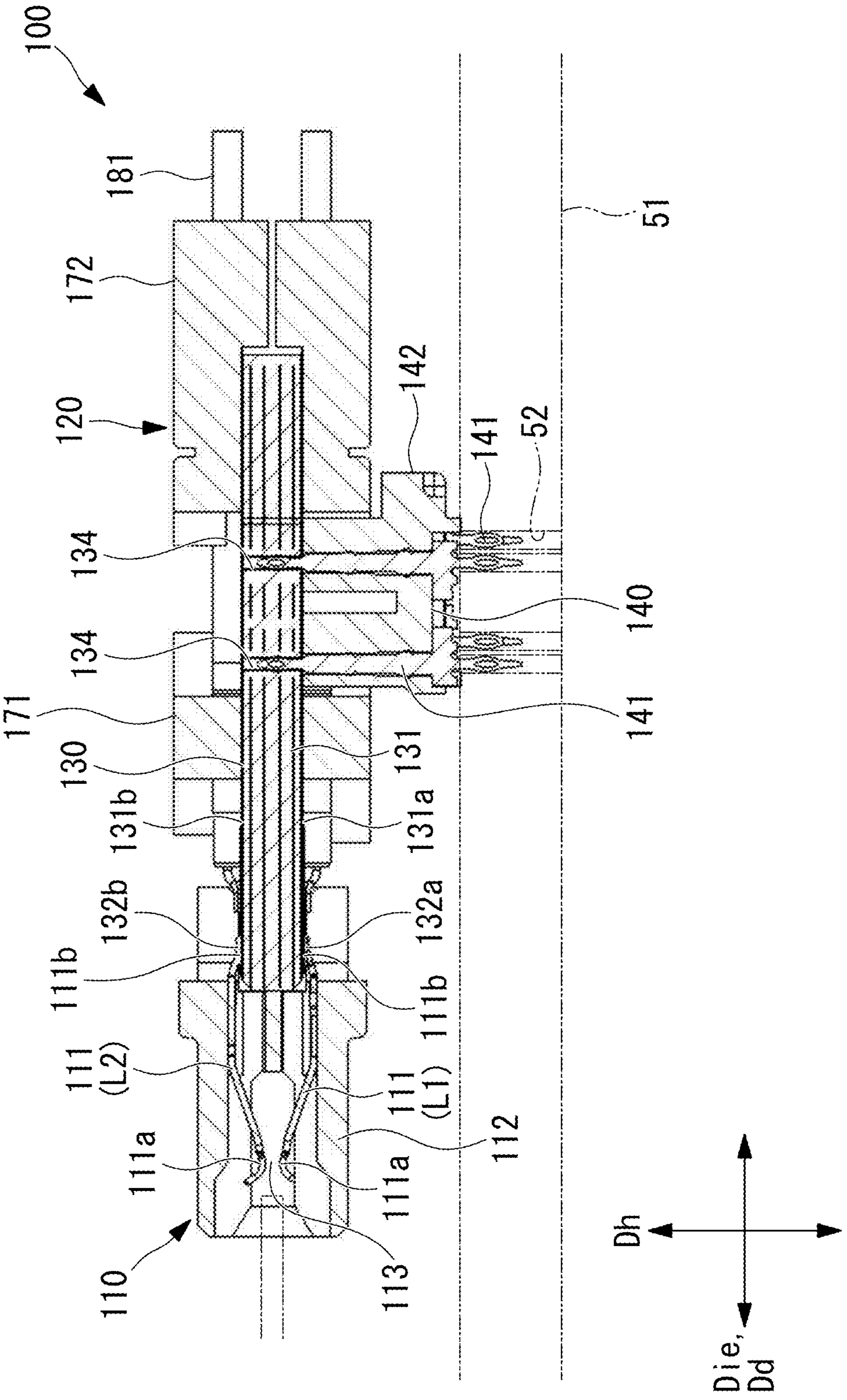
FIG. 7 is a sectional view of the connector assembly according to the first embodiment of the present invention.
Figure 8:
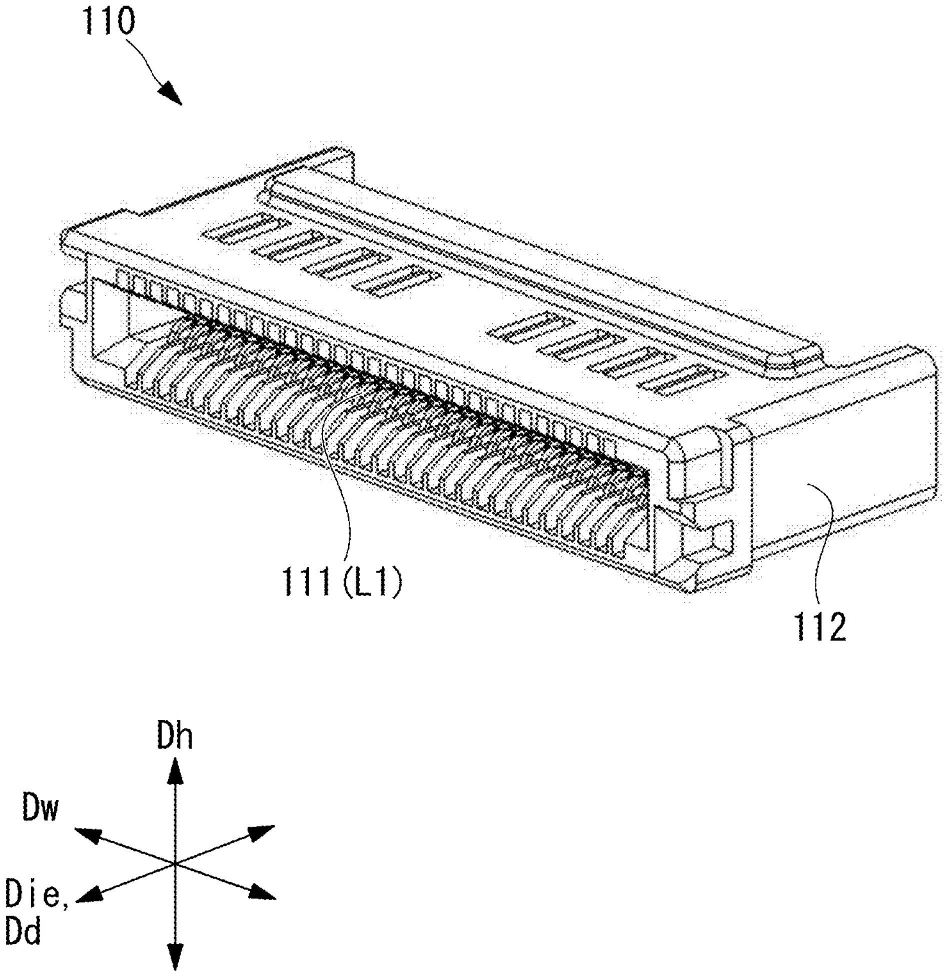
FIG. 8 is a perspective view of a connector of the connector assembly according to the first embodiment of the present invention when viewed from above.
Figure 9:
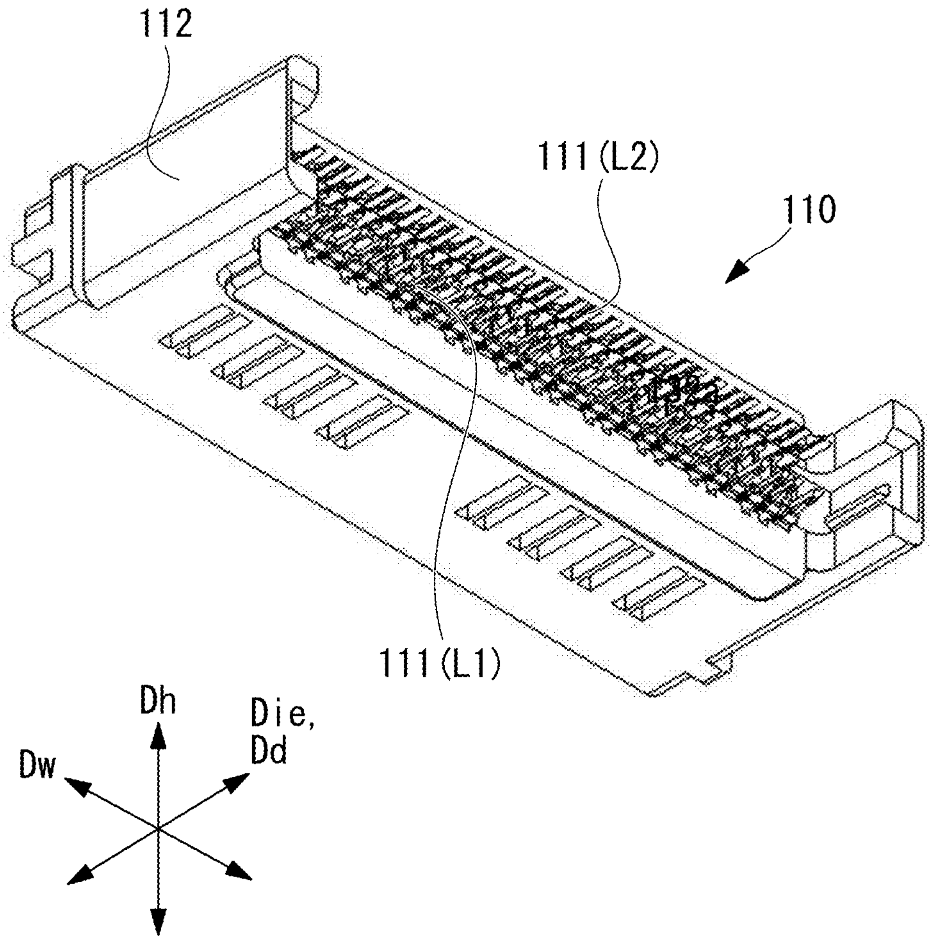
FIG. 9 is a perspective view of the connector of the connector assembly according to the first embodiment of the present invention when viewed from below.

As illustrated in FIG. 7 to FIG. 9, the connector 110 has a plurality of contact pins 111 (external terminals) and a connector housing 112.

Each of the contact pins 111 is a component for electrically connecting a module board to the relay device 120.

The contact pin 111 is an elongated pin extending in the depth direction Dd, for example.

The contact pin 111 has electrical conductivity.

The contact pin 111 has a tip part 111*a* contacted with the module board and a base part 111*b* located opposite to the tip part 111*a*.

The plurality of contact pins 111 form a first terminal line L1 and a second terminal line L2.

The first terminal line L1 is a set in which some contact pins 111 are aligned on a straight line at an equal pitch in the width direction Dw. Further, the second terminal line L2 is a set in which some contact pins 111 are aligned on a straight line at an equal pitch in the width direction Dw.

The first terminal line L1 is arranged at a position closer to the host board 51 in the height direction Dh than the second terminal line L2 (arranged below the second terminal line L2). Further, the second terminal line L2 is arranged farther from the host board 51 in the height direction Dh than the first terminal line L1 (arranged above the first terminal line L1).

The tip part 111*a* of each contact pin 111 included in the first terminal line L1 and the tip part 111*a* of each contact pin 111 included in the second terminal line L2 face each other in the height direction Dh, and a clearance 113 is provided therebetween. A module board is inserted in the clearance 113 along the depth direction Dd.

The base part 111*b* of each contact pin 111 included in the first terminal line L1 and the base part 111*b* of each contact pin 111 included in the second terminal line L2 are connected (for example, soldered) to the relay device 120 (in detail, electrodes of the paddle board 130) by an electrically conductive material (for example, a solder material).

The contact pins 111 configured as described above are held by a resin connector housing 112.

Accordingly, the connector 110 is configured.

<<<Relay Device>>>

The relay device 120 is an element for electrically connecting the connector 110 (in detail, the plurality of contact pins 111) to the host board 51 and the cables 181.

As illustrated in FIG. 7 and FIG. 10 to FIG. 16, the relay device 120 has the paddle board 130, a connection part 140, first locators 171, and second locators 172.

The paddle board 130 is an adapting board parallel to the host board 51, and the connector 110 is mounted on the front part thereof.

The paddle board 130 has a board body 131 and various electrodes.

The electrode as used herein is a portion used for conduction with the paddle board 130 (board body 131) and includes first terminal-adapting electrodes 132*a* and second terminal-adapting electrodes 132*b*, first cable-adapting electrodes 133*a* and second cable-adapting electrodes 133*b*, and plated through-holes 134 (connection terminal-adapting electrodes).

The board body 131 has a first face 131*a* facing the host board 51 and a second face 131*b* located opposite to the first face 131*a*.

In the case of FIG. 7, the first face 131*a* corresponds to the bottom face, and the second face 131*b* corresponds to the top face.

Figure 14:
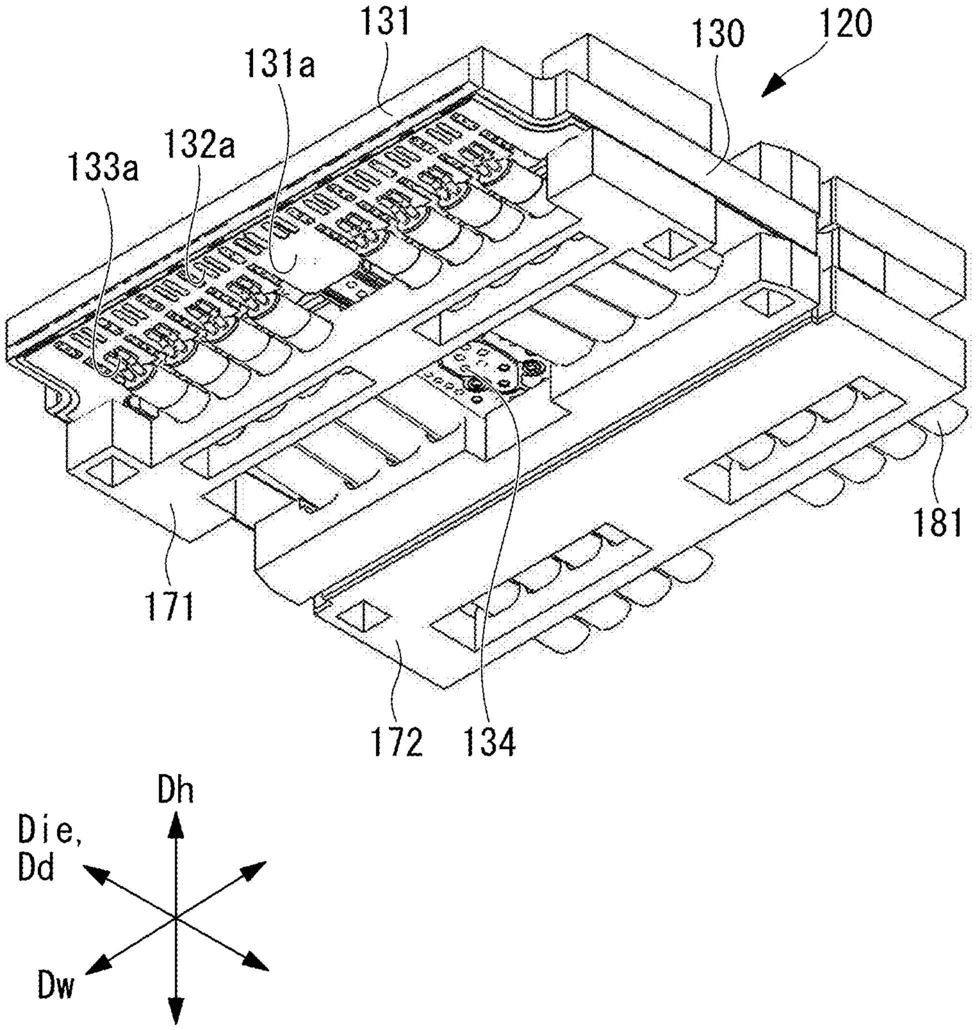
FIG. 14 is a perspective view of the relay device according to the first embodiment of the present invention when viewed from below.
Figure 15:
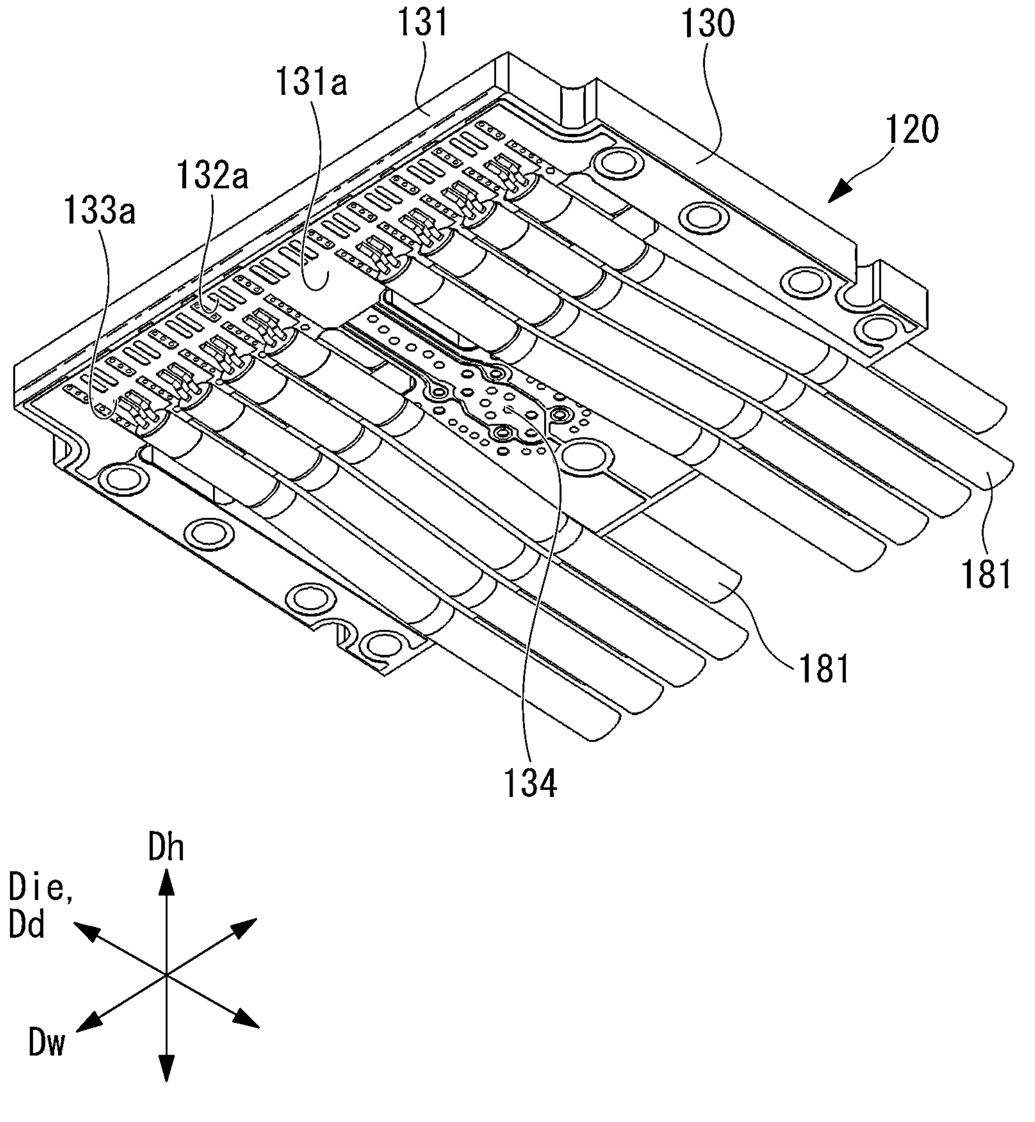
FIG. 15 is a perspective view of the relay device according to the first embodiment of the present invention when viewed from below (the locator omitted).
Figure 16:
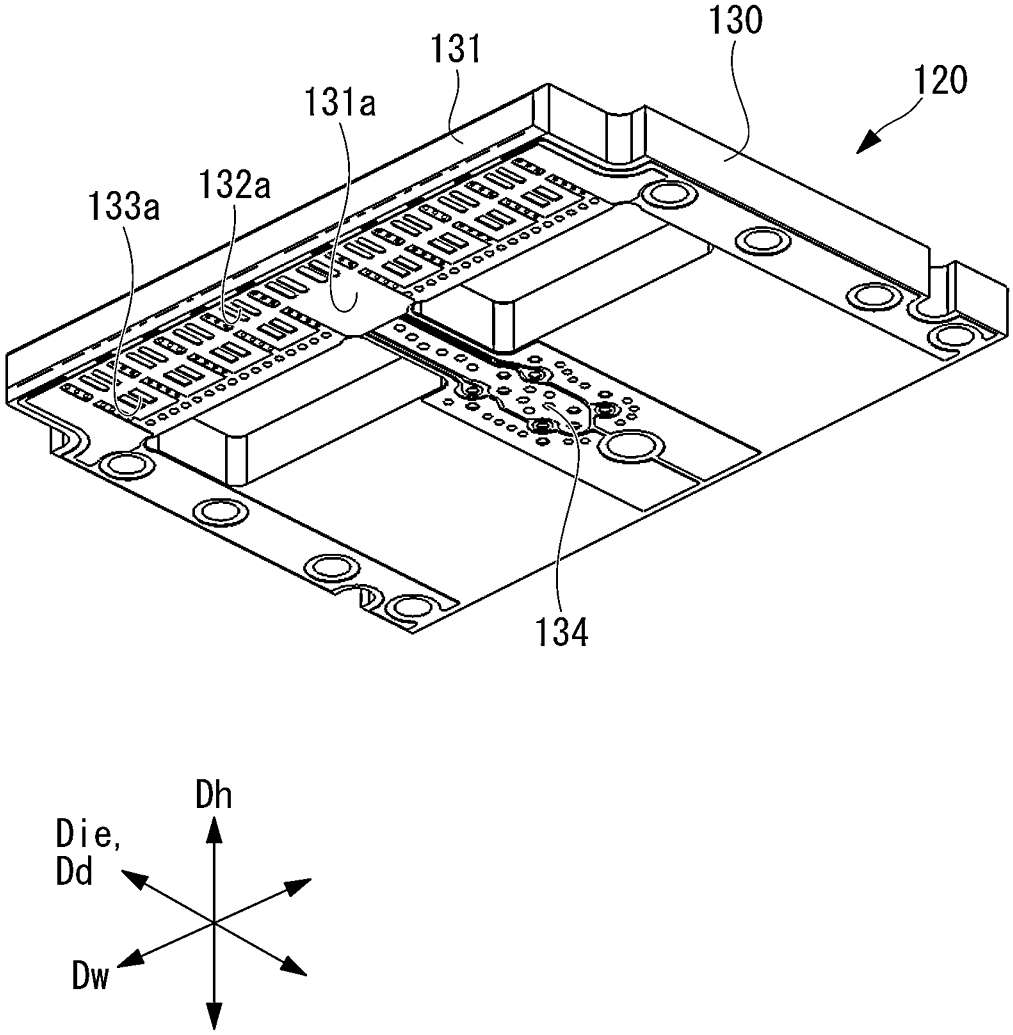
FIG. 16 is a perspective view of the relay device according to the first embodiment of the present invention when viewed from below (the locator and the cable omitted).

As illustrated in FIG. 14 to FIG. 16, at the front part of the first face 131*a*, a plurality of first terminal-adapting electrodes 132*a* are aligned on a straight line at an equal pitch along the width direction Dw.

The first terminal-adapting electrodes 132*a* are electrodes to which the base parts 111*b* of the contact pins 111 included in the first terminal line L1 of the connector 110 are connected (for example, soldered) by an electrically conductive material (for example a solder material).

The first terminal-adapting electrodes 132*a* are associated with the contact pins 111 included in the first terminal line L1 in a one-to-one manner. Thus, the number of first terminal-adapting electrodes 132*a* is the same as the number of contact pins 111 included in the first terminal line L1.

Figure 10:
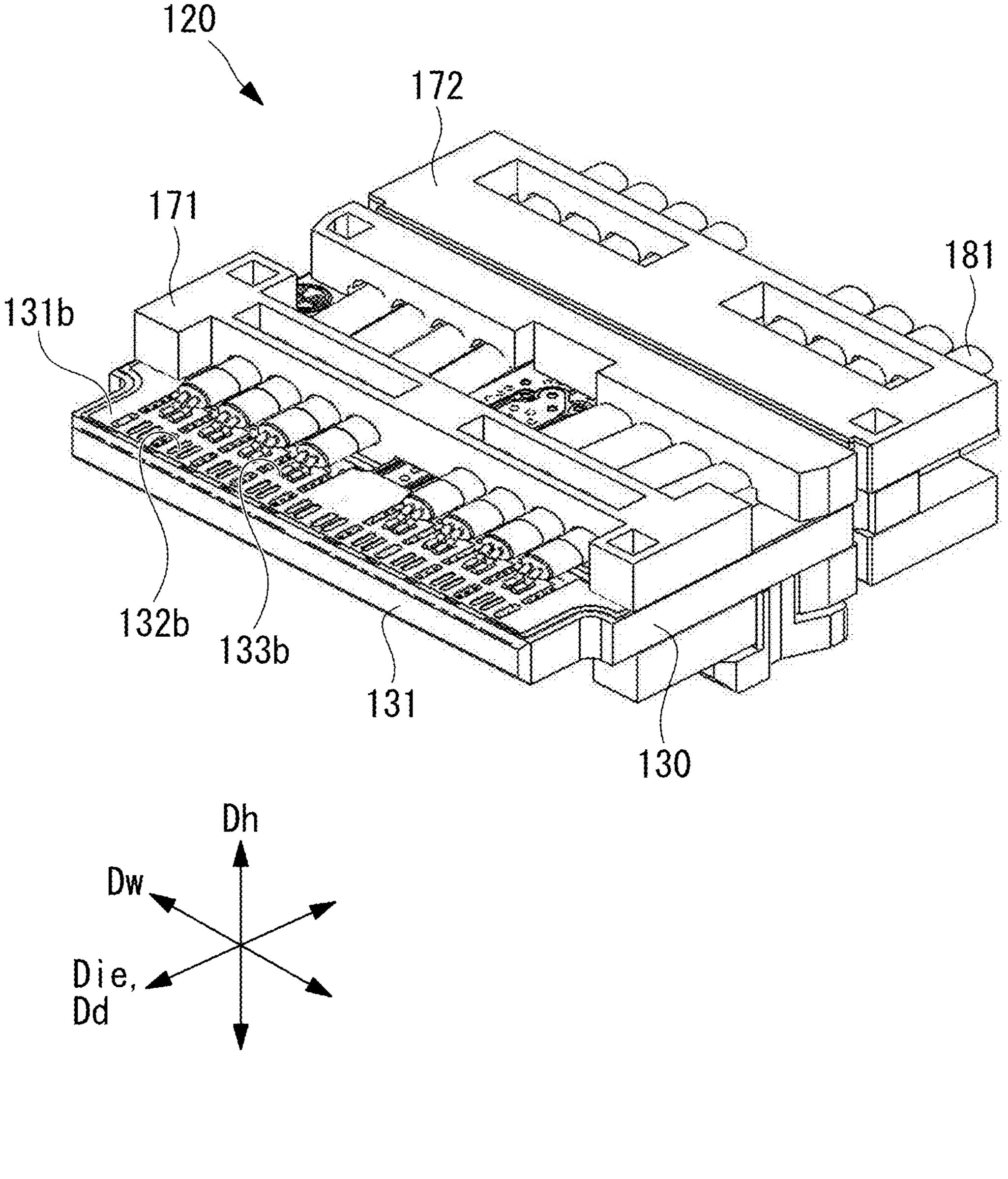
FIG. 10 is a perspective view of the relay device according to the first embodiment of the present invention when viewed from above.
Figure 11:
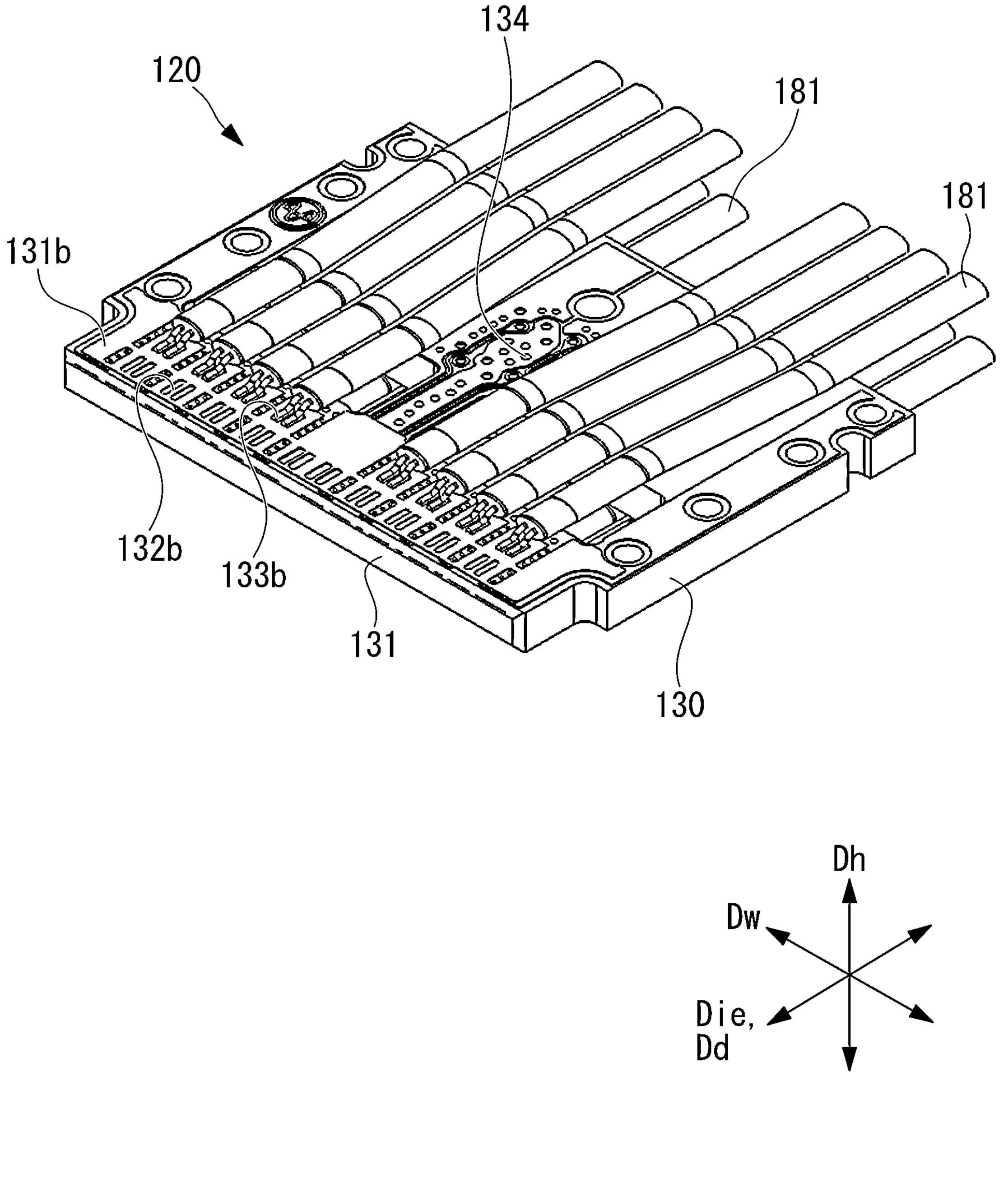
FIG. 11 is a perspective view of the relay device according to the first embodiment of the present invention when viewed from above (the locator omitted).
Figure 12:
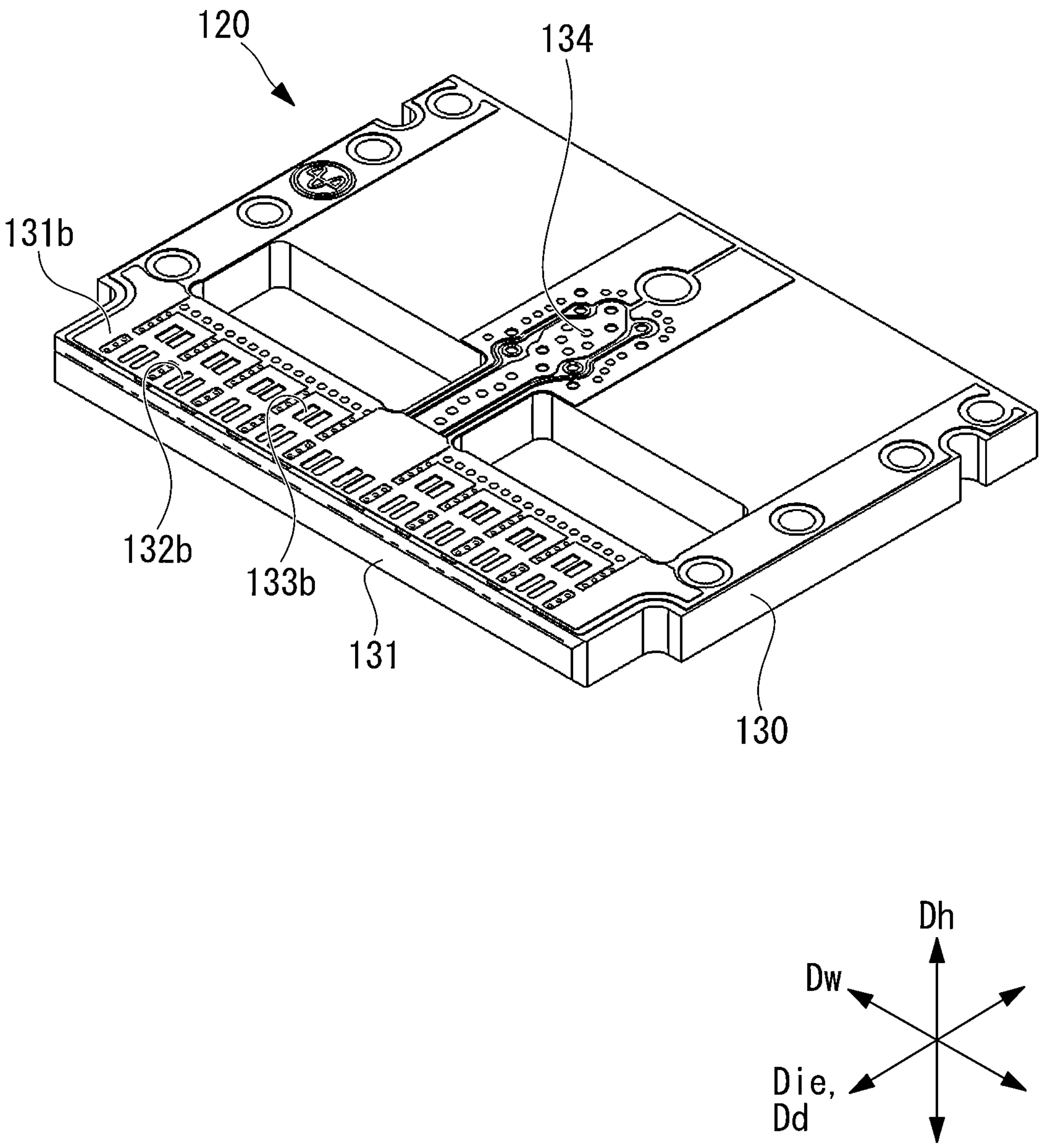
FIG. 12 is a perspective view of the relay device according to the first embodiment of the present invention when viewed from above (the locator and the cable omitted).
Figure 13:
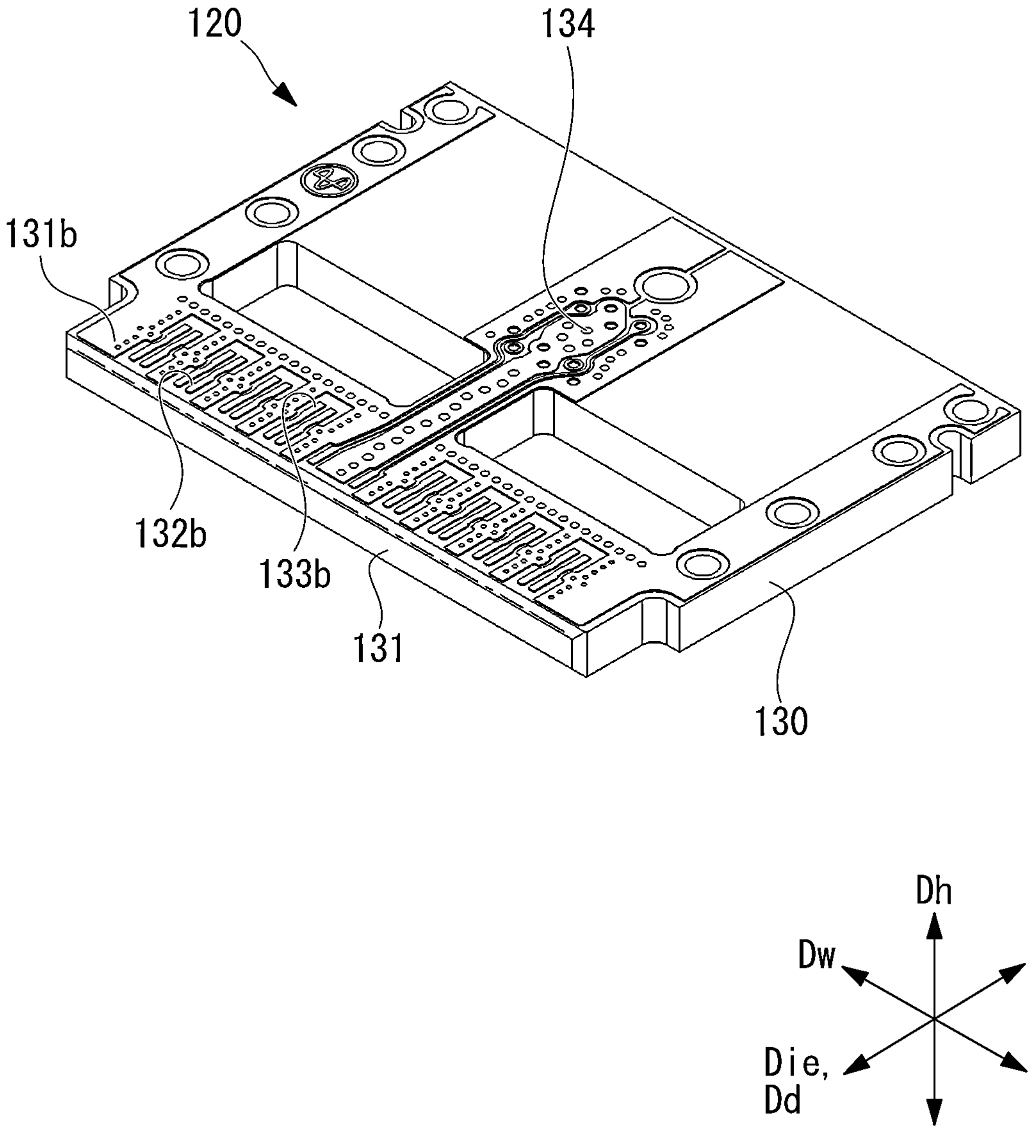
FIG. 13 is a perspective view of the relay device according to the first embodiment of the present invention when viewed from above (the pattern viewed).

As illustrated in FIG. 10 to FIG. 12, on the opposite side to the line of the first terminal-adapting electrodes 132*a* at the front part of the second face 131*b*, a plurality of second terminal-adapting electrodes 132*b* are aligned on a straight line at an equal pitch along the width direction Dw.

The second terminal-adapting electrodes 132*b* are electrodes to which the base parts 111*b* of the contact pins 111 included in the second terminal line L2 of the connector 110 are connected (for example, soldered) by an electrically conductive material (for example a solder material).

The second terminal-adapting electrodes 132*b* are associated with the contact pins 111 included in the second terminal line L2 in a one-to-one manner. Thus, the number of second terminal-adapting electrodes 132*b* is the same as the number of contact pins 111 included in the second terminal line L2.

As illustrated in FIG. 14 to FIG. 16, on the rear side from the line of the first terminal-adapting electrodes 132*a* (at positions distant from the connector 110) on the first face 131*a*, a plurality of first cable-adapting electrodes 133*a* are aligned on a straight line along the width direction Dw.

The first cable-adapting electrodes 133*a* are electrodes to which conductive wirings of the cables 181 are connected.

The first cable-adapting electrode 133*a* are electrically connected to the first terminal-adapting electrodes 132*a* via patterns (circuit) formed in the board body 131. However, not all of the first terminal-adapting electrodes 132*a* are electrically connected to the first cable-adapting electrodes 133*a* but some, but not all, of the plurality of first terminal-adapting electrodes 132*a* are electrically connected to the first cable-adapting electrodes 133*a*. Thus, the number of first cable-adapting electrodes 133*a* is less than the number of first terminal-adapting electrodes 132*a*.

As illustrated in FIG. 10 to FIG. 13, in the rear side from the line of the second terminal-adapting electrodes 132*b* on the opposite side to the first cable-adapting electrodes 133*a* on the second face 131*b*, a plurality of second cable-adapting electrodes 133*b* are aligned on a straight line along the width direction Dw.

The second cable-adapting electrodes 133*b* are electrically connected to the second terminal-adapting electrodes 132*b* via patterns formed in the board body 131. However, not all of the second terminal-adapting electrodes 132*b* are electrically connected to the second cable-adapting electrodes 133*b* but some, but not all, of the plurality of second terminal-adapting electrodes 132*b* are electrically connected to the second cable-adapting electrodes 133*b*. Thus, the number of second cable-adapting electrodes 133*b* is less than the number of second terminal-adapting electrodes 132*b*.

As illustrated in FIG. 7 and FIG. 10 to FIG. 16, the board body 131 is provided with a plurality of plated through-holes 134 penetrating through the first face 131*a* and the second face 131*b*.

It is preferable that the plated through-holes 134 be provided at positions on the rear side from the first cable-adapting electrodes 133*a* and the second cable-adapting electrodes 133*b* in the depth direction Dd or at approximately the same positions as the first cable-adapting electrodes 133*a* and the second cable-adapting electrodes 133*b* in the depth direction Dd. In other words, it is preferable that the first cable-adapting electrodes 133*a* and the second cable-adapting electrodes 133*b* be provided at positions closer to the first terminal-adapting electrodes 132*a* and the second terminal-adapting electrodes 132*b* than to the plated through-holes 134 in the depth direction Dd or at approximately the same positions as the plated through-holes 134 in the depth direction Dd.

Further, it is preferable that the plated through-holes 134 be provided in the center portion of the board body 131 in the width direction Dw.

The plated through-holes 134 are electrically connected to the first terminal-adapting electrodes 132*a* and/or the second terminal-adapting electrodes 132*b* via patterns formed in the board body 131. However, not all of the first terminal-adapting electrodes 132*a* and not all of the second terminal-adapting electrodes 132*b* are electrically connected to the plated through-holes 134, but the first terminal-adapting electrodes 132*a* which are not electrically connected to the first cable-adapting electrodes 133*a* via patterns out of the plurality of first terminal-adapting electrodes 132*a* and the second terminal-adapting electrodes 132*b* which are not electrically connected to the second cable-adapting electrodes 133*b* via patterns out of the plurality of second terminal-adapting electrodes 132*b* are electrically connected to the plated through-holes 134.

The first terminal-adapting electrodes 132*a* electrically connected to the first cable-adapting electrodes 133*a* via patterns are electrodes for high-speed signals input from an optical module. Thus, each high-speed signal input from the optical module will be transmitted through in the order of the contact pin 111 included in the first terminal line L1 of the connector 110, the first terminal-adapting electrode 132*a*, a pattern, the first cable-adapting electrode 133*a*, and the cable 181.

The second terminal-adapting electrodes 132*b* electrically connected to the second cable-adapting electrodes 133*b* via patterns are electrodes for high-speed signals input from an optical module. Thus, each high-speed signal input from the optical module will be transmitted through in the order of the contact pin 111 included in the second terminal line L2 of the connector 110, the second terminal-adapting electrode 132*b*, a pattern, the second cable-adapting electrode 133*b*, and the cable 181.

The first terminal-adapting electrodes 132*a* electrically connected to the plated through-holes 134 via patterns are electrodes for signals other than the high-speed signals input from the optical modules. Thus, each signal other than the high-speed signals input from the optical module will be transmitted through in the order of the contact pin 111 included in the first terminal line L1 of the connector 110, the first terminal-adapting electrode 132*a*, a pattern, and the plated through-hole 134. Note that each signal other than the high-speed signals input to the plated through-holes 134 is transmitted to the host board 51 via each press-fit pin 141 (connection terminal) described later.

The signal other than high-speed signals as used herein means a low-speed signal, a power supply, or a ground.

The second terminal-adapting electrodes 132*b* electrically connected to the plated through-holes 134 via patterns are electrodes for signals other than the high-speed signals input from the optical modules. Thus, each signal other than the high-speed signals input from the optical module will be transmitted through in the order of the contact pin 111 included in the second terminal line L2 of the connector 110, the second terminal-adapting electrode 132*b*, a pattern, and the plated through-hole 134. Note that each signal other than the high-speed signals input to the plated through-holes 134 is transmitted to the host board 51 via each press-fit pin 141 described later.

As illustrated in FIG. 7, one ends of the plurality of cables 181 are connected to the paddle board 130 configured as described above. In detail, a conductive wiring of each cable 181 is connected (for example, soldered) to each first cable-adapting electrode 133*a* and each second cable-adapting electrode 133*b* of the paddle board 130 by an electrically conductive material (for example, a solder material).

On the other hand, the other ends of the plurality of cables 181 are connected to other terminals (not illustrated), other paddle boards, or the like.

Figure 3:
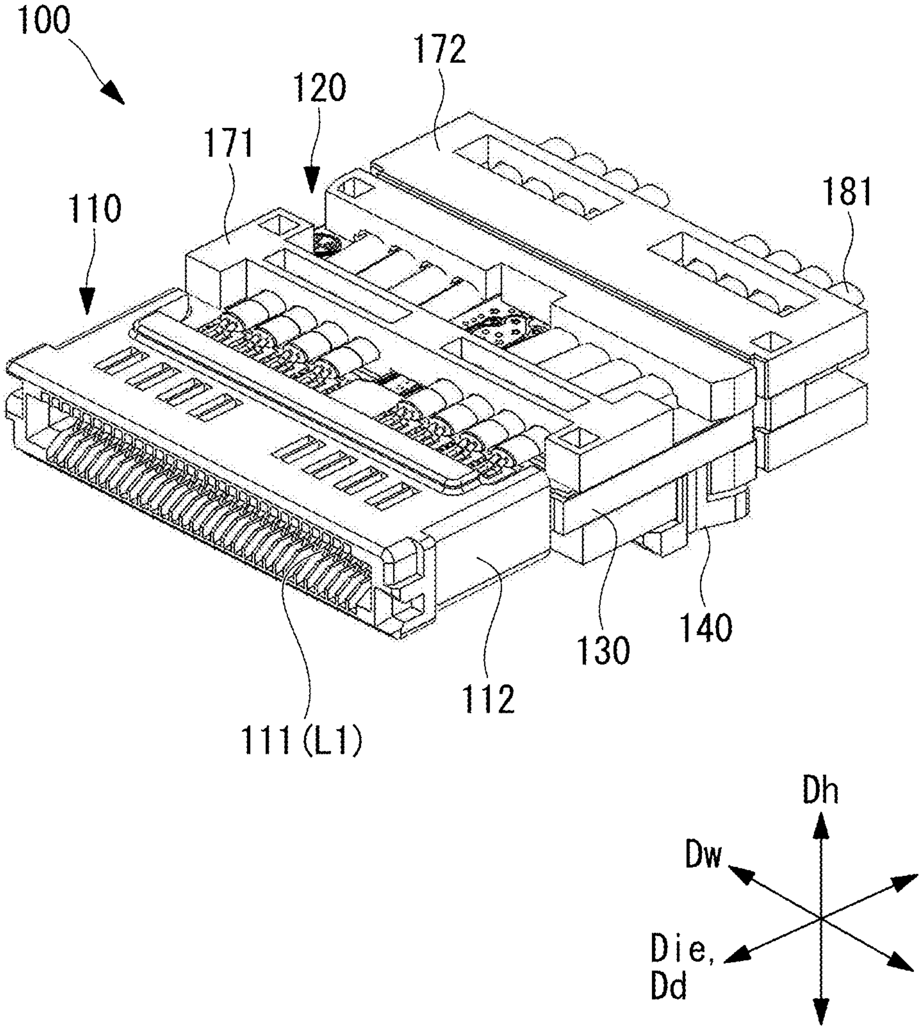
FIG. 3 is a perspective view of the connector assembly according to the first embodiment of the present invention when viewed from above.
Figure 4:
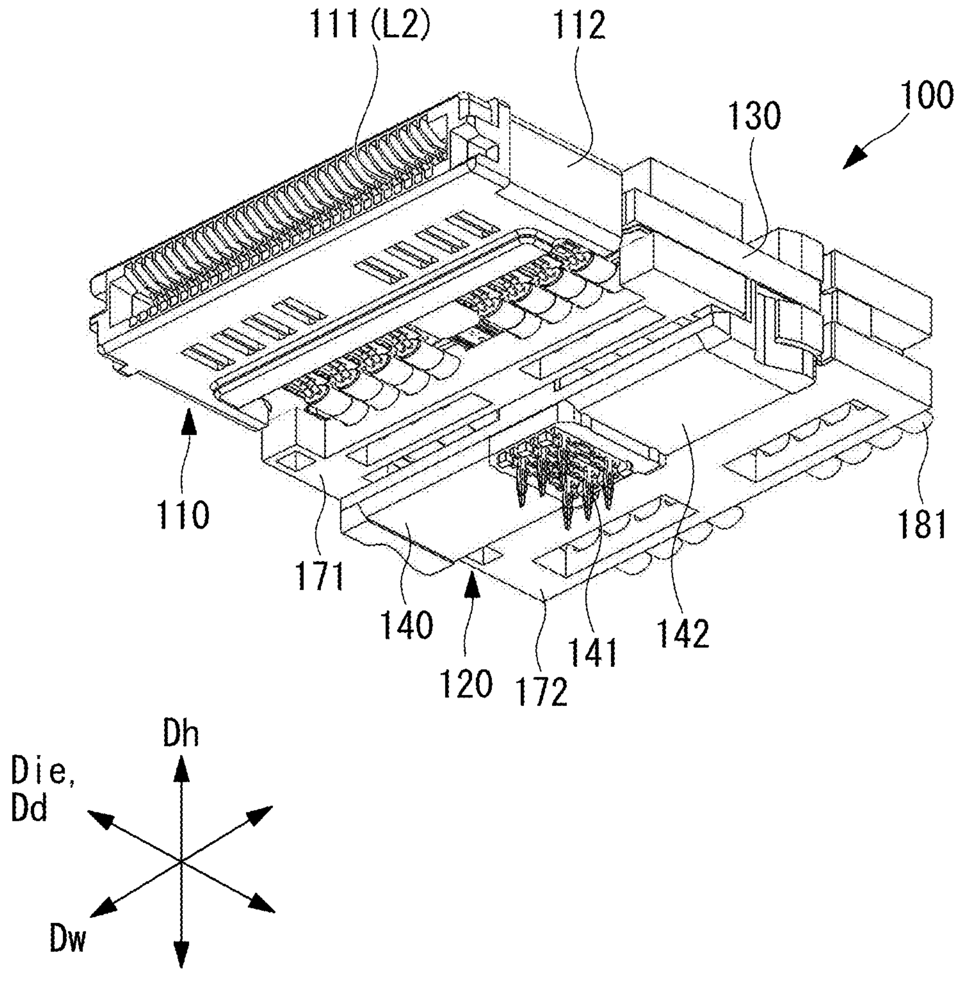
FIG. 4 is a perspective view of the connector assembly according to the first embodiment of the present invention when viewed from below.
Figure 5:
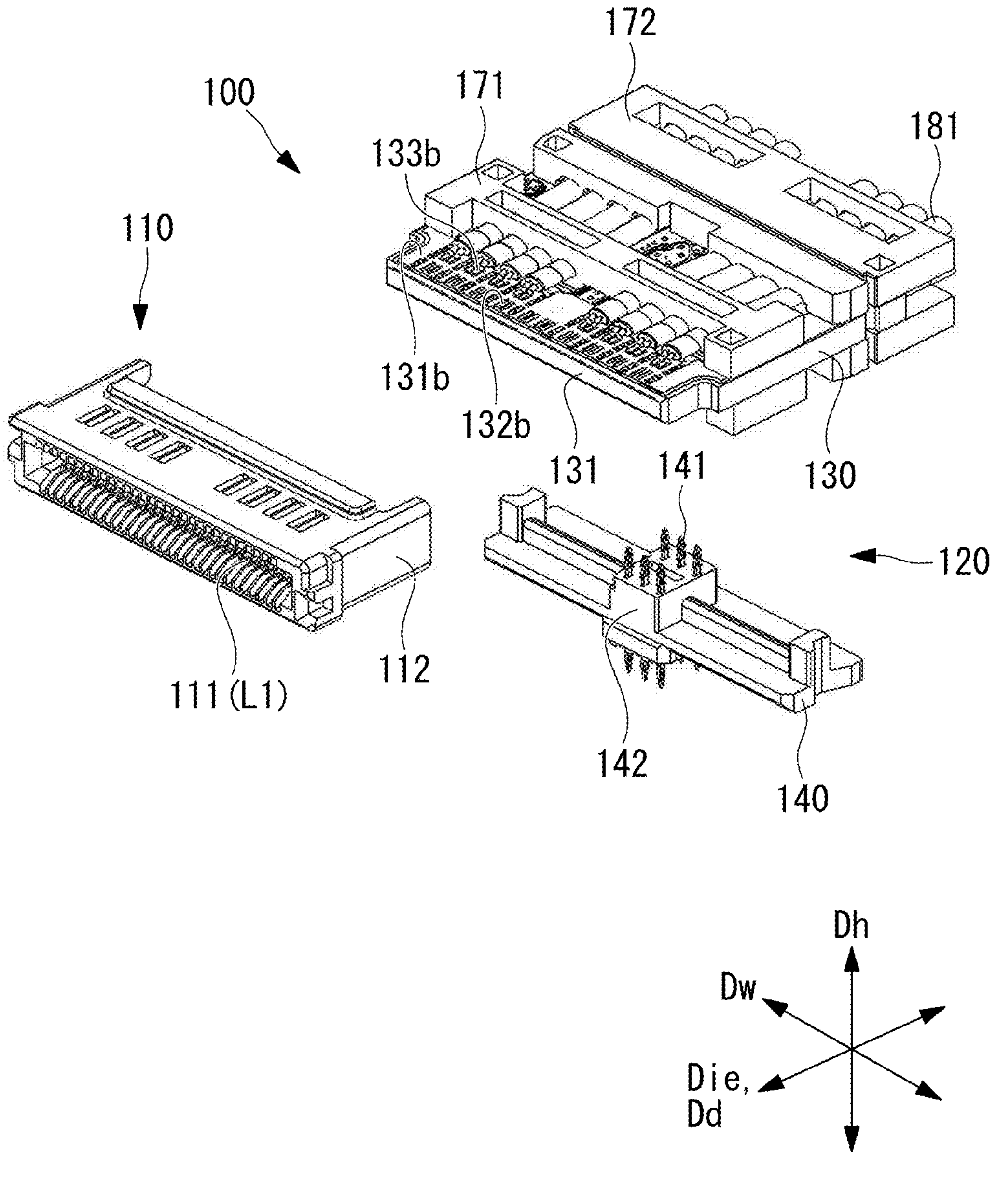
FIG. 5 is an exploded perspective view of the connector assembly according to the first embodiment of the present invention when viewed from above.
Figure 6:
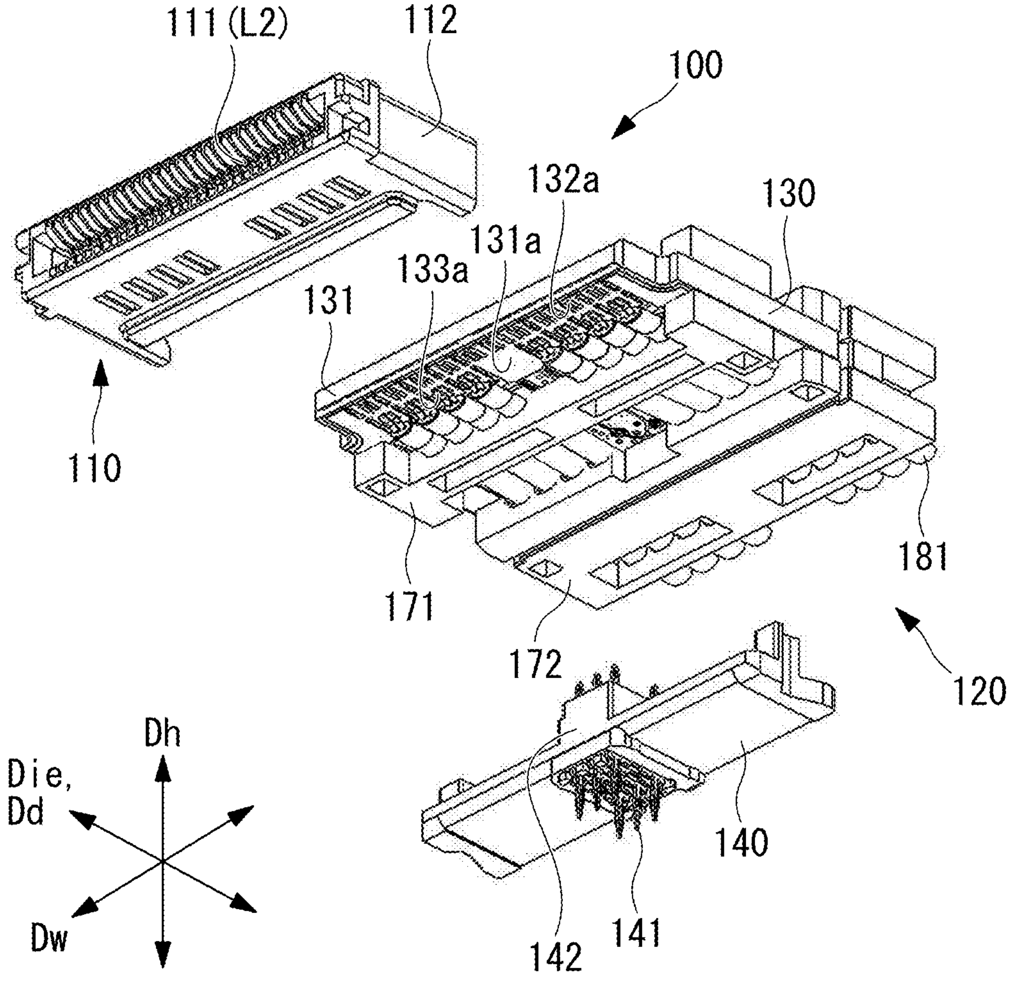
FIG. 6 is an exploded perspective view of the connector assembly according to the first embodiment of the present invention when viewed from below.

As illustrated in FIG. 3 and FIG. 4, the first locators 171 and the second locators 172 are mounted on the paddle board 130 to hold the cables 181.

In the depth direction Dd, the first locators 171 are located at the front part of the paddle board 130, and the second locators 172 are located at the rear part of the paddle board 130.

The connection part 140 is a portion for electrically connecting the paddle board 130 to the host board 51 and is mounted below the paddle board 130 between the first locator 171 and the second locator 172 in the depth direction Dd.

Figure 17:
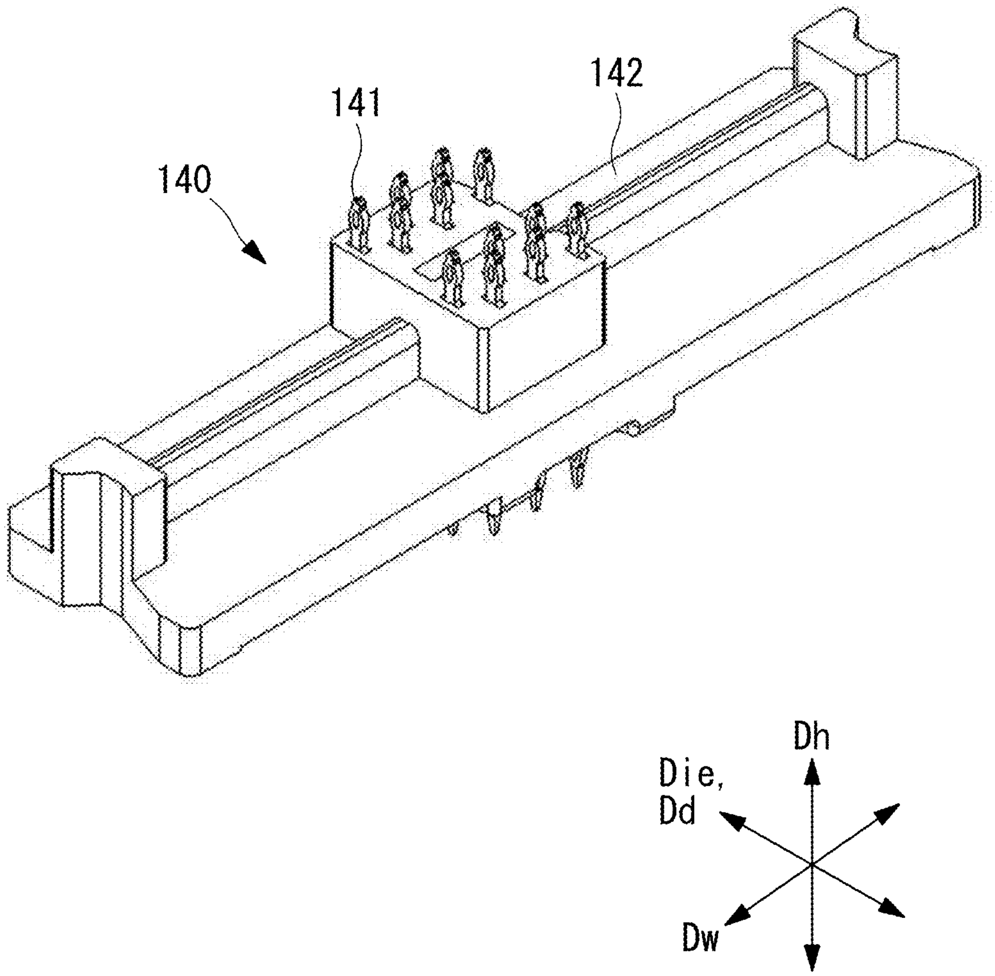
FIG. 17 is a perspective view of a connection part of the relay device according to the first embodiment of the present invention when viewed from above.
Figure 18:
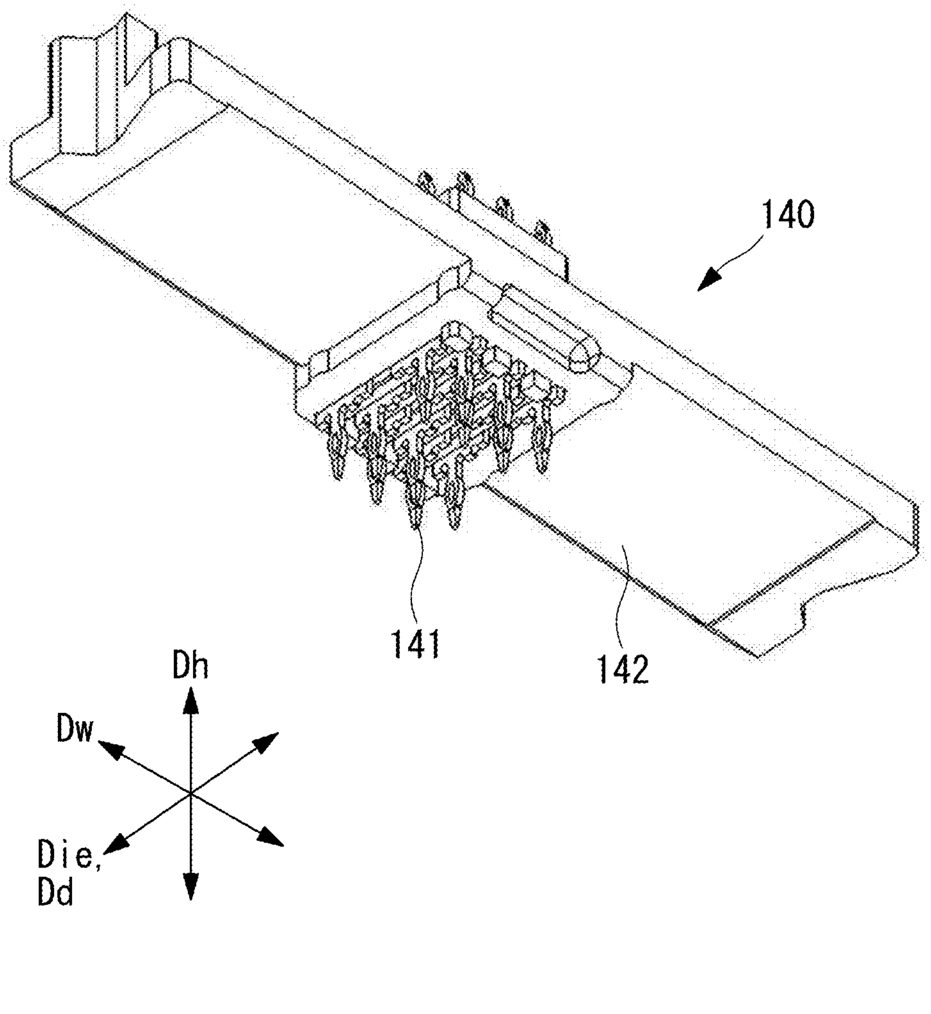
FIG. 18 is a perspective view of the connection part of the relay device according to the first embodiment of the present invention when viewed from below.

As illustrated in FIG. 7, FIG. 17, and FIG. 18, the connection part 140 has a plurality of press-fit pins 141 and a housing 142.

Each of the press-fit pins 141 is a component for electrically connecting the paddle board 130 to the host board 51.

The press-fit pin 141 has electrical conductivity.

The plurality of press-fit pins 141 are housed in the housing 142 made of a resin, and the circumferences thereof are individually surrounded by the housing 142. However, both ends of the press-fit pins 141 project out of the housing 142. An elastic press-fit part that can be press-fitted into a plated through-hole is included in both the ends.

One end (one press-fit part) of the press-fit pin 141 projecting out of the housing 142 is press-fitted into the plated through-hole 134 (the inner circumferential face thereof is plated) of the paddle board 130. On the other hand, the other end (the other press-fit part) of the press-fit pin 141 projecting out of the housing 142 is press-fitted into a plated through-hole 52 (the inner circumferential face thereof is plated) provided in the host board 51. Thus, each press-fit pin 141 extends in the height direction Dh from the paddle board 130 toward the host board 51, one end thereof is connected to the paddle board 130, and the other end is connected to the host board 51. Accordingly, the paddle board 130 is electrically connected to the host board 51.

When the paddle board 130 (the plated through-holes 134 of the paddle board 130) has been electrically connected to the host board 51 by the press-fit pins 141, the first terminal-adapting electrodes 132*a* and the second terminal-adapting electrodes 132*b* electrically connected to the plated through-holes 134 via patterns formed in the paddle board 130 are electrically connected to the host board 51 via the press-fit pins 141. Thus, a signal other than high-speed signals input from an optical module will be transmitted through in the order of the contact pin 111 of the connector 110, the first terminal-adapting electrode 132*a*/the second terminal-adapting electrode 132*b*, a pattern, the plated through-hole 134, the press-fit pin 141, and the host board 51.

<<Advantageous Effects of First Embodiment>>

Since the connection part 140 has a plurality of press-fit pins 141, and the plurality of press-fit pins 141 electrically connect the paddle board 130 to the host board 51, it is possible to electrically connect the contact pins 111 to the host board 51 via the relay device 120 (the paddle board 130 and the press-fit pins 141) without bending the contact pins 111 toward the host board 51.

Further, since no clearance used for arranging bent terminals is required to be provided on the paddle board 130, the flexibility in routing of patterns in the paddle board 130 can be improved. If the paddle board 130 has a clearance, the patterns would be required to be routed avoiding the clearance, which would reduce the flexibility in routing.

Further, the plurality of first terminal-adapting electrodes 132*a* electrically connected to the plated through-holes 134 are electrodes for signals other than high-speed signals input from the plurality of contact pins 111, and thus the high-speed signals can be transmitted from the contact pins 111 to the cables 181 via the paddle board 130, and the signals (low-speed signals, a power supply, a ground) other than the high-speed signals can be transmitted to the host board 51 via the paddle board 130 and the press-fit pins 141 of the connection part 140.

Further, the plurality of first cable-adapting electrodes 133*a* and the plurality of second cable-adapting electrodes 133*b* are provided, in the depth direction Dd, at positions closer to the plurality of first terminal-adapting electrodes 132*a* and the plurality of second terminal-adapting electrodes 132*b* than to the plated through-holes 134 or at approximately the same positions as the plurality of plated through-holes 134, and this can relatively reduce the distance from the first terminal-adapting electrodes 132*a* to the first cable-adapting electrodes 133*a* and the distance from the second terminal-adapting electrodes 132*b* to the second cable-adapting electrode 133*b*. Thus, the length of a pattern connecting the first terminal-adapting electrode 132*a* and the first cable-adapting electrode 133*a* to each other and the length of a pattern connecting the second terminal-adapting electrode 132*b* and the second cable-adapting electrode 133*b* to each other can be reduced. Accordingly, since high-speed signal lines can be connected over a short distance, transmission characteristics can be improved.

Second Embodiment

A relay device and a connector assembly according to the second embodiment of the present invention will be described below with reference to the drawings.

<<Overview>>

While the relay device 120 according to the first embodiment has the single paddle board 130, a relay device 220 according to the present embodiment has two paddle boards (a first paddle board 230 (first adapting board) and a second paddle board 250 (second adapting board)) arranged in the height direction Dh.

The connector assembly 200 having the relay device 220 is one of devices included in the receptacle assembly in the same manner as in the first embodiment.

The receptacle assembly is an apparatus for electrically connecting an optical module compatible to a form factor such as OSFP-XD or QSFP-DD to the host board 51 (external circuit board) and cables 281 (external cables).

<<Relay Device and Connector Assembly>>

The connector assembly 200 is a device for electrically connecting an optical module to the host board 51 and the cables 281.

As illustrated in FIG. 19 to FIG. 23, the connector assembly 200 has a connector 210 and the relay device 220.

<<<Connector>>>

The connector 210 is an element for electrically connecting a circuit board of an optical module (hereafter, referred to as "module board") to the relay device 220.

Figure 19:
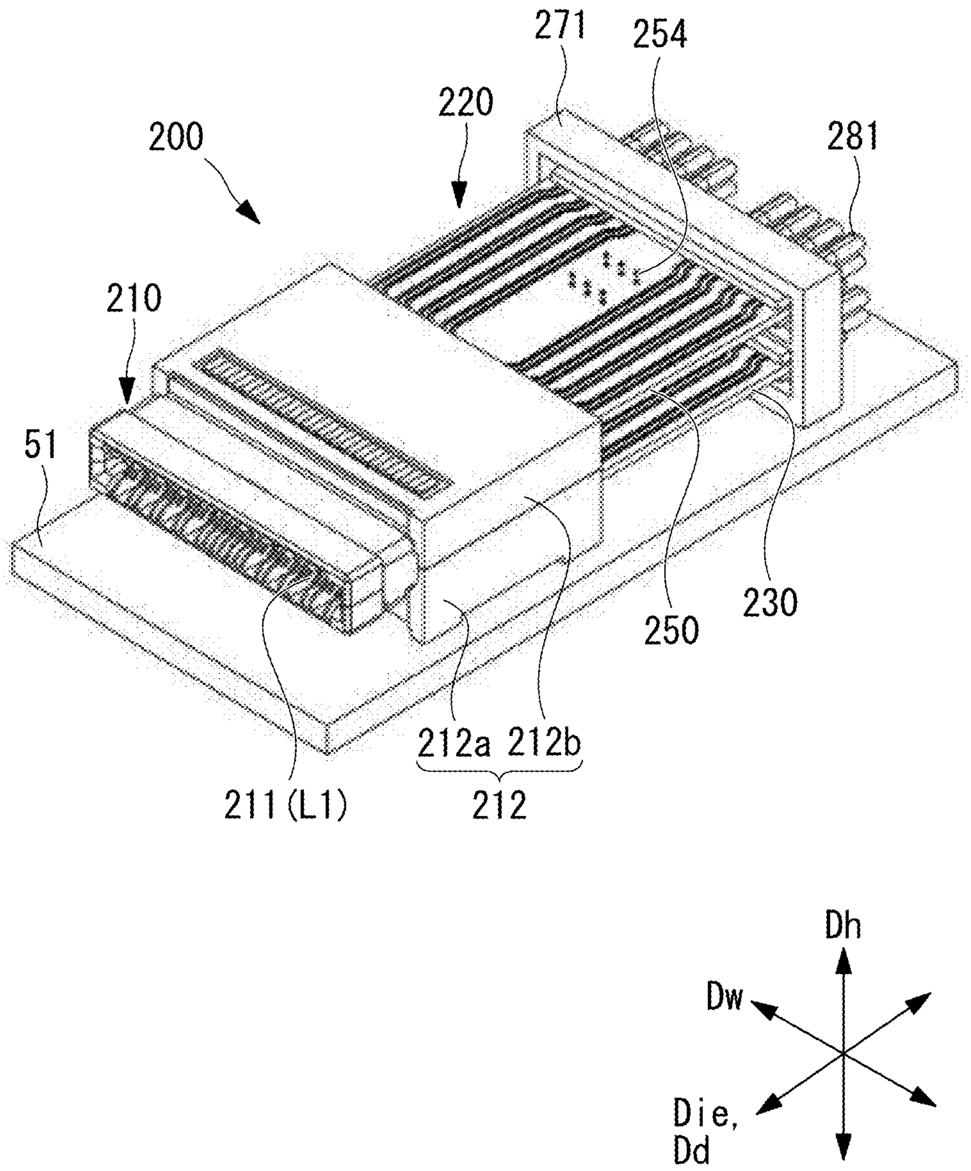
FIG. 19 is a perspective view of a connector assembly according to a second embodiment of the present invention when viewed from above.
Figure 20:
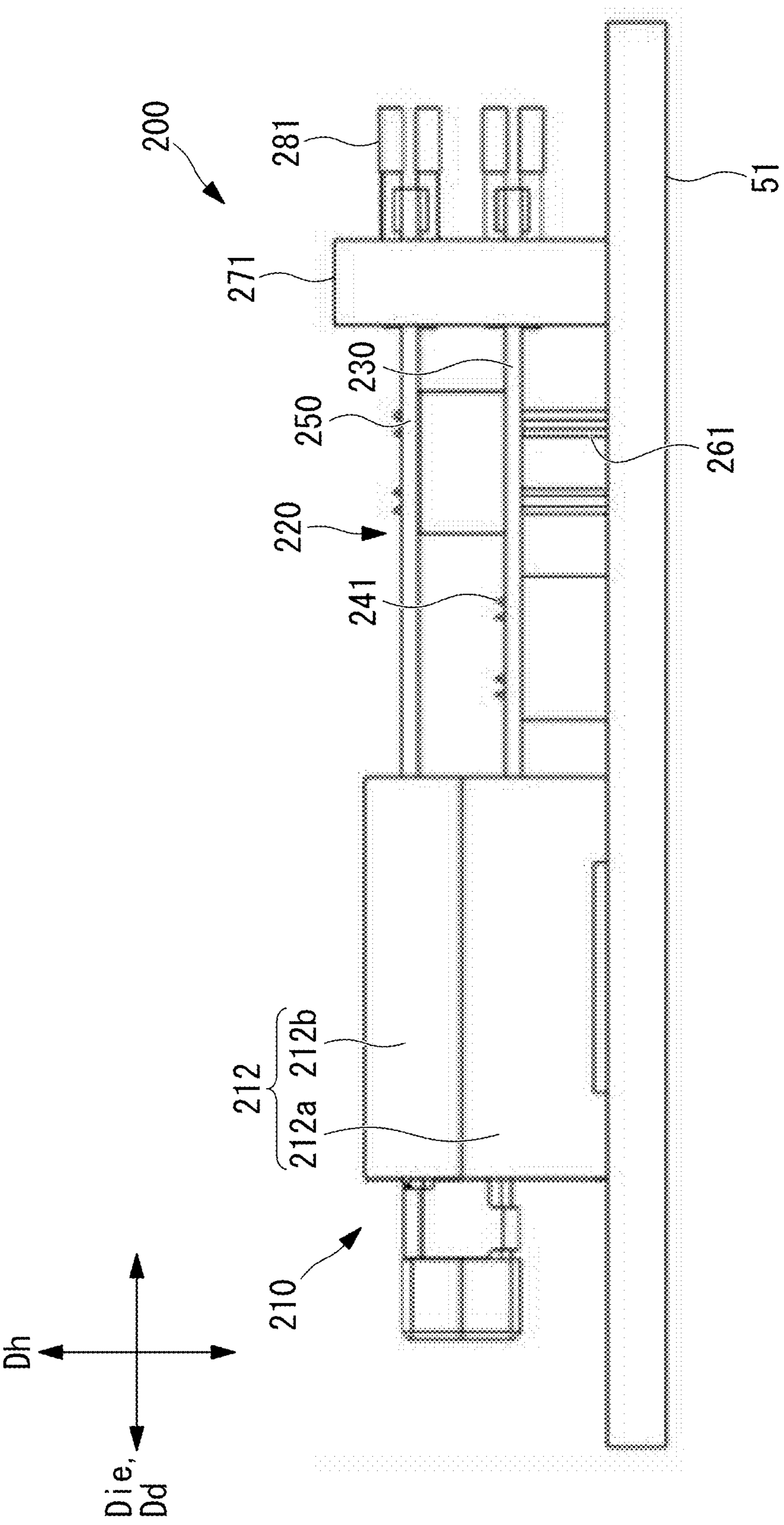
FIG. 20 is a side view of the connector assembly according to the second embodiment of the present invention.
Figure 24:
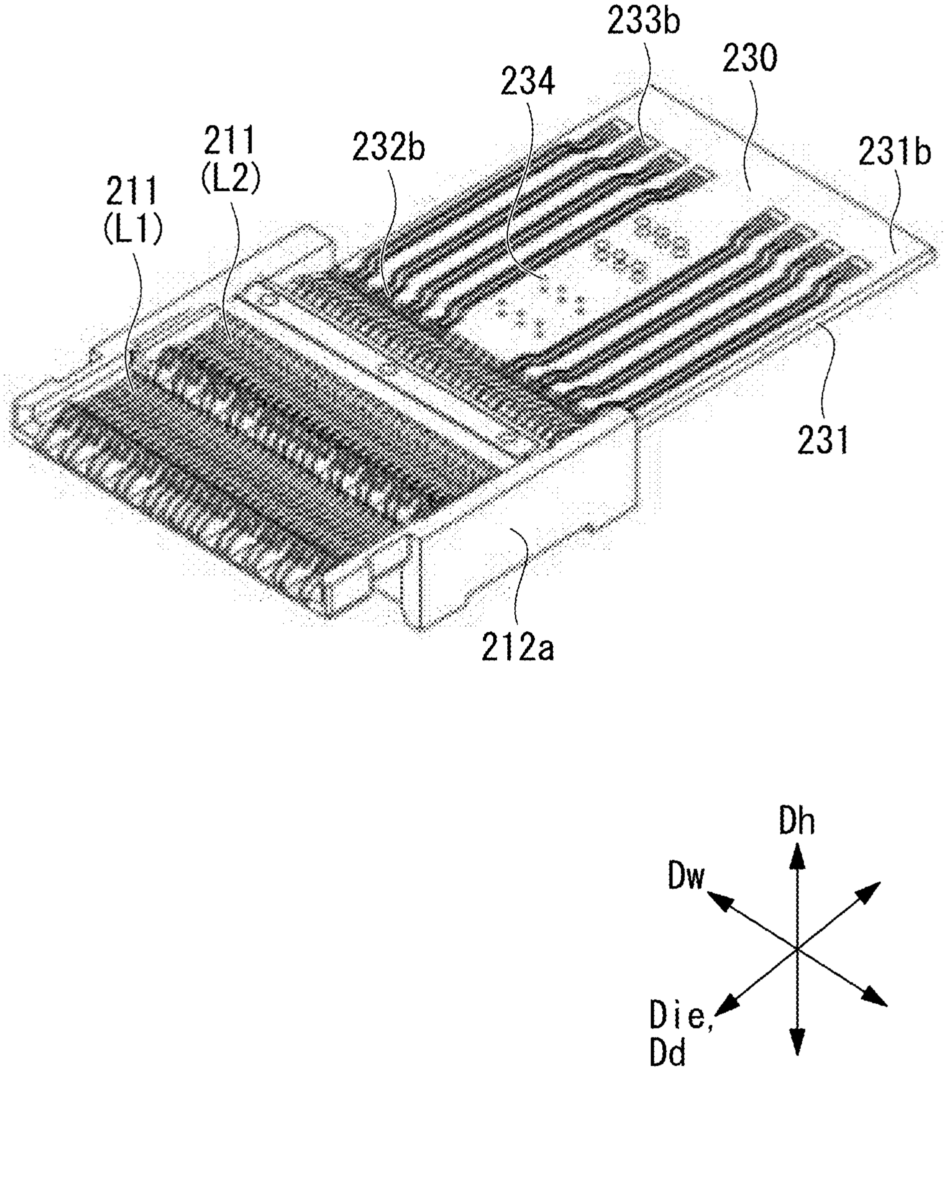
FIG. 24 is a perspective view of a portion including a first paddle board of the connector assembly according to the second embodiment of the present invention when viewed from above.
Figure 25:
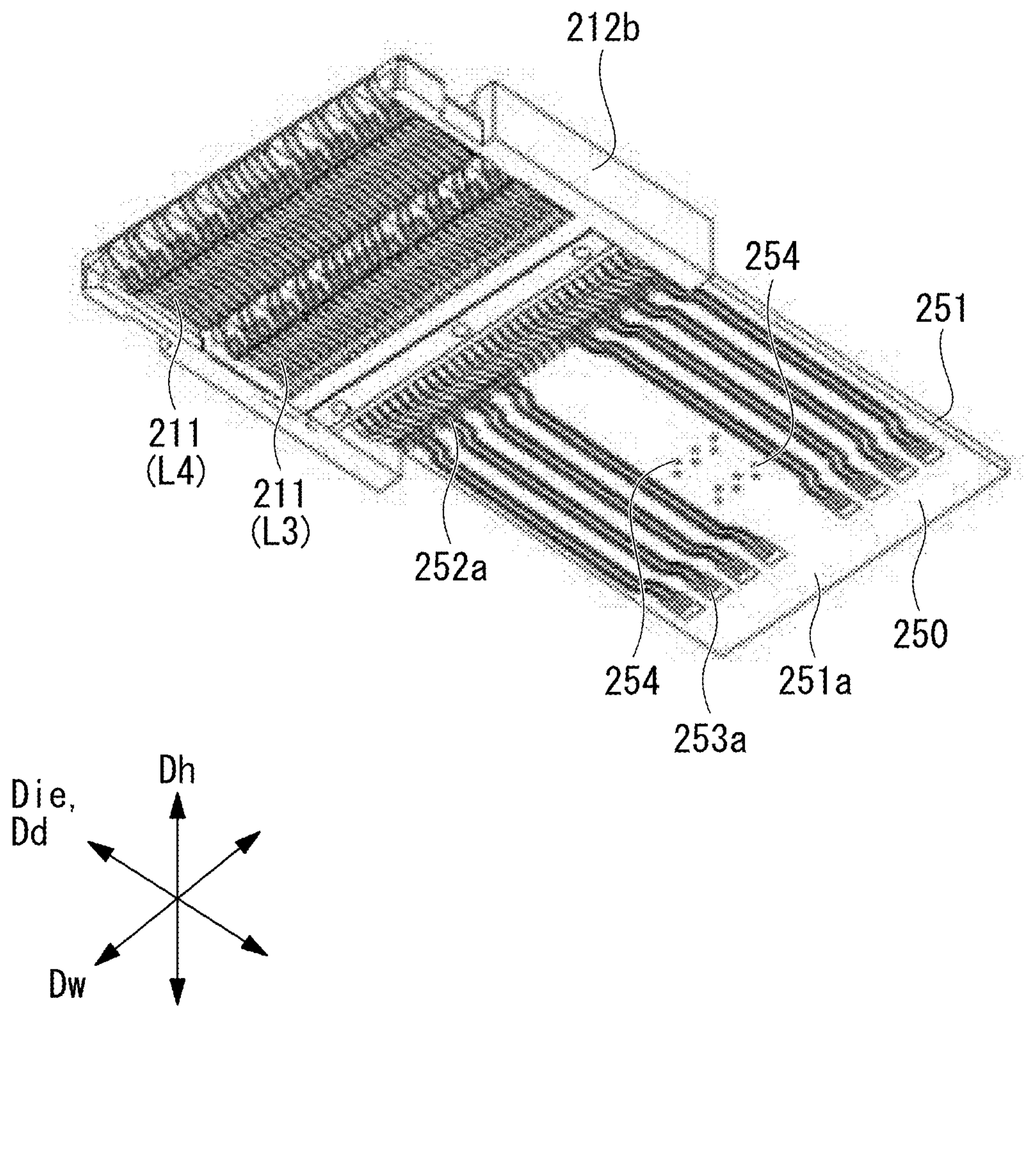
FIG. 25 is a perspective view of a portion including a second paddle board of the connector assembly according to the second embodiment of the present invention when viewed from below.

As illustrated in FIG. 19, FIG. 24, and FIG. 25, the connector 210 has a plurality of contact pins 211 (external terminals) and a connector housing 212.

Each of the contact pins 211 is a component for electrically connecting a module board to the relay device 220.

The contact pin 211 is an elongated pin extending in the depth direction Dd, for example.

The contact pin 211 has electrical conductivity.

The contact pin 211 has a tip part 211*a* contacted with a module board and a base part 211*b* located opposite to the tip part 211*a*.

The plurality of contact pins 211 form a first terminal line L1 and a second terminal line L2 and also a third terminal line L3 and a fourth terminal line LA.

The first terminal line L1 is a set in which some contact pins 211 are aligned on a straight line at an equal pitch in the width direction Dw. Further, the second terminal line L2 is a set in which some contact pins 211 are aligned on a straight line at an equal pitch in the width direction Dw.

The length of the contact pin 211 included in the first terminal line L1 is longer than that of the contact pin 211 included in the second terminal line L2 and is approximately the same as that of the contact pin 211 included in the fourth terminal line LA.

The third terminal line L3 is a set in which some contact pins 211 are aligned on a straight line at an equal pitch in the width direction Dw. Further, the fourth terminal line LA is a set in which some contact pins 211 are aligned on a straight line at an equal pitch in the width direction Dw.

The length of the contact pin 211 included in the third terminal line L3 is shorter than that of the contact pin 211 included in the fourth terminal line L4 and is approximately the same as that of the contact pin 211 included in the second terminal line L2.

The first terminal line L1 is arranged at a position closer to the host board 51 than the second terminal line L2 (arranged below the second terminal line L2) in the height direction Dh. Further, the second terminal line L2 is arranged at a position farther from the host board 51 than the first terminal line L1 (arranged above the first terminal line L1) in the height direction Dh. Further, the third terminal line L3 is arranged at a position farther from the host board 51 in the height direction Dh than the second terminal line L2. Further, the fourth terminal line LA is arranged at a position farther from the host board 51 in the height direction Dh than the third terminal line L3.

The tip part 211*a* of each contact pin 211 included in the first terminal line L1 and the tip part 211*a* of each contact pin 211 included in the fourth terminal line LA face each other in the height direction Dh, and a clearance 213 is provided therebetween.

The tip part 211*a* of each contact pin 211 included in the second terminal line L2 and the tip part 211*a* of each contact pin 211 included in the third terminal line L3 face each other in the height direction Dh, and a clearance 214 is provided therebetween.

A set of the tip parts 211*a* included in the first terminal line L1 and the tip parts 211*a* included in the fourth terminal line LA is located on the front side from a set of the tip parts 211*a* included in the second terminal line L2 and the tip parts 211*a* included in the third terminal line L3 in the depth direction Dd. Thus, the clearance 213 is located on the front side from the clearance 214 in the depth direction Dd. A module board is inserted in each of the clearance 213 and the clearance 214 along the insertion-extraction direction Die (depth direction Dd).

The base part 211*b* of each contact pin 211 included in the first terminal line L1 and the base part 211*b* of each contact pin 211 included in the second terminal line L2 are connected (for example, soldered) to the relay device 220 (in detail, electrodes of the first paddle board 230) by an electrically conductive material (for example, a solder material).

The base part 211*b* of each contact pin 211 included in the third terminal line L3 and the base part 211*b* of each contact pin 211 included in the fourth terminal line LA are connected (for example, soldered) to the relay device 220 (in detail, electrodes of the second paddle board 250) by an electrically conductive material (for example, a solder material).

The contact pins 211 configured as described above are held by a resin connector housing 212.

The connector housing 212 includes the first connector housing 212*a* and the second connector housing 212*b* that can be divided from each other in the height direction Dh.

The first connector housing 212*a* is arranged at a position closer to the host board 51 than the second connector housing 212*b* (arranged below the second connector housing 212*b*) in the height direction Dh. Further, the second connector housing 212*b* is arranged at a position farther from the host board 51 than the first connector housing 212*a* (arranged above the first connector housing 212*a*) in the height direction Dh.

The first connector housing 212*a* holds each contact pin 211 included in the first terminal line L1 and each contact pin 211 included in the second terminal line L2. Further, the second connector housing 212*b* holds each contact pin 211 included in the third terminal line L3 and each contact pin 211 included in the fourth terminal line LA.

The connector housing 212 is configured by the first connector housing 212*a* and the second connector housing 212*b* being combined.

The connector housing 212 holds the contact pins 211, and thereby the connector 110 is configured.

<<<Relay Device>>>

The relay device 220 is an element for electrically connecting the connector 210 (in detail, the plurality of contact pins 211) to the host board 51 and the cables 281.

Figure 21:
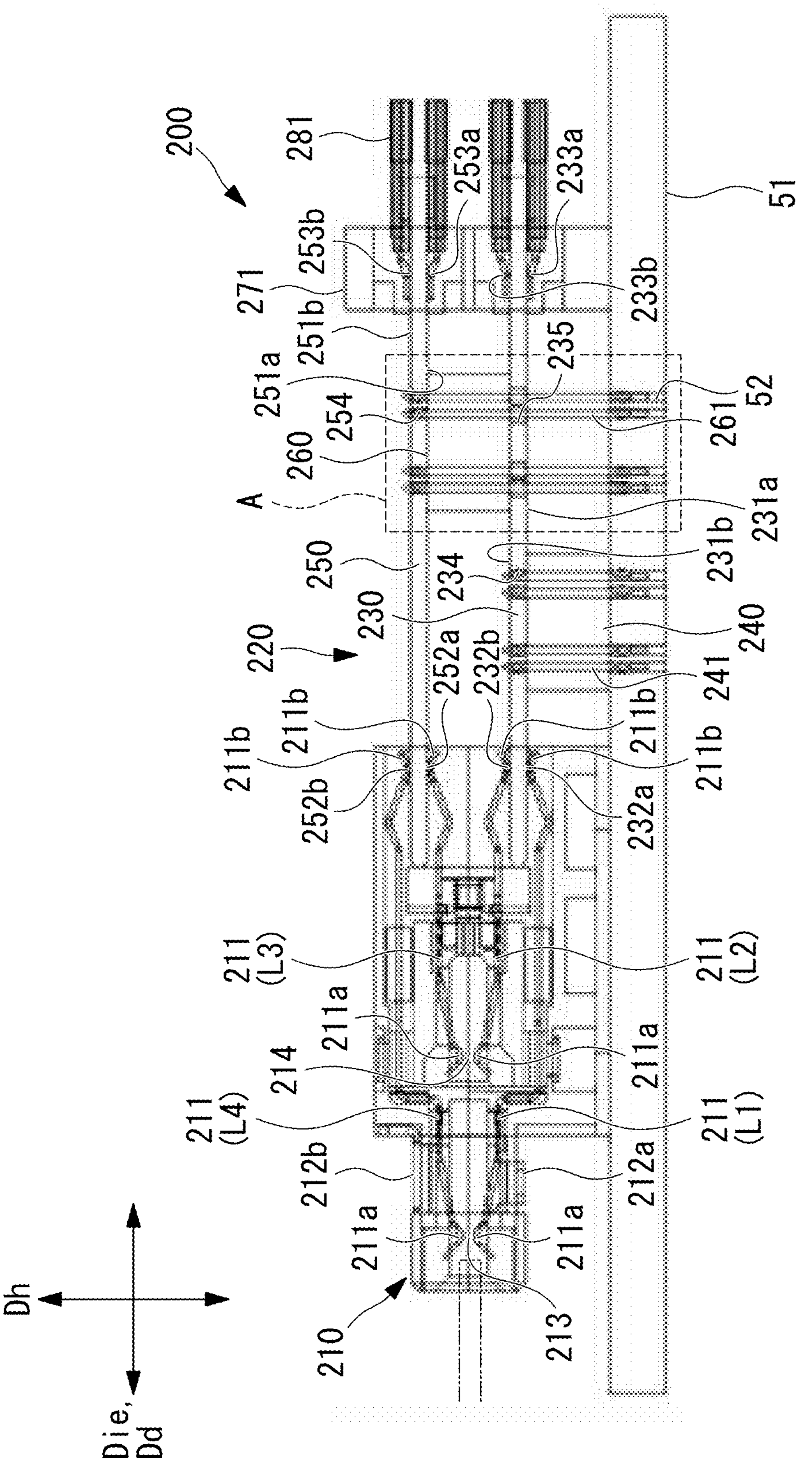
FIG. 21 is a sectional view of the connector assembly according to the second embodiment of the present invention.
Figure 22:
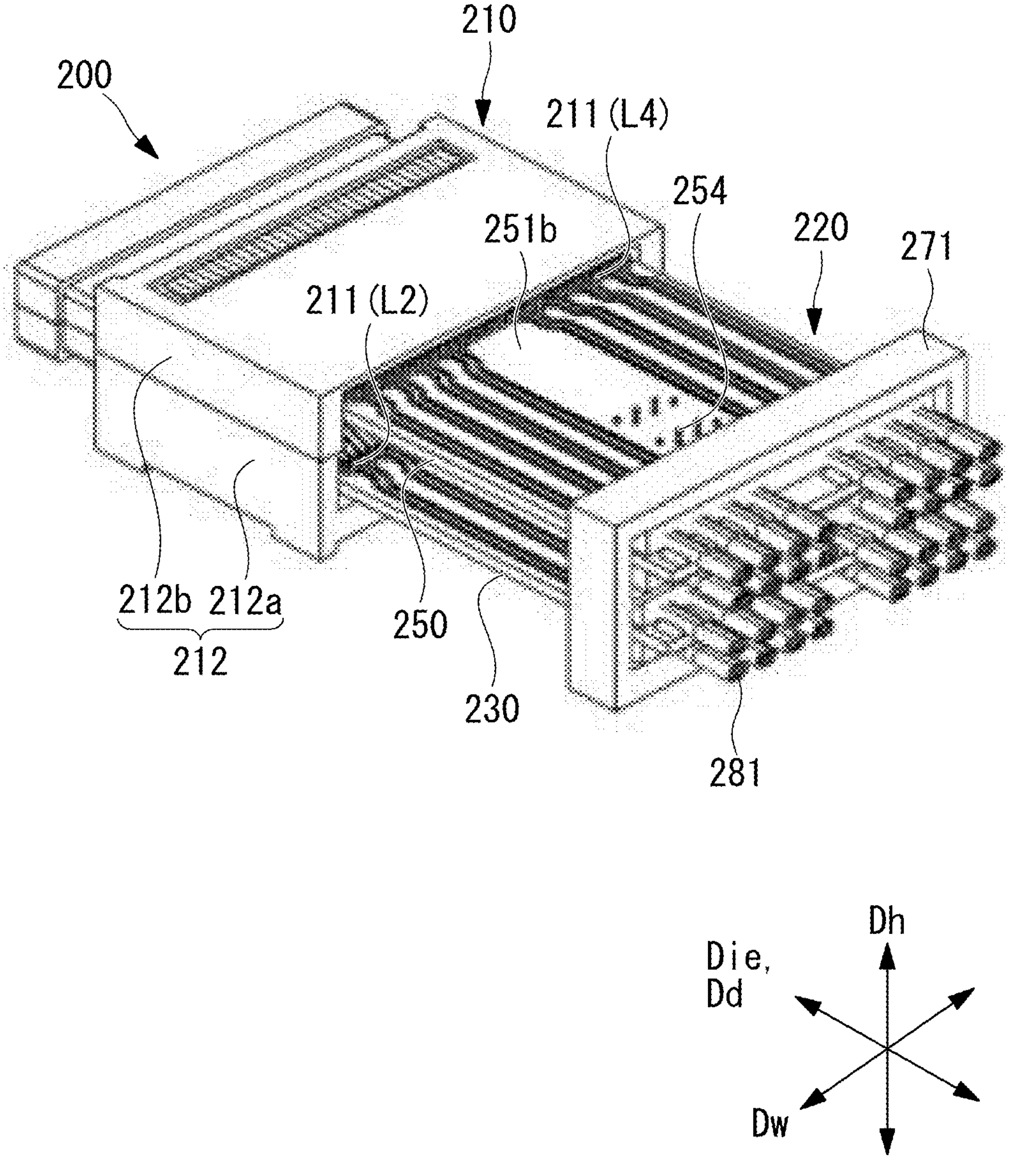
FIG. 22 is a perspective view of the connector assembly according to the second embodiment of the present invention when viewed from above.
Figure 23:
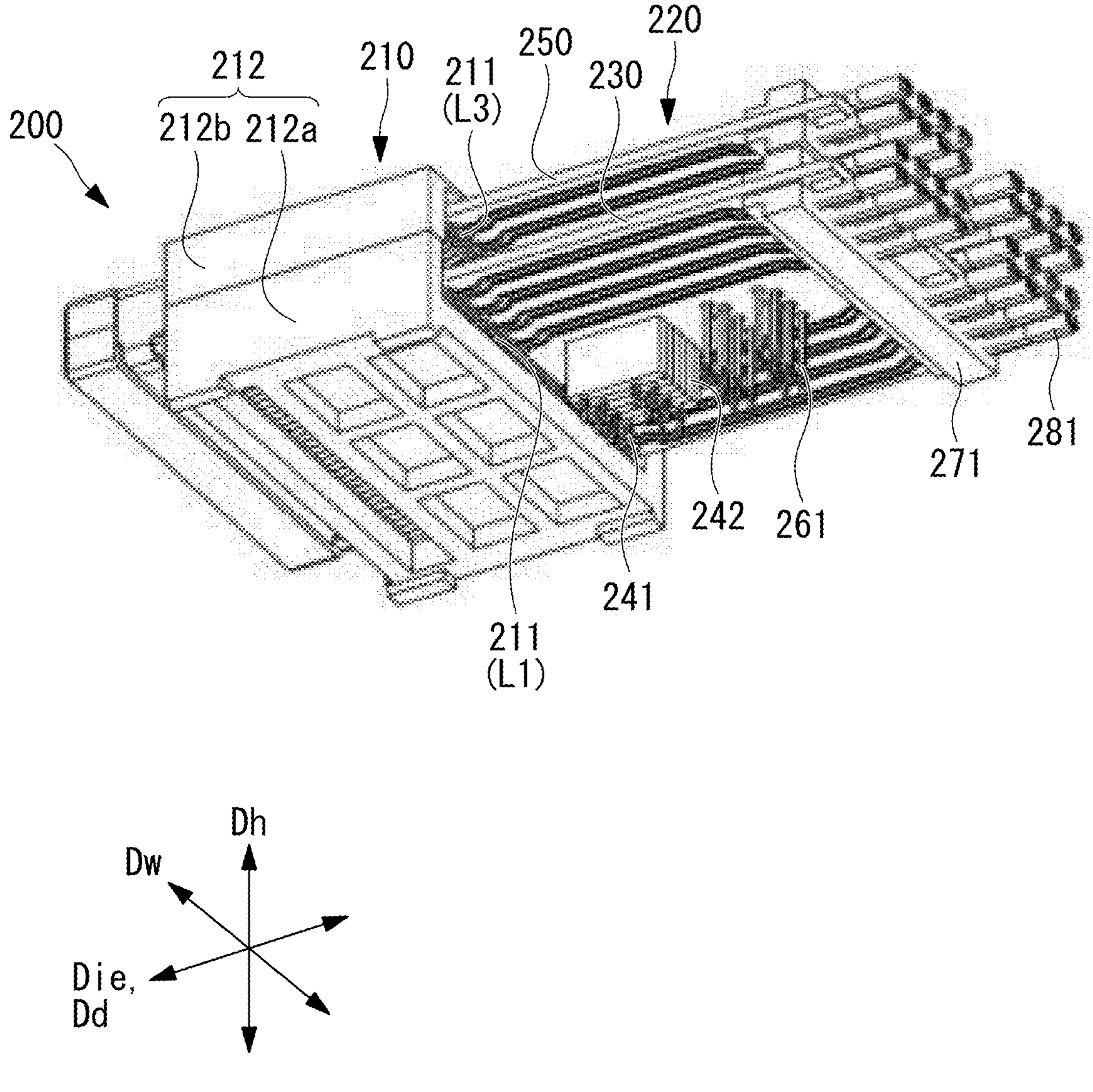
FIG. 23 is a perspective view of the connector assembly according to the second embodiment of the present invention when viewed from below.

As illustrated in FIG. 21 to FIG. 23, the relay device 220 has the first paddle board 230, a first connection part 240, the second paddle board 250, a second connection part 260, and a locator 271.

The first paddle board 230 and the second paddle board 250 each are an adapting board parallel to the host board 51.

The first paddle board 230 is arranged at a position closer to the host board 51 than the second paddle board 250 (arranged below the second paddle board 250) in the height direction Dh. Further, the second paddle board 250 is arranged at a position farther from the host board 51 than the first paddle board 230 (arranged above the first paddle board 230) in the height direction Dh.

The connector 210 is mounted on the front part of the first paddle board 230 and the second paddle board 250. Further, the locator 271 is mounted near the position connecting to the cables 281 present on the rear part of the first paddle board 230 and the second paddle board 250.

Figure 26:
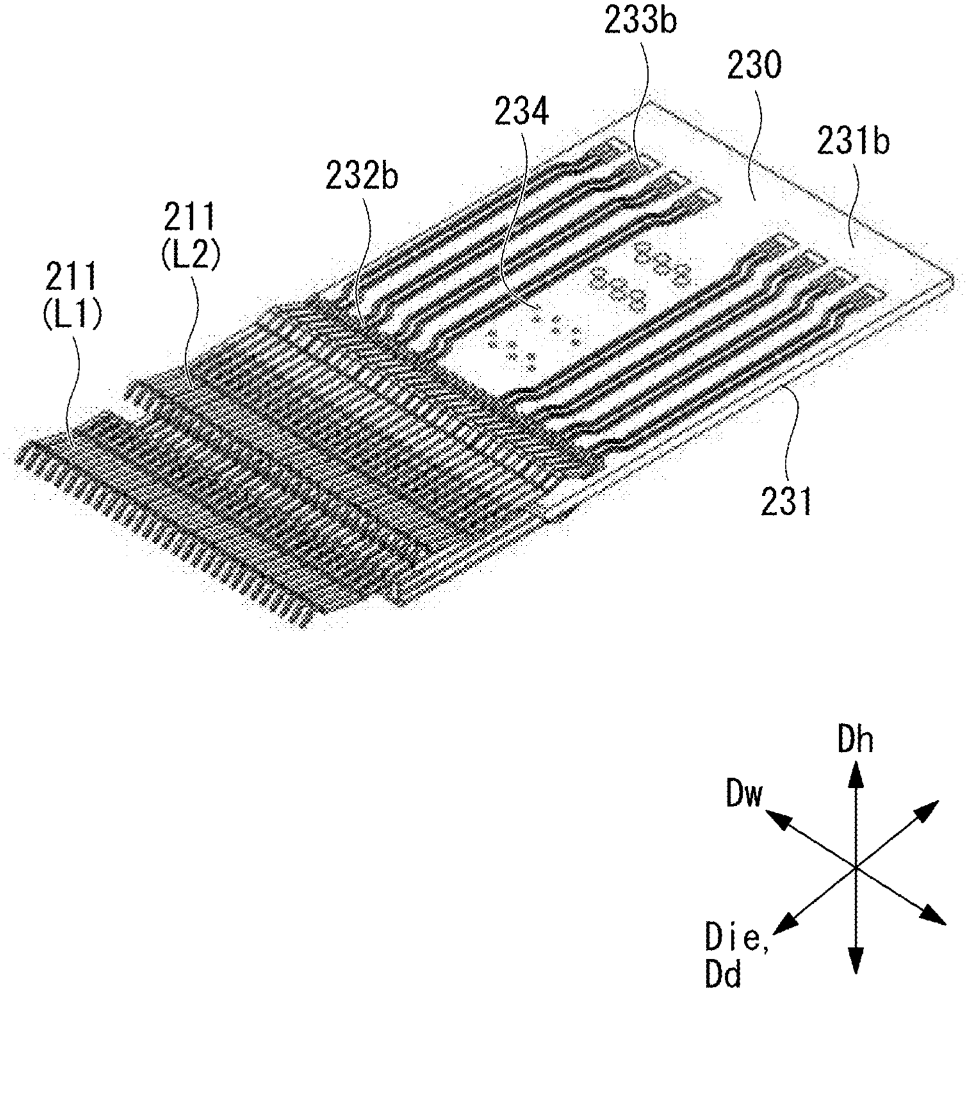
FIG. 26 is a perspective view of a portion including the first paddle board of the connector assembly according to the second embodiment of the present invention when viewed from above (the housing omitted).
Figure 27:
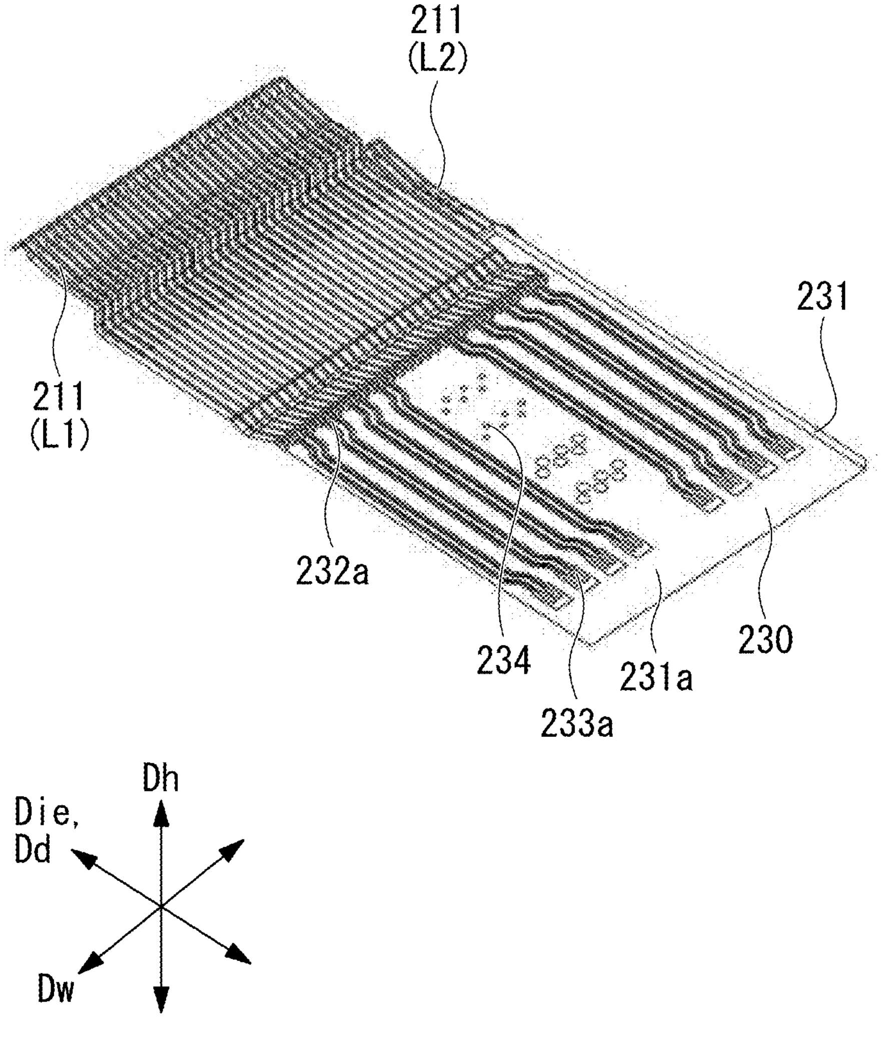
FIG. 27 is a perspective view of a portion including the first paddle board of the connector assembly according to the second embodiment of the present invention when viewed from below (the housing omitted).

As illustrated in FIG. 24, FIG. 26, and FIG. 27, the first paddle board 230 has the board body 231 and various electrodes.

The electrode as used herein is a portion used for conduction with the first paddle board 230 (board body 231) and includes first-first terminal-adapting electrodes 232*a* and first-second terminal-adapting electrodes 232*b*, first-first cable-adapting electrodes 233*a* and first-second cable-adapting electrodes 233*b*, and first plated through-holes 234 (connection terminal-adapting electrodes).

The board body 231 has a first-first face 231*a* facing the host board 51 and a first-second face 231*b* located opposite to the first-first face 231*a*.

In the case of FIG. 21, the first-first face 231*a* corresponds to the bottom face, and the first-second face 231*b* corresponds to the top face.

As illustrated in FIG. 27, at the front part of the first-first face 231*a*, a plurality of first-first terminal-adapting electrodes 232*a* are aligned on a straight line at an equal pitch along the width direction Dw.

The first-first terminal-adapting electrodes 232*a* are electrodes to which the base parts 211*b* of the contact pins 211 included in the first terminal line L1 of the connector 210 are connected (for example, soldered) by an electrically conductive material (for example, a solder material).

The first-first terminal-adapting electrodes 232*a* are associated with the contact pins 211 included in the first terminal line L1 in a one-to-one manner. Thus, the number of first-first terminal-adapting electrodes 232*a* is the same as the number of contact pins 211 included in the first terminal line L1.

As illustrated in FIG. 26, at the front part of the first-second face 231*b* on the opposite side to the line of the first-first terminal-adapting electrodes 232*a*, a plurality of first-second terminal-adapting electrodes 232*b* are aligned on a straight line at an equal pitch along the width direction Dw.

The first-second terminal-adapting electrodes 232*b* are electrodes to which the base parts 211*b* of the contact pins 211 included in the second terminal line L2 of the connector

210 are connected (for example, soldered) by an electrically conductive material (for example, a solder material).

The first-second terminal-adapting electrodes 232*b* are associated with the contact pins 211 included in the second terminal line L2 in a one-to-one manner. Thus, the number of first-second terminal-adapting electrodes 232*b* is the same as the number of contact pins 211 included in the second terminal line L2.

As illustrated in FIG. 27, on the rear side from the line of the first-first terminal-adapting electrodes 232*a* (at positions distant from the connector 210) on the first-first face 231*a*, a plurality of first-first cable-adapting electrodes 233*a* are aligned on a straight line along the width direction Dw.

The first-first cable-adapting electrodes 233*a* are electrodes to which conductive wirings of the cables 281 are connected.

The first-first cable-adapting electrodes 233*a* are electrically connected to the first-first terminal-adapting electrodes 232*a* via patterns (circuit) formed in the board body 231. However, not all of the first-first terminal-adapting electrodes 232*a* are electrically connected to the first-first cable-adapting electrodes 233*a* but some, but not all, of the plurality of first-first terminal-adapting electrodes 232*a* are electrically connected to the first-first cable-adapting electrodes 233*a*. Thus, the number of first-first cable-adapting electrodes 233*a* is less than the number of first-first terminal-adapting electrodes 232*a*.

As illustrated in FIG. 26, on the rear side from the line of the first-second terminal-adapting electrodes 232*b* on the opposite side to the first-first cable-adapting electrodes 233*a* on the first-second face 231*b*, a plurality of first-second cable-adapting electrodes 233*b* are aligned on a straight line along the width direction Dw.

The first-second cable-adapting electrodes 233*b* are electrically connected to the first-second terminal-adapting electrodes 232*b* via patterns formed in the board body 231. However, not all of the first-second terminal-adapting electrodes 232*b* are electrically connected to the first-second cable-adapting electrodes 233*b* but some, but not all, of the plurality of first-second terminal-adapting electrodes 232*b* are electrically connected to the first-second cable-adapting electrodes 233*b*. Thus, the number of first-second cable-adapting electrodes 233*b* is less than the number of first-second terminal-adapting electrodes 232*b*.

As illustrated in FIG. 21 and FIG. 24, the board body 231 is provided with a plurality of first plated through-holes 234 penetrating through the first-first face 231*a* and the first-second face 231*b*.

It is preferable that the first plated through-holes 234 be provided in the center portion of the board body 231 in the width direction Dw.

The first plated through-holes 234 are electrically connected to the first-first terminal-adapting electrodes 232*a* and/or the first-second terminal-adapting electrodes 232*b* via patterns formed in the board body 231. However, not all of the first-first terminal-adapting electrodes 232*a* and not all of the first-second terminal-adapting electrodes 232*b* are electrically connected to the first plated through-holes 234, but the first-first terminal-adapting electrodes 232*a* which are not electrically connected to the first-first cable-adapting electrodes 233*a* via patterns out of the plurality of first-first terminal-adapting electrodes 232*a* and the first-second terminal-adapting electrodes 232*b* which are not electrically connected to the first-second cable-adapting electrodes 233*b* via patterns out of the plurality of first-second terminal-adapting electrodes 232*b* are electrically connected to the first plated through-holes 234.

The first-first terminal-adapting electrodes 232*a* electrically connected to the first-first cable-adapting electrodes 233*a* via patterns are electrodes for high-speed signals input from an optical module. Thus, a high-speed signal input from the optical module will be transmitted through in the order of the contact pin 211 included in the first terminal line L1 of the connector 210, the first-first terminal-adapting electrode 232*a*, a pattern, the first-first cable-adapting electrode 233*a*, and the cable 281.

The first-second terminal-adapting electrodes 232*b* electrically connected to the first-second cable-adapting electrodes 233*b* via patterns are electrodes for high-speed signals input from an optical module. Thus, a high-speed signal input from the optical module will be transmitted through in the order of the contact pin 211 included in the second terminal line L2 of the connector 210, the first-second terminal-adapting electrode 232*b*, a pattern, the first-second cable-adapting electrode 233*b*, and the cable 281.

The first-first terminal-adapting electrodes 232*a* electrically connected to the first plated through-holes 234 via patterns are electrodes for signals other than the high-speed signals input from the optical modules. Thus, a signal other than the high-speed signals input from the optical module will be transmitted through in the order of the contact pin 211 included in the first terminal line L1 of the connector 210, the first-first terminal-adapting electrode 232*a*, a pattern, and the first plated through-hole 234. Note that the signal other than the high-speed signals input to the first plated through-holes 234 is transmitted to the host board 51 via each first press-fit pin 241 (first connection terminal) described later.

The signal other than high-speed signals as used herein means a low-speed signal, a power supply, or a ground.

The first-second terminal-adapting electrodes 232*b* electrically connected to the first plated through-holes 234 via patterns are electrodes for signals other than the high-speed signals input from the optical modules. Thus, a signal other than the high-speed signals input from the optical module will be transmitted through in the order of the contact pin 211 included in the second terminal line L2 of the connector 210, the first-second terminal-adapting electrode 232*b*, a pattern, and the first plated through-hole 234. Note that the signal other than the high-speed signals input to the first plated through-holes 234 is transmitted to the host board 51 via each first press-fit pin 241 described later.

As illustrated in FIG. 21, one ends of the plurality of cables 281 are connected to the first paddle board 230 configured as described above. In detail, a conductive wiring of each cable 281 is connected (for example, soldered) to each first-first cable-adapting electrode 233*a* and each first-second cable-adapting electrode 233*b* of the first paddle board 230 by an electrically conductive material (for example, a solder material).

On the other hand, the other ends of the plurality of cables 281 are connected to other terminals (not illustrated), other paddle boards, or the like.

Figure 28:
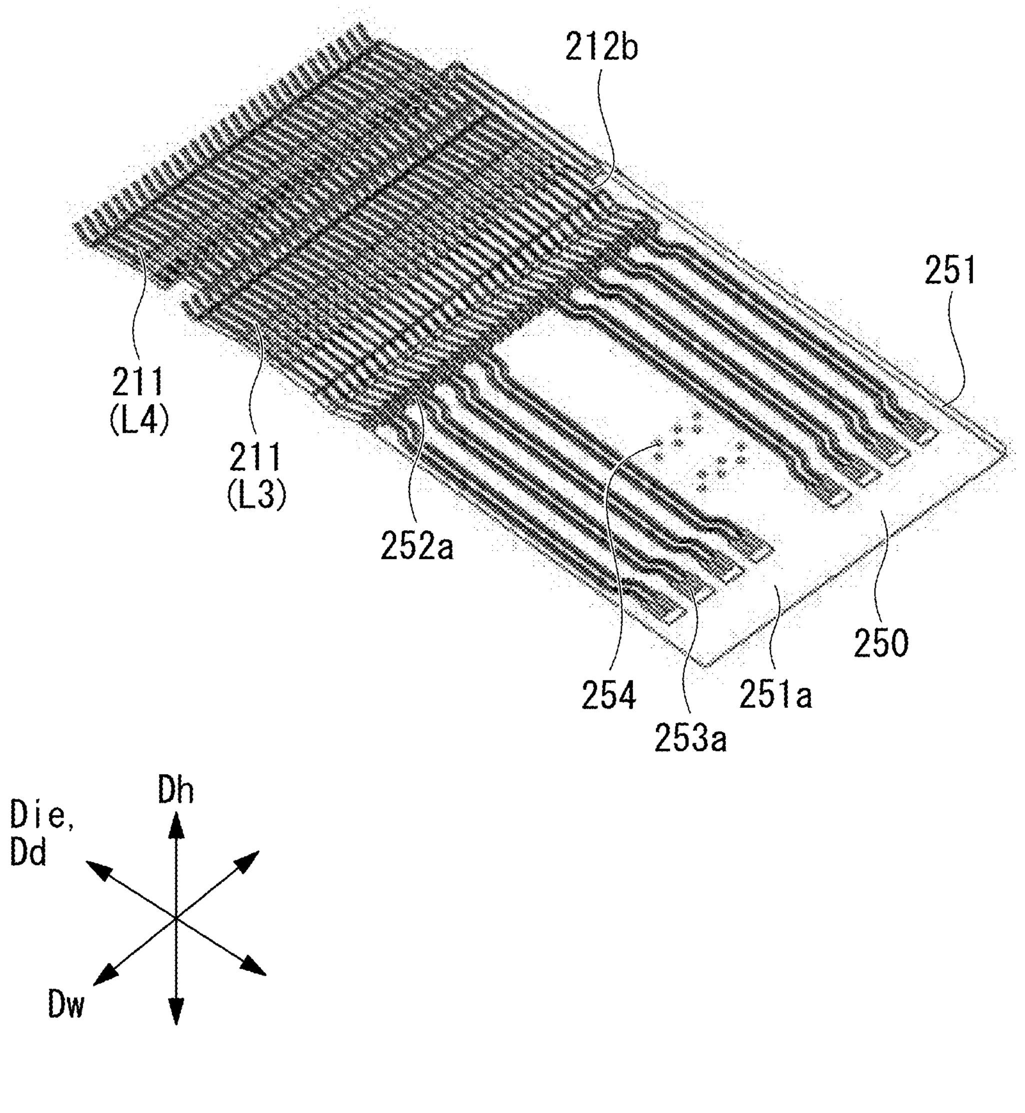
FIG. 28 is a perspective view of a portion including the second paddle board of the connector assembly according to the second embodiment of the present invention when viewed from below (the housing omitted).
Figure 29:
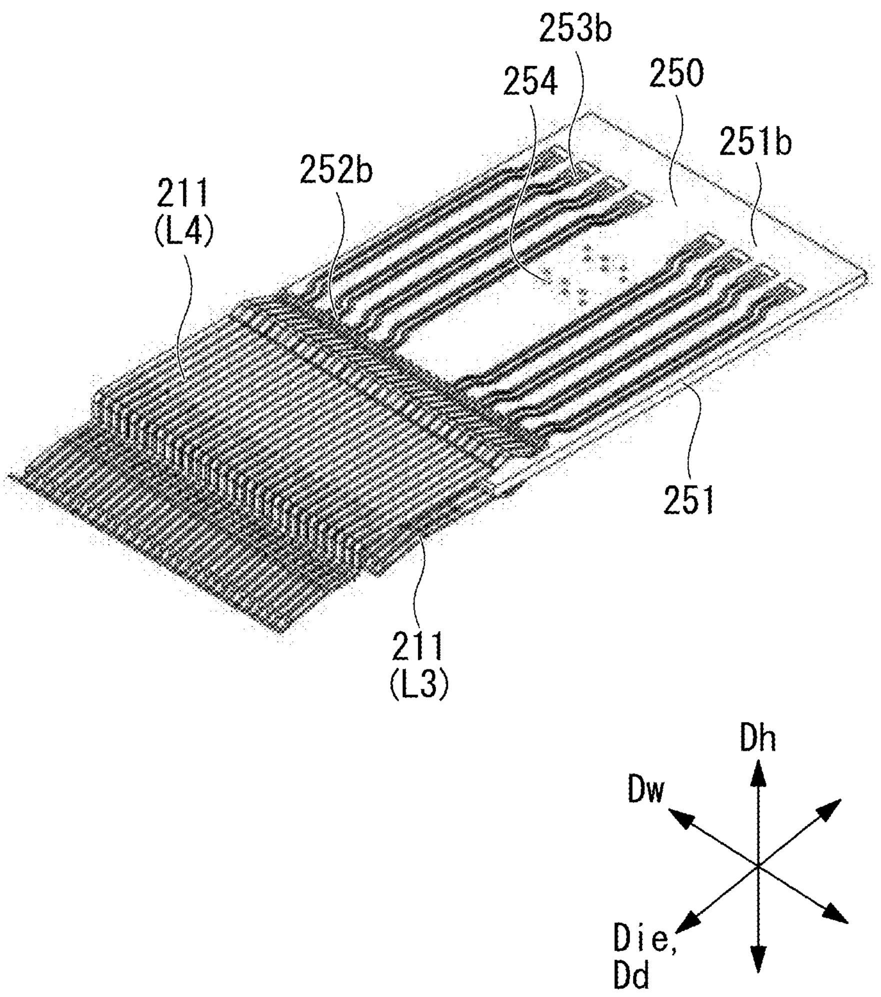
FIG. 29 is a perspective view of a portion including the second paddle board of the connector assembly according to the second embodiment of the present invention when viewed from above (the housing omitted).

As illustrated in FIG. 25, FIG. 28, and FIG. 29, the second paddle board 250 has the board body 251 and various electrodes.

The electrode as used herein is a portion used for conduction with the second paddle board 250 (board body 251) and includes second-first terminal-adapting electrodes 252*a* and second-second terminal-adapting electrodes 252*b*, second-first cable-adapting electrodes 253*a* and second-second cable-adapting electrodes 253*b*, and second plated through-holes 254 (connection terminal-adapting electrodes).

The board body 251 has a second-first face 251*a* facing the first-second face 231*b* of the board body 231 of the first paddle board 230 and a second-second face 251*b* located opposite to the second-first face 251*a*.

In the case of FIG. 21, the second-first face 251*a* corresponds to the bottom face, and the second-second face 251*b* corresponds to the top face.

As illustrated in FIG. 28, at the front part of the second-first face 251*a*, a plurality of second-first terminal-adapting electrodes 252*a* are aligned on a straight line at an equal pitch along the width direction Dw.

The second-first terminal-adapting electrodes 252*a* are electrodes to which the base parts 211*b* of the contact pins 211 included in the third terminal line L3 of the connector 210 are connected (for example, soldered) by an electrically conductive material (for example, a solder material).

The second-first terminal-adapting electrodes 252*a* are associated with the contact pins 211 included in the third terminal line L3 in a one-to-one manner. Thus, the number of second-first terminal-adapting electrodes 252*a* is the same as the number of contact pins 211 included in the third terminal line L3.

As illustrated in FIG. 29, at the front part of the second-second face 251*b* on the opposite side to the line of the second-first terminal-adapting electrodes 252*a*, a plurality of second-second terminal-adapting electrodes 252*b* are aligned on a straight line at an equal pitch along the width direction Dw.

The second-second terminal-adapting electrodes 252*b* are electrodes to which the base parts 211*b* of the contact pins 211 included in the fourth terminal line LA of the connector 210 are connected (for example, soldered) by an electrically conductive material (for example, a solder material).

The second-second terminal-adapting electrodes 252*b* are associated with the contact pins 211 included in the fourth terminal line LA in a one-to-one manner. Thus, the number of second-second terminal-adapting electrodes 252*b* is the same as the number of contact pins 211 included in the fourth terminal line LA.

As illustrated in FIG. 28, on the rear side from the line of the second-first terminal-adapting electrodes 252*a* (at positions distant from the connector 210) on the second-first face 251*a*, a plurality of second-first cable-adapting electrodes 253*a* are aligned on a straight line along the width direction Dw.

The second-first cable-adapting electrodes 253*a* are electrodes to which conductive wirings of the cables 281 are connected.

The second-first cable-adapting electrode 253*a* are electrically connected to the second-first terminal-adapting electrodes 252*a* via patterns (circuit) formed in the board body 251. However, not all of the second-first terminal-adapting electrodes 252*a* are electrically connected to the second-first cable-adapting electrodes 253*a* but some, but not all, of the plurality of second-first terminal-adapting electrodes 252*a* are electrically connected to the second-first cable-adapting electrodes 253*a*. Thus, the number of second-first cable-adapting electrodes 253*a* is less than the number of second-first terminal-adapting electrodes 252*a*.

As illustrated in FIG. 29, on the rear side from the line of the second-second terminal-adapting electrodes 252*b* on the opposite side to the second-first cable-adapting electrodes 253*a* on the second-second face 251*b*, a plurality of second-second cable-adapting electrodes 253*b* are aligned on a straight line along the width direction Dw.

The second-second cable-adapting electrodes 253*b* are electrically connected to the second-second terminal-adapting electrodes 252*b* via patterns formed in the board body 251. However, not all of the second-second terminal-adapting electrodes 252*b* are electrically connected to the second-second cable-adapting electrodes 253*b* but some, but not all, of the plurality of second-second terminal-adapting electrodes 252*b* are electrically connected to the second-second cable-adapting electrodes 253*b*. Thus, the number of second-second cable-adapting electrodes 253*b* is less than the number of second-second terminal-adapting electrodes 252*b*.

As illustrated in FIG. 21 and FIG. 25, the board body 251 is provided with a plurality of second plated through-holes 254 penetrating through the second-first face 251*a* and the second-second face 251*b*.

It is preferable that the second plated through-holes 254 be provided in the center portion of the board body 251 in the width direction Dw.

The second plated through-holes 254 are electrically connected to the second-first terminal-adapting electrodes 252*a* and/or the second-second terminal-adapting electrodes 252*b* via patterns formed in the board body 251. However, not all of the second-first terminal-adapting electrodes 252*a* and not all of the second-second terminal-adapting electrodes 252*b* are electrically connected to the second plated through-holes 254, but the second-first terminal-adapting electrodes 252*a* which are not electrically connected to the second-first cable-adapting electrodes 253*a* via patterns out of the plurality of second-first terminal-adapting electrodes 252*a* and the second-second terminal-adapting electrodes 252*b* which are not electrically connected to the second-second cable-adapting electrodes 253*b* via patterns out of the plurality of second-second terminal-adapting electrodes 252*b* are electrically connected to the second plated through-holes 254.

The second-first terminal-adapting electrodes 252*a* electrically connected to the second-first cable-adapting electrodes 253*a* via patterns are electrodes for high-speed signals input from an optical module. Thus, a high-speed signal input from the optical module will be transmitted through in the order of the contact pin 211 included in the third terminal line L3 of the connector 210, the second-first terminal-adapting electrode 252*a*, a pattern, the second-first cable-adapting electrode 253*a*, and the cable 281.

The second-second terminal-adapting electrodes 252*b* electrically connected to the second-second cable-adapting electrodes 253*b* via patterns are electrodes for high-speed signals input from an optical module. Thus, a high-speed signal input from the optical module will be transmitted through in the order of the contact pin 211 included in the fourth terminal line L4 of the connector 210, the second-second terminal-adapting electrode 252*b*, a pattern, the second-second cable-adapting electrode 253*b*, and the cable 281.

The second-first terminal-adapting electrodes 252*a* electrically connected to the second plated through-holes 254 via patterns are electrodes for signals other than the high-speed signals input from the optical modules. Thus, a signal other than the high-speed signals input from the optical module will be transmitted through in the order of the contact pin 211 included in the third terminal line L3 of the connector 210, the second-first terminal-adapting electrode 252*a*, a pattern, and the second plated through-hole 254. Note that the signal other than the high-speed signals input to the second plated through-holes 254 is transmitted to the host board 51 via each second press-fit pin 261 (second connection terminal) described later.

The signal other than high-speed signals as used herein means a low-speed signal, a power supply, or a ground.

The second-second terminal-adapting electrodes 252*b* electrically connected to the second plated through-holes 254 via patterns are electrodes for signals other than the high-speed signals input from the optical modules. Thus, a signal other than the high-speed signals input from the optical module will be transmitted through in the order of the contact pin 211 included in the fourth terminal line LA of the connector 210, the second-second terminal-adapting electrode 252*b*, a pattern, and the second plated through-hole 254. Note that the signal other than the high-speed signals input to the second plated through-holes 254 is transmitted to the host board 51 via the second press-fit pin 261 described later.

As illustrated in FIG. 21, one ends of the plurality of cables 281 are connected to the second paddle board 250 configured as described above. In detail, a conductive wiring of each cable 281 is connected (for example, soldered) to each second-first cable-adapting electrode 253*a* and each second-second cable-adapting electrode 253*b* of the second paddle board 250 by an electrically conductive material (for example, a solder material).

On the other hand, the other ends of the plurality of cables 281 are connected to other terminals (not illustrated), other paddle boards, or the like.

The first connection part 240 is a portion for electrically connecting the first paddle board 230 to the host board 51 and is mounted below the first paddle board 230.

Figure 30:
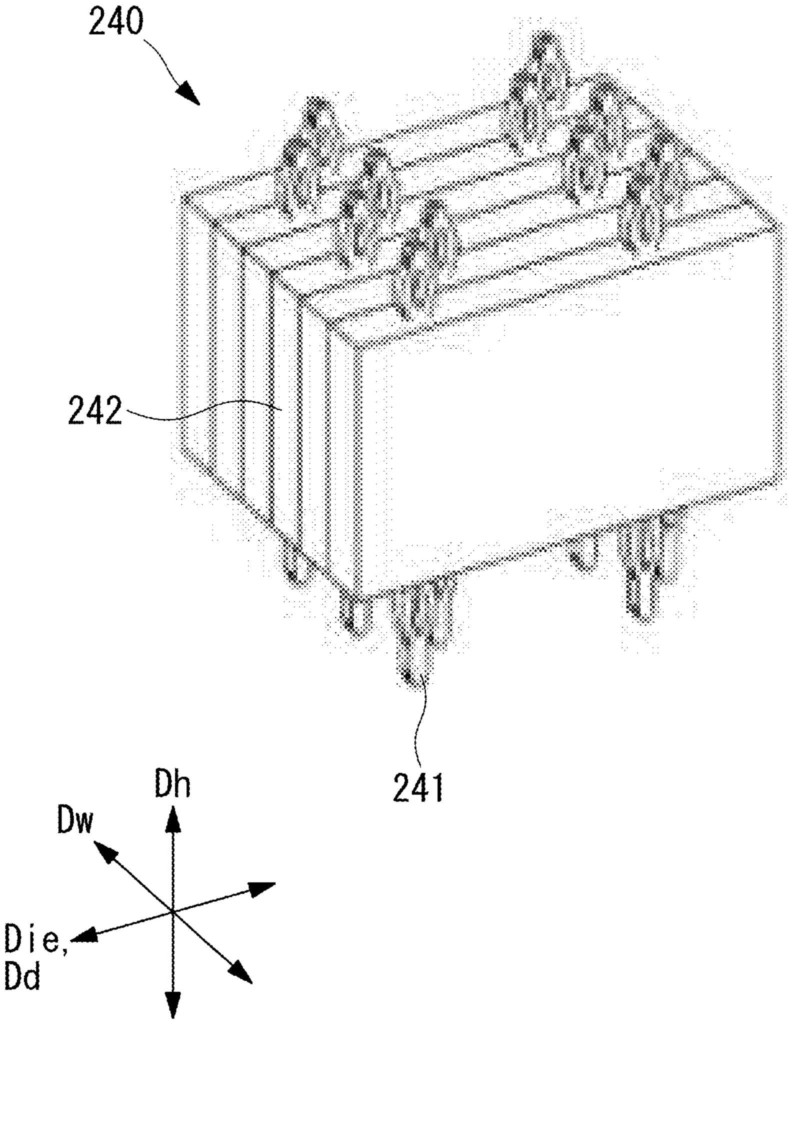
FIG. 30 is a perspective view of a first connection part.

As illustrated in FIG. 21 and FIG. 30, the first connection part 240 has a plurality of first press-fit pins 241 and a first housing 242.

Each of the first press-fit pins 241 is a component for electrically connecting the first paddle board 230 to the host board 51.

The first press-fit pin 241 has electrical conductivity.

The plurality of first press-fit pins 241 are housed in the first housing 242 made of a resin, and the circumferences thereof are individually surrounded by the first housing 242. However, both ends of the first press-fit pins 241 project out of the first housing 242. An elastic press-fit part that can be press-fitted into a plated through-hole is included in both the ends.

One end (one press-fit part) of the first press-fit pin 241 projecting out of the first housing 242 is press-fitted into the first plated through-hole 234 (the inner circumferential face thereof is plated) of the first paddle board 230. On the other hand, the other end (the other press-fit part) of the first press-fit pin 241 projecting out of the first housing 242 is press-fitted into the plated through-hole 52 provided in the host board 51. Thus, each first press-fit pin 241 extends in the height direction Dh from the first paddle board 230 toward the host board 51, one end thereof is connected to the first paddle board 230, and the other end is connected to the host board 51. Accordingly, the first paddle board 230 is electrically connected to the host board 51.

When the first paddle board 230 (the first plated through-holes 234 of the first paddle board 230) has been electrically connected to the host board 51 by the first press-fit pins 241, the first-first terminal-adapting electrodes 232*a* and the first-second terminal-adapting electrodes 232*b* electrically connected to the first plated through-holes 234 via patterns formed in the first paddle board 230 are electrically connected to the host board 51 via the first press-fit pins 241. Thus, a signal other than high-speed signals input from an optical module will be transmitted through in the order of the contact pin 211 of the connector 210, the first-first terminal-adapting electrode 232*a*/the first-second terminal-adapting electrode 232*b*, a pattern, the first plated through-hole 234, the first press-fit pin 241, and the host board 51.

The second connection part 260 is a portion for electrically connecting the second paddle board 250 to the host board 51 and is mounted below the second paddle board 250.

Herein, the second connection part 260 will be described with several examples.

Example 1 of Second Connection Part 260

Figure 31:
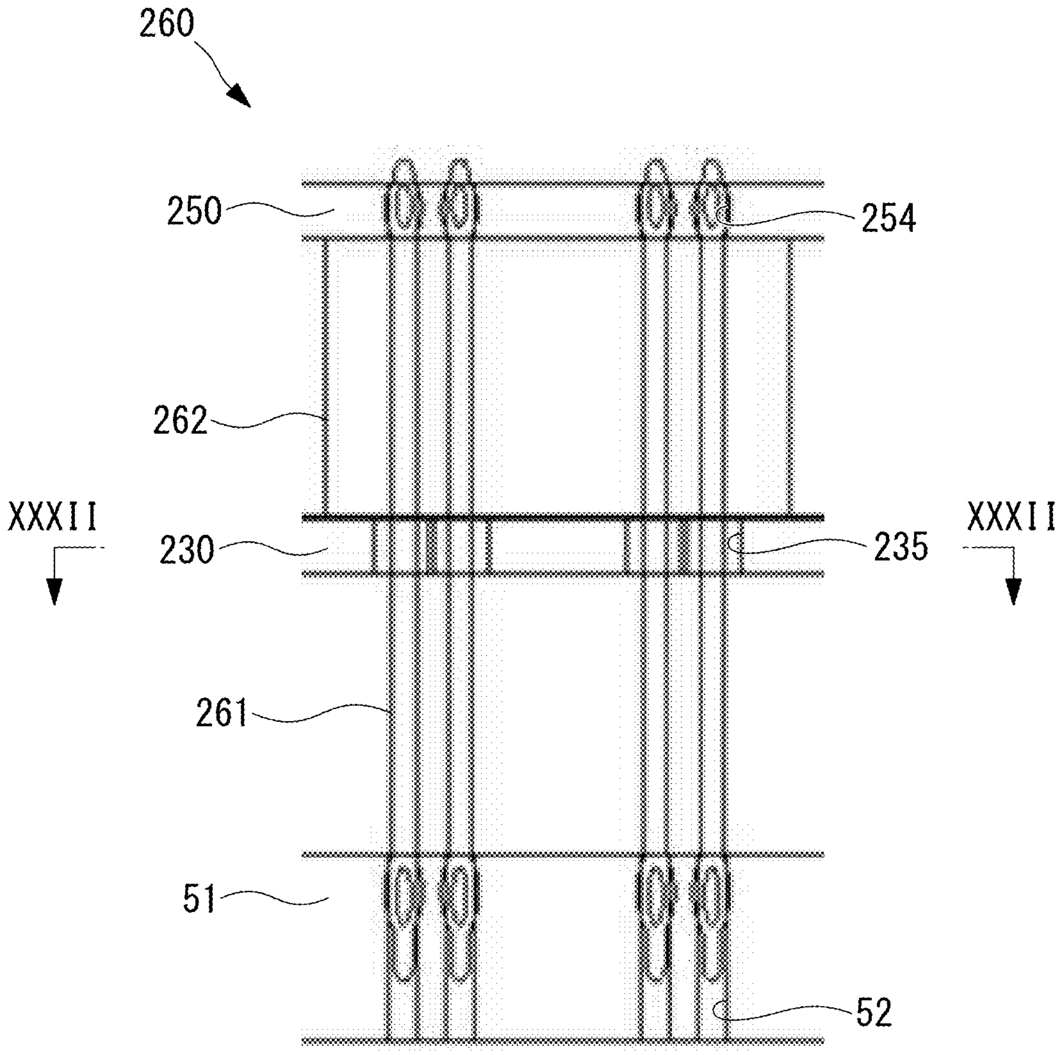
FIG. 31 is a partial enlarged view of the part A illustrated in FIG. 21 (in a case of Example 1).
Figure 32:
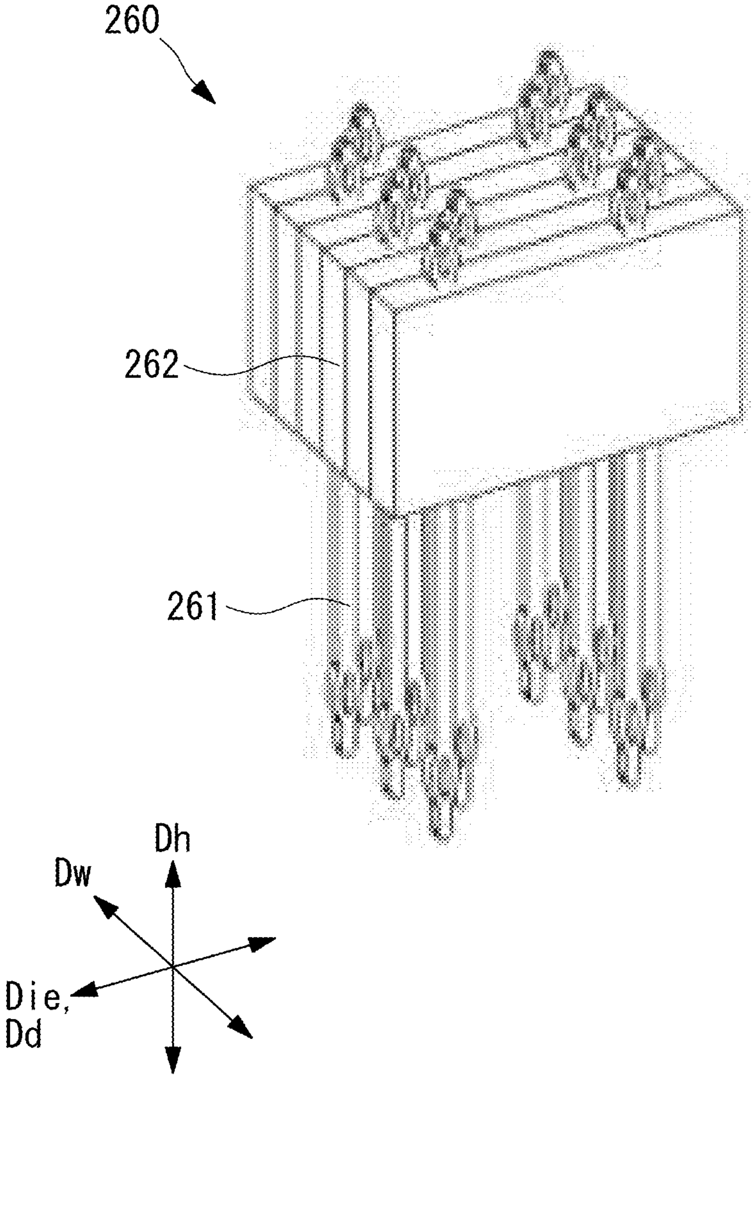
FIG. 32 is a perspective view of a second connection part according to Example 1.

As illustrated in FIG. 31 and FIG. 32, the second connection part 260 of this example has a plurality of second press-fit pins 261 and a second housing 262.

Each of the second press-fit pins 261 is a component for electrically connecting the second paddle board 250 to the host board 51.

The second press-fit pin 261 has electrical conductivity.

The plurality of second press-fit pins 261 are housed in the second housing 262 made of a resin, and the circumferences thereof are individually surrounded by the second housing 262. However, both ends of the second press-fit pins 261 project out of the second housing 262. An elastic press-fit part that can be press-fitted into a through-hole is included in both the ends.

The second housing 262 is arranged between the first-second face 231*b* of the first paddle board 230 and the second-first face 251*a* of the second paddle board 250 in the height direction Dh. Thus, the second housing 262 houses each portion of the second press-fit pins 261 which is present between the first paddle board 230 and the second paddle board 250 in the height direction Dh.

One end (one press-fit part) of the second press-fit pin 261 projecting out of the second housing 262 is press-fitted into the second plated through-hole 254 (the inner circumferential face thereof is plated) of the second paddle board 250. On the other hand, the other end (the other press-fit part) of the second press-fit pin 261 projecting out of the second housing 262 is press-fitted into the plated through-hole 52 provided in the host board 51. Thus, each second press-fit pin 261 extends in the height direction Dh from the second paddle board 250 toward the host board 51, one end thereof is connected to the second paddle board 250, and the other end is connected to the host board 51. Accordingly, the second paddle board 250 is electrically connected to the host board 51.

The second press-fit pin 261 is required to pass through the first paddle board 230 in order for the other end of the second press-fit pin 261 projecting out of the second housing 262 to reach the plated through-hole 52 provided on the host board 51.

Figure 33:
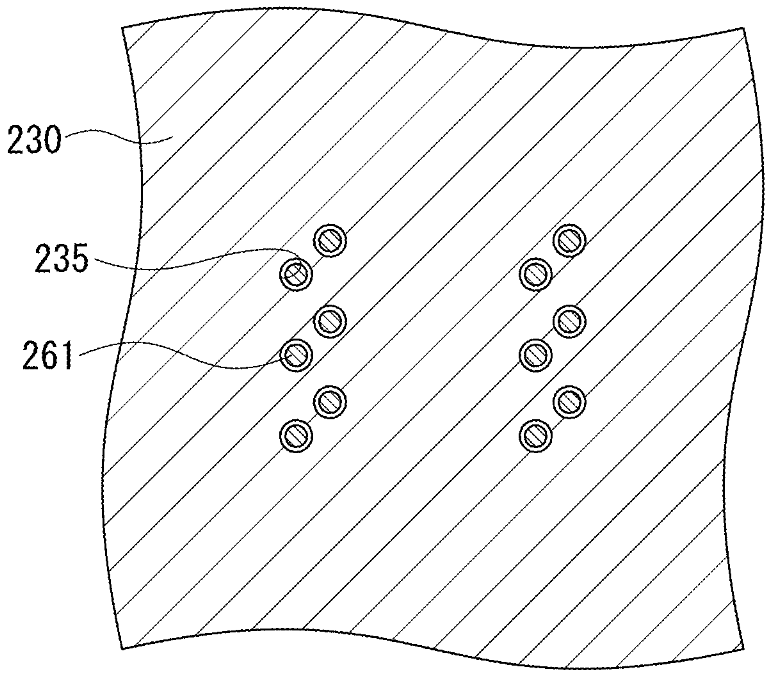
FIG. 33 is a sectional view taken along a cut line XXXII-XXXII illustrated in FIG. 31.

To address this, in this example, a plurality of holes 235 are provided in the first paddle board 230, as illustrated in FIG. 31 and FIG. 33.

Each of the holes 235 is a hole penetrating between the first-first face 231*a* and the first-second face 231*b*, and the second press-fit pin 261 is inserted through the hole along the height direction Dh.

Each second press-fit pin 261 is individually inserted through each hole 235. Therefore, the number of holes 235 is the same as the number of second press-fit pins 261.

Example 2 of Second Connection Part 260

Figure 34:
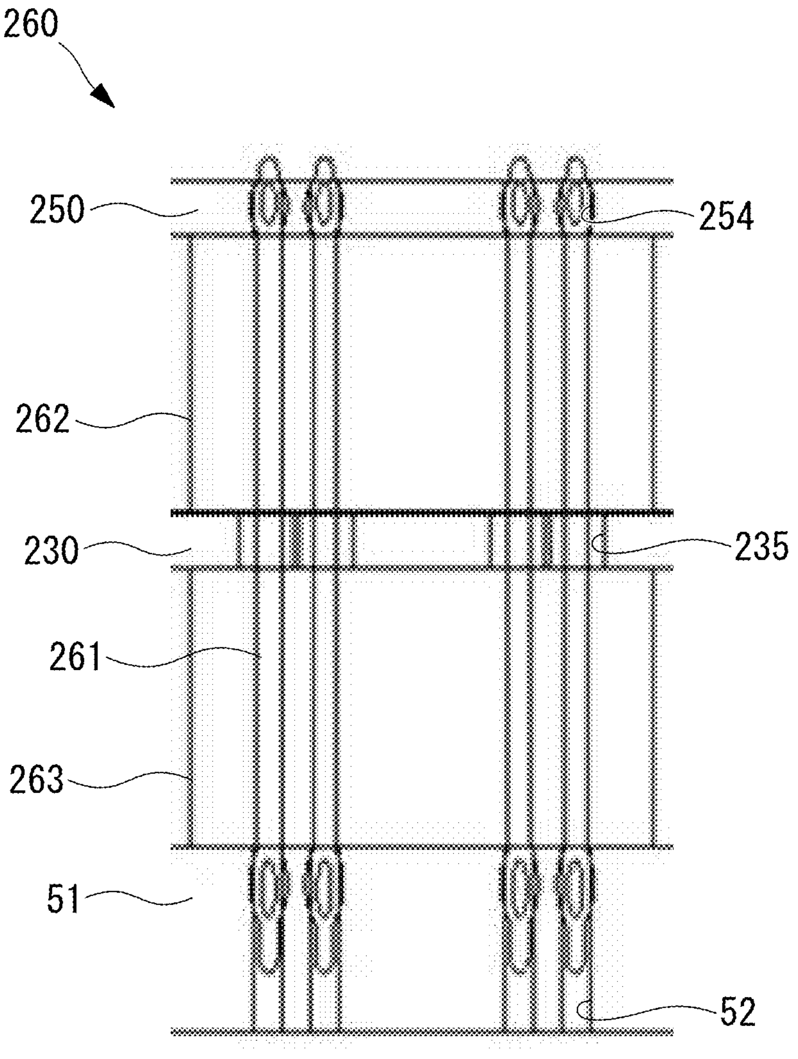
FIG. 34 is a partial enlarged view of the part A illustrated in FIG. 21 (in a case of Example 2).

As illustrated in FIG. 34, the second connection part 260 of this example has a third housing 263 in addition to the configuration of Example 1.

The third housing 263 is arranged between the host board 51 and the first-first face 231*a* of the first paddle board 230 in the height direction Dh. Thus, the third housing 263 houses each portion of the second press-fit pins 261 (that is also a portion projecting out of the second housing 262) which is present between the host board 51 and the first paddle board 230 in the height direction Dh. However, the end of the second press-fit pin 261 projects out of the third housing 263. This end includes an elastic press-fit part that can be press-fitted into a plated through-hole.

One end (one press-fit part) of the second press-fit pin 261 projecting out of the second housing 262 is press-fitted into the second plated through-hole 254 of the second paddle board 250. On the other hand, the other end (the other press-fit part) of the second press-fit pin 261 projecting out of the third housing 263 is press-fitted into the plated through-hole 52 provided in the host board 51. Accordingly, the second paddle board 250 is electrically connected to the host board 51.

Example 3 of Second Connection Part 260

Figure 35:
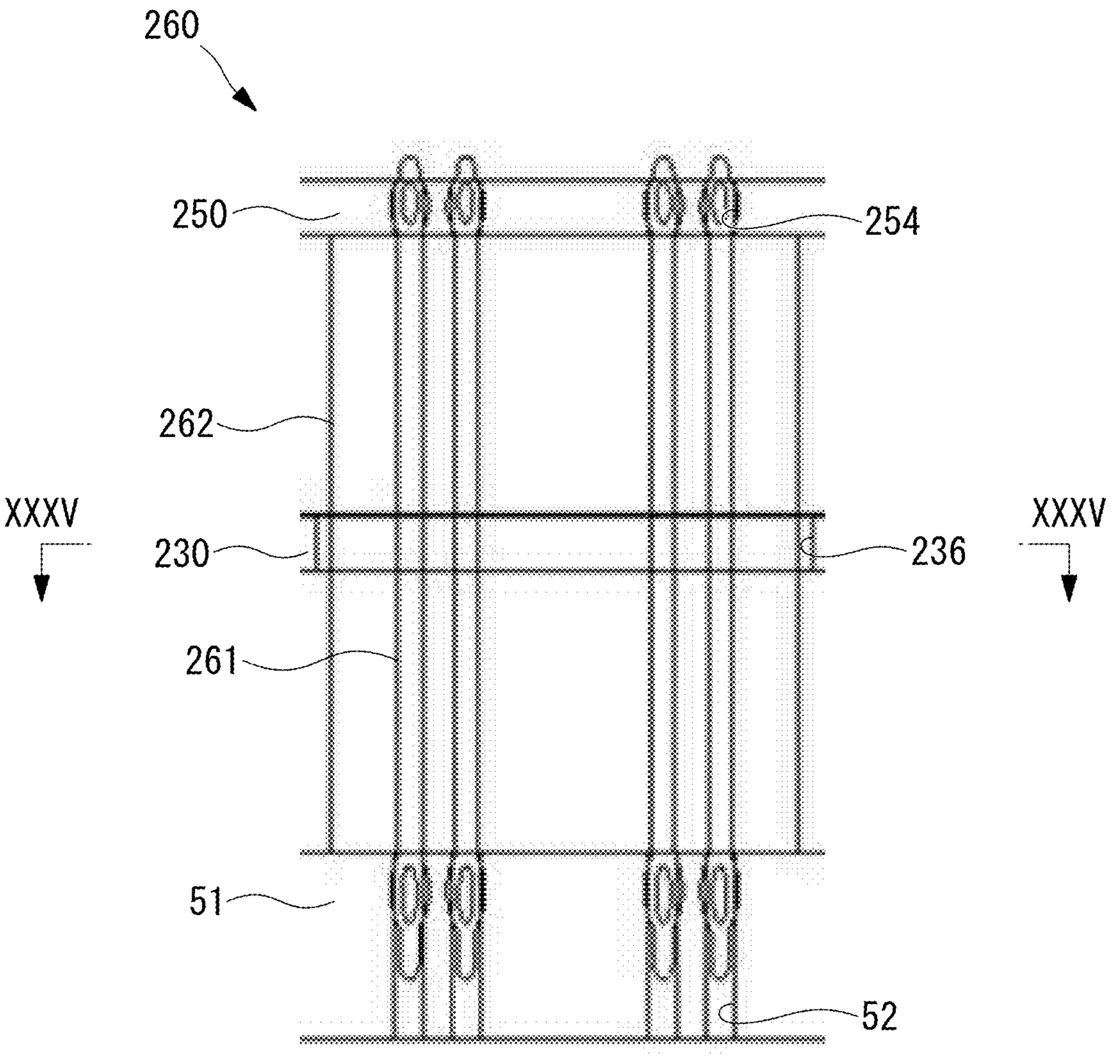
FIG. 35 is a partial enlarged view of the part A illustrated in FIG. 21 (in a case of Example 3).
Figure 36:
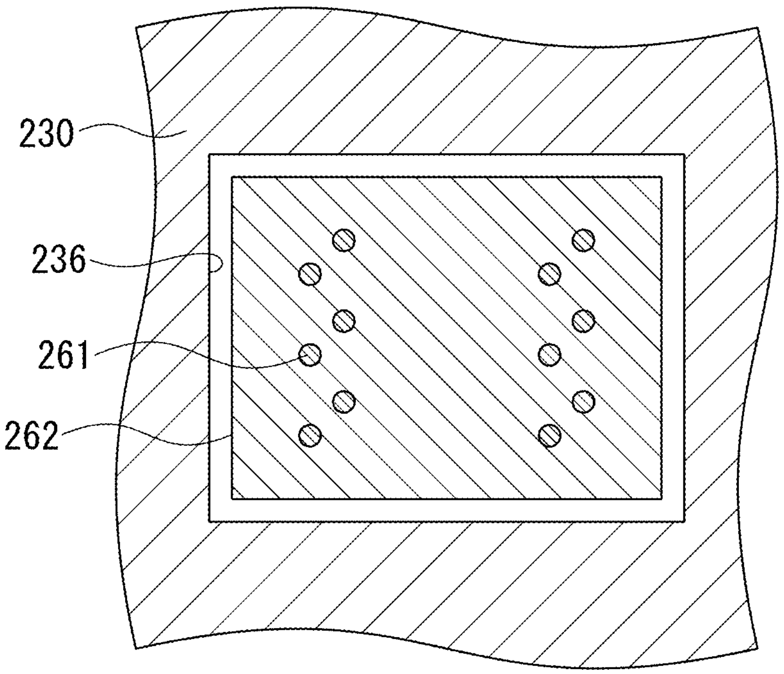
FIG. 36 is a sectional view taken along a cut line XXXV-XXXV illustrated in FIG. 35.

As illustrated in FIG. 35 and FIG. 36, the second connection part 260 of this example has a plurality of second press-fit pins 261 and a second housing 262'.

The second housing 262' is a modified example to the second housing 262 described in Example 1 of the second connection part 260.

The second press-fit pin 261 has the same configuration as that in Example 1. Thus, the description thereof will be omitted here.

The plurality of second press-fit pins 261 are housed in the second housing 262' made of a resin, and the circumferences thereof are individually surrounded by the second housing 262'. However, both ends of the second press-fit pins 261 project out of the second housing 262'. An elastic press-fit part that can be press-fitted into a plated through-hole is included in both the ends.

The second housing 262' is arranged between the host board 51 and the second-first face 251*a* of the second paddle board 250 in the height direction Dh. Thus, the second housing 262' houses each portion of the second press-fit pins 261 which is present between the host board 51 and the second paddle board 250 in the height direction Dh.

One end (one press-fit part) of the second press-fit pin 261 projecting out of the second housing 262' is press-fitted into the second plated through-hole 254 of the second paddle board 250. On the other hand, the other end (the other press-fit part) of the second press-fit pin 261 projecting out of the second housing 262' is press-fitted into the plated through-hole 52 provided in the host board 51. Thus, each second press-fit pin 261 extends in the height direction Dh from the second paddle board 250 toward the host board 51, one end thereof is connected to the second paddle board 250, and the other end is connected to the host board 51. Accordingly, the second paddle board 250 is electrically connected to the host board 51.

The second housing 262' is required to pass through the first paddle board 230 in order for the second housing 262' to be present between the host board 51 and the second paddle board 250.

To address this, in this example, a single opening 236 is provided in the first paddle board 230.

The opening 236 is an opening (window) penetrating between the first-first face 231*a* and the first-second face 231*b*, and the second housing 262' is inserted through the opening along the height direction Dh. It goes without saying that all the second press-fit pins 261 pass through the single opening 236 at the same time.

In the second connection part 260 described in Example 1 to Example 3, when the second paddle board 250 (the second plated through-holes 254 of the second paddle board 250) has been electrically connected to the host board 51 by the second press-fit pins 261, the second-first terminal-adapting electrodes 252*a* and the second-second terminal-adapting electrodes 252*b* electrically connected to the second plated through-holes 254 via patterns formed in the second paddle board 250 are electrically connected to the host board 51 via the second press-fit pins 261. Thus, a signal other than high-speed signals input from an optical module will be transmitted through in the order of the contact pin 211 of the connector 210, the second-first terminal-adapting electrode 252*a*/the second-second terminal-adapting electrode 252*b*, a pattern, the second plated through-hole 254, the second press-fit pin 261, and the host board 51.

<<Advantageous Effects of Second Embodiment>>

The first connection part 240 has a plurality of first press-fit pins 241, the plurality of first press-fit pins 241 electrically connect the first paddle board 230 to the host board 51, the second connection part 260 has a plurality of second press-fit pins 261, and the plurality of second press-fit pins 261 electrically connect the second paddle board 250 to the host board 51. It is thus possible to electrically connect the contact pins 211 to the host board 51 via the relay device 220 (the first paddle board 230 and the first press-fit pins 241 and also the second paddle board 250 and the second press-fit pins 261) without bending the contact pins 211 toward the host board 51.

Further, the first connection part 240 has the first housing 242, the first housing 242 houses the plurality of first press-fit pins 241, the second connection part 260 has the second housing 262, 262', and the second housing 262, 262' houses the plurality of second press-fit pins 261. Thus, the possibility of a foreign material attaching to the first press-fit pins 241 and the second press-fit pins 261 can be reduced.

Further, the use of the press-fit pins enables connection to the first paddle board 230 and the second paddle board 250 and to the host board 51 in a simplified manner.

Further, since the first paddle board 230 is provided with a plurality of holes 235 into which the plurality of second press-fit pins 261 are individually inserted, it is possible to allow the second press-fit pins 261 to reach the host board 51 while minimizing the area of the first paddle board 230 to be removed.

Further, the second housing 262 is arranged between the first paddle board 230 and the second paddle board 250 and houses each portion of the second press-fit pins 261 which is present between the first paddle board 230 and the second paddle board 250, and thus the structure is simplified and ease of assembly can be improved compared to a case where another portion of the second press-fit pins 261 is housed in another housing.

Further, since the third housing 263 is arranged between the host board 51 and the first paddle board 230 and houses each portion of the second press-fit pins 261 that is present between the host board 51 and the first paddle board 230, the possibility of a foreign material attaching to a part of the second press-fit pin 261 (a portion present between the host board 51 and the first paddle board 230) can be reduced.

Further, since the first paddle board 230 is provided with the opening 236 through which the second housing 262' is inserted, this enables the second housing 262' to reach the host board 51.

Further, since the second housing 262' is arranged between the host board 51 and the second paddle board 250 and houses the second press-fit pins 261 present between the host board 51 and the second paddle board 250, the possibility of a foreign material attaching to the entire second press-fit pin 261 can be reduced.

Further, since the second housing 262' is not divided in a region between the host board 51 and the second paddle board 250, the structure can be simplified, and ease of assembly can be improved.

Further, the first paddle board 230 and the second paddle board 250 are arranged substantially parallel to each other, the first terminal line L1 is connected to the first-first face 231*a* of the first paddle board 230, the second terminal line L2 is connected to the first-second face 231*b* of the first paddle board 230 located opposite to the first-first face 231*a*, the third terminal line L3 is connected to the second-first face 251*a* of the second paddle board 250, and the fourth terminal line LA is connected to the second-second face 251*b* of the second paddle board 250 located opposite to the second-first face 251*a*. Thus, only a single set of terminal lines is required to be connected to each of the first-first face 231*a* to the second-second face 251*b*, and the impact of crosstalk can be reduced compared to a case where two sets of terminal lines are connected to a single face, for example. If two sets of terminal lines are connected to a single face, the two terminal lines would be close to each other in the height direction Dh, which would result in larger crosstalk.

Modified Example 1 of Second Embodiment

Figure 37:
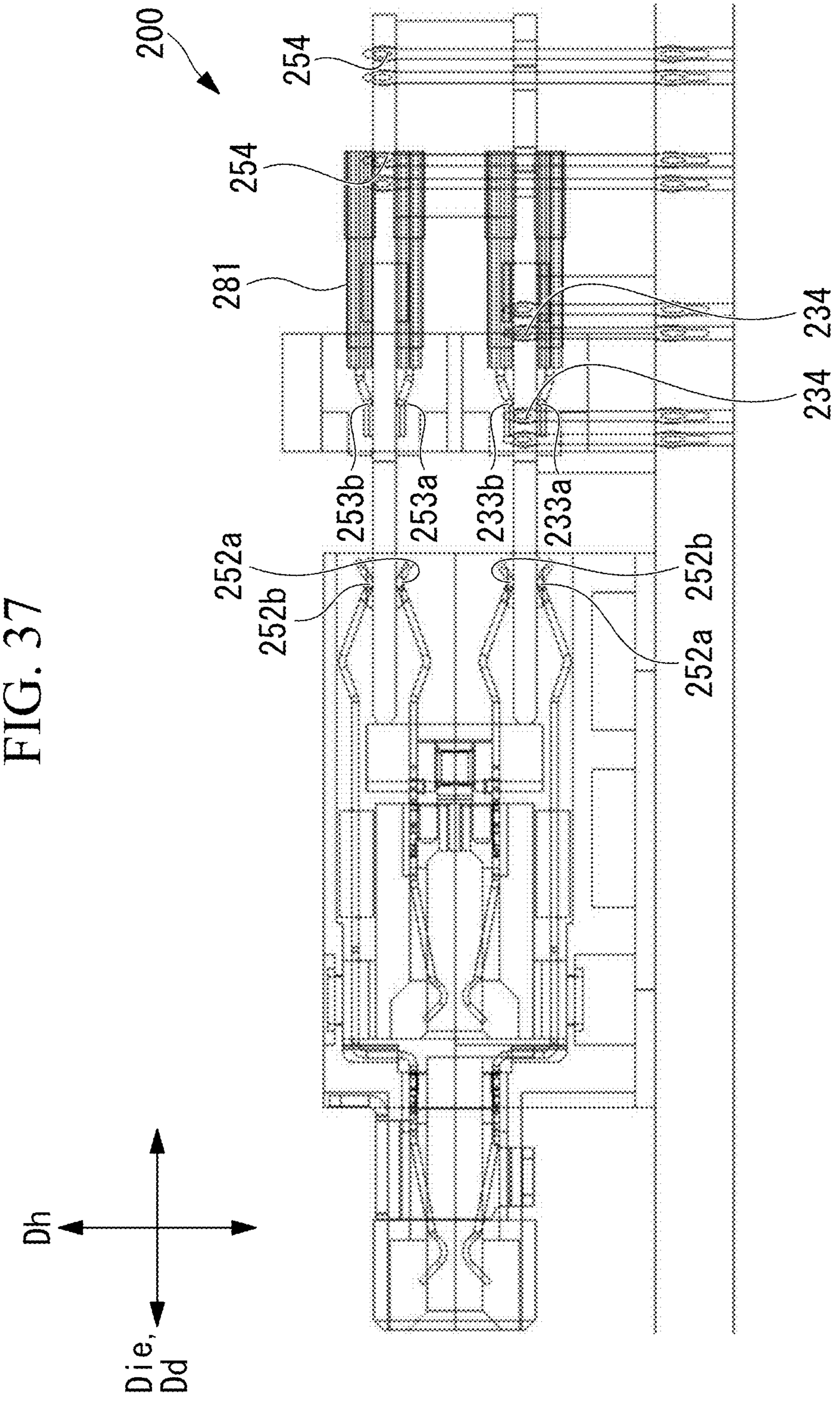
FIG. 37 is a sectional view of a connector assembly according to Modified example 1 of the second embodiment of the present invention.
Figure 38:
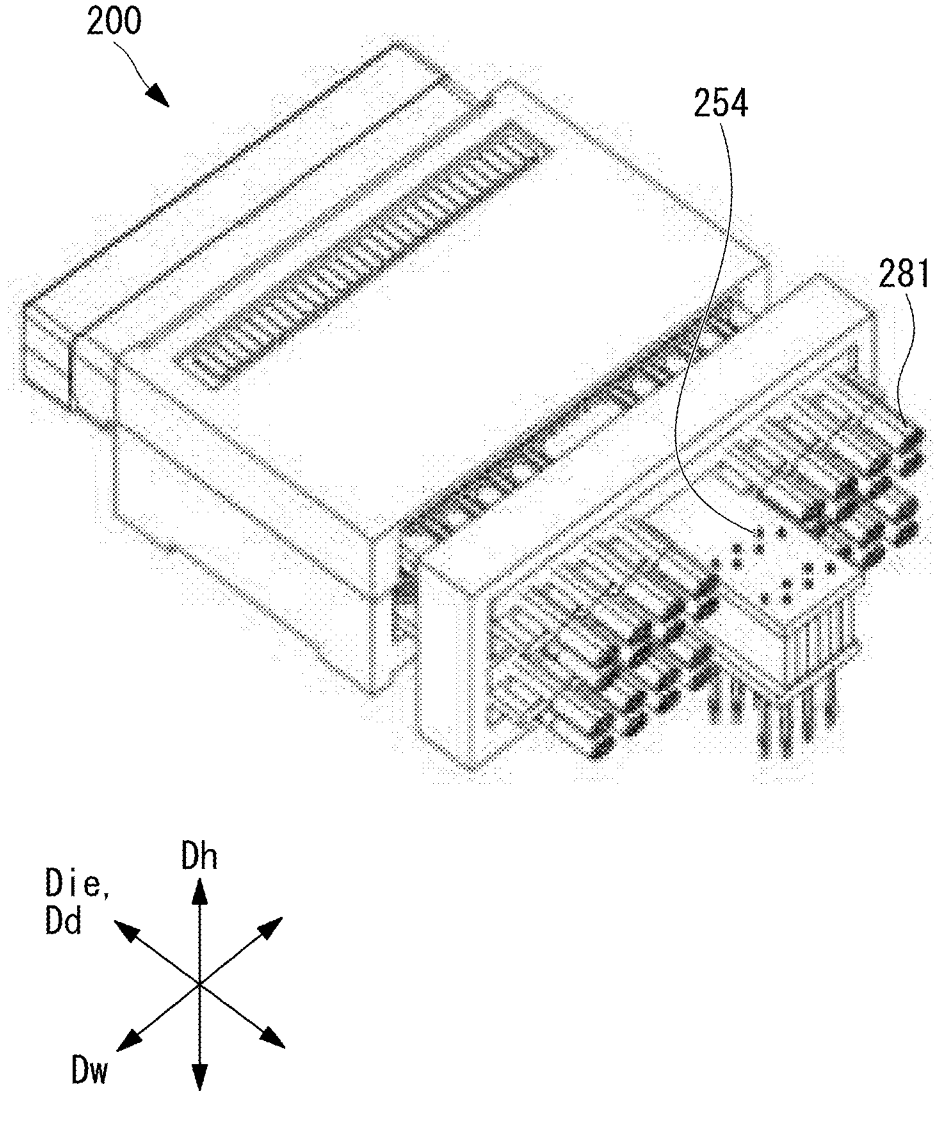
FIG. 38 is a perspective view of the connector assembly according to Modified example 1 of the second embodiment of the present invention when viewed from above.

As illustrated in FIG. 37 and FIG. 38, it is preferable that the first plated through-holes 234 be provided on the rear side from the first-first cable-adapting electrodes 233*a* and the first-second cable-adapting electrodes 233*b* in the depth direction Dd or at approximately the same positions as the first-first cable-adapting electrodes 233*a* and the first-second cable-adapting electrodes 233*b* in the depth direction Dd. In other words, it is preferable that the first-first cable-adapting electrodes 233*a* and the first-second cable-adapting electrodes 233*b* be provided at positions closer to the first-first terminal-adapting electrodes 232*a* and the first-second terminal-adapting electrodes 232*b* than to the first plated through-holes 234 in the depth direction Dd or at approximately the same positions as the first plated through-holes 234 in the depth direction Dd.

Such arrangement of the first plated through-holes 234 can relatively reduce the distance from the first-first terminal-adapting electrodes 232*a* to the first-first cable-adapting electrodes 233*a* and the distance from the first-second terminal-adapting electrodes 232*b* to the first-second cable-adapting electrodes 233*b*. Thus, the length of each of patterns connecting the first-first terminal-adapting electrodes 232*a* and the first-first cable-adapting electrodes 233*a* to each other and the length of each of patterns connecting the first-second terminal-adapting electrodes 232*b* and the first-second cable-adapting electrodes 233*b* to each other can be reduced. Accordingly, since high-speed signal lines can be connected over a short distance, transmission characteristics can be improved.

In addition to the arrangement of the first plated through-holes 234 described above, the second plated through-holes 254 may be provided on the rear side from the second-first cable-adapting electrodes 253*a* and the second-second cable-adapting electrodes 253*b* in the depth direction Dd or at approximately the same position as the second-first cable-adapting electrodes 253*a* and the second-second cable-adapting electrodes 253*b* in the depth direction Dd. In other words, the second-first cable-adapting electrodes 253*a* and the second-second cable-adapting electrodes 253*b* may be provided at positions closer to the second-first terminal-adapting electrodes 252*a* and the second-second terminal-adapting electrodes 252*b* than to the second plated through-holes 254 in the depth direction Dd or at approximately the same position as the second plated through-holes 254 in the depth direction Dd.

The reason for the above is the same as for the first plated through-holes 234.

Further, since the first paddle board 230 and the second paddle board 250 can be reduced in size, the first paddle board 230 and the second paddle board 250 and thus the connector assembly 100 can be reduced in cost.

Further, since the reduction in size of the first paddle board 230 and the second paddle board 250 also enables the reduction in size of the connector assembly 100, this increases the freely available space on the host board 51.

Modified Example 2 of Second Embodiment

As illustrated in FIG. 21, it is preferable that the holes 235 of the first paddle board 230 corresponding to Example 1 and Example 2 of the second connection part 260 be provided at positions more distant from the contact pins 211 than the first press-fit pins 241 in the depth direction Dd. Thus, it is preferable that the holes 235 be provided at positions more distant from the contact pins 211 than the first-first terminal-adapting electrodes 232*a* and the first-second terminal-adapting electrodes 232*b* in the depth direction Dd.

Such arrangement of the holes 235 results in that the hole 235 is not present in the region between the area of the first-first terminal-adapting electrodes 232*a* and the first-second terminal-adapting electrodes 232*b* and the area of the first plated through-holes 234 into which the first press-fit pins 241 are press-fitted. This can improve flexibility in routing of patterns connecting the first-first terminal-adapting electrodes 232*a* and/or the first-second terminal-adapting electrodes 232*b* to the first plated through-holes 234 in the first paddle board 230. If the holes 235 are present in the region of interest, patterns would be required to be formed avoiding the holes 235, which would reduce the flexibility in wiring.

The same applies to the opening 236 of the first paddle board 230 corresponding to Example 3 of the second connection part 260. Thus, it is preferable that the opening 236 be provided at a position more distant from the contact pins 211 than the first press-fit pins 241 in the depth direction Dd.

Further, this modified example can be applied to Modified example 1 of the second embodiment.

LIST OF REFERENCE SYMBOLS

10 receptacle assembly
11 cage
12 slot (space)
13 slot opening
14 fixing pin
21 heat sink
51 host board (external circuit board)
52 plated through-hole
100 connector assembly
110 connector
111 contact pin (external terminal)
111*a* tip part

111*b* base part
112 connector housing
113 clearance
120 relay device
130 paddle board
131 board body
131*a* first face
131*b* second face
132*a* first terminal-adapting electrode
132*b* second terminal-adapting electrode
133*a* first cable-adapting electrode
133*b* second cable-adapting electrode
134 plated through-hole (connection terminal-adapting electrode)
140 connection part
141 press-fit pin (connection terminal)
142 housing
171 first locator
172 second locator
181 cable (external cable)
200 connector assembly
210 connector
211 contact pin (external terminal)
211*a* tip part
211*b* base part
212 connector housing
212*a* first connector housing
212*b* second connector housing
213 clearance (between the first terminal line and the fourth terminal line)
214 clearance (between the second terminal line and the third terminal line)
220 relay device
230 first paddle board (first adapting board)
231 board body
231*a* first-first face
231*b* first-second face
232*a* first-first terminal-adapting electrode
232*b* first-second terminal-adapting electrode
233*a* first-first cable-adapting electrode
233*b* first-second cable-adapting electrode
234 first plated through-hole (first connection terminal-adapting electrode)
235 hole
236 opening
240 first connection part
241 first press-fit pin (first connection terminal)
242 first housing
250 second paddle board (second adapting board)
251 board body
251*a* second-first face
251*b* second-second face
252*a* second-first terminal-adapting electrode
252*b* second-second terminal-adapting electrode
253*a* second-first cable-adapting electrode
253*b* second-second cable-adapting electrode
254 second plated through-hole (second connection terminal-adapting electrode)
260 second connection part
261 second press-fit pin (second connection terminal)
262, 262' second housing
263 third housing
271 locator
281 cable (external cable)

What is claimed is:

1. A relay device configured to electrically connect a plurality of external terminals to a plurality of external cables and an external circuit board, the relay device comprising:

an adapting board; and a connection part, wherein the adapting board is configured to electrically connect some, but not all, of the plurality of external terminals to the plurality of external cables, wherein the connection part includes a plurality of connection terminals, and wherein the plurality of connection terminals is configured to electrically connect the adapting board to the external circuit board.

2. The relay device according to claim 1, wherein the adapting board includes a plurality of first terminal-adapting electrodes, a plurality of second terminal-adapting electrodes, a plurality of first cable-adapting electrodes, and a plurality of second cable-adapting electrodes and a plurality of connection terminal-adapting electrodes, wherein the plurality of first terminal-adapting electrodes are electrodes for the plurality of external terminals to be connected and are provided on a first face of the adapting board, wherein the plurality of second terminal-adapting electrodes are electrodes for the plurality of external terminals to be connected and are provided on a second face of the adapting board, the second face located opposite to the first face, wherein the plurality of first cable-adapting electrodes are electrodes for the plurality of external cables to be connected and are provided on the first face, wherein the plurality of second cable-adapting electrodes are electrodes for the plurality of external cables to be connected and are provided on the second face, wherein the plurality of connection terminal-adapting electrodes are electrodes to which the plurality of connection terminals of the connection part are in connection, wherein some of the plurality of first terminal-adapting electrodes are electrically connected to the plurality of first cable-adapting electrodes via a circuit formed in the adapting board, wherein some of the plurality of second terminal-adapting electrodes are electrically connected to the plurality of second cable-adapting electrodes via the circuit, wherein the plurality of first terminal-adapting electrodes which are not electrically connected to the first cable-adapting electrodes are electrically connected to the plurality of connection terminal-adapting electrodes via the circuit, and wherein the plurality of second terminal-adapting electrodes which are not electrically connected to the second cable-adapting electrodes are electrically connected to the plurality of connection terminal-adapting electrodes via the circuit.

3. The relay device according to claim 2, wherein the plurality of first terminal-adapting electrodes which are electrically connected to the connection terminal-adapting electrodes are electrodes for signals other than high-speed signals input from the plurality of external terminals, and/or wherein the plurality of second terminal-adapting electrodes which are electrically connected to the connection terminal-adapting electrodes are electrodes for signals other than high-speed signals input from the plurality of external terminals.

4. The relay device according to claim 2, wherein the plurality of first terminal-adapting electrodes and the plurality of second terminal-adapting electrodes are aligned along a first direction, and
wherein the plurality of connection terminal-adapting electrodes are arranged at a center portion in the first direction.

5. The relay device according to claim 2, wherein the plurality of first terminal-adapting electrodes are aligned along a first direction on the first face,
wherein the plurality of first cable-adapting electrodes are aligned, on the first face, along the first direction and apart from the plurality of first terminal-adapting electrodes in a second direction orthogonal to the first direction,
wherein the plurality of second terminal-adapting electrodes are aligned on the opposite side to the plurality of first terminal-adapting electrodes,
wherein the plurality of second cable-adapting electrodes are aligned on the opposite side to the plurality of first cable-adapting electrodes, and
wherein the plurality of first cable-adapting electrodes and the plurality of second cable-adapting electrodes are provided, in the second direction, at positions closer to the plurality of first terminal-adapting electrodes and the plurality of second terminal-adapting electrodes than to the connection terminal-adapting electrodes or at approximately the same positions as the plurality of connection terminal-adapting electrodes.

6. A connector assembly comprising:
the relay device according to claim 1;
a connector including the plurality of external terminals connected to the relay device and a housing that houses the plurality of external terminals; and
the plurality of external cables connected to the relay device.

7. A relay device configured to electrically connect a plurality of external terminals to a plurality of external cables and an external circuit board, the relay device comprising:
a first adapting board;
a second adapting board;
a first connection part; and
a second connection part, wherein the first adapting board is configured to electrically connect some of the plurality of external terminals to the plurality of external cables,
wherein the second adapting board is configured to electrically connect some of the plurality of external terminals to the plurality of external cables,
wherein the first connection part includes a plurality of first connection terminals,
wherein the plurality of first connection terminals is configured to electrically connect the first adapting board to the external circuit board,
wherein the second connection part includes a plurality of second connection terminals, and
wherein the plurality of second connection terminals is configured to electrically connect the second adapting board to the external circuit board.

8. The relay device according to claim 7,
wherein the first connection part includes a first housing,
wherein the first housing houses the plurality of first connection terminals,
wherein the second connection part includes a second housing, and
wherein the second housing houses the plurality of second connection terminals.

9. The relay device according to claim 8, wherein the first connection terminals are press-fit pins, respectively, each of the press-fit pins extending from the first adapting board toward the external circuit board, and
wherein the second connection terminals are press-fit pins, respectively, each of the press-fit pins extending from the second adapting board toward the external circuit board.

10. The relay device according to claim 9, wherein the first adapting board is arranged on the external circuit board,
wherein the second adapting board is arranged on the first adapting board,
wherein the first adapting board is provided with a plurality of holes through which the plurality of press-fit pins as the plurality of second connection terminals are individually inserted, and
wherein the second housing is arranged between the first adapting board and the second adapting board and houses portions of the press-fit pins as the second connection terminals, the portions being present between the first adapting board and the second adapting board.

11. The relay device according to claim 10, wherein the second connection part includes a third housing, and
wherein the third housing is arranged between the external circuit board and the first adapting board and houses portions of the press-fit pins as the second connection terminals, the portions being present between the external circuit board and the first adapting board.

12. The relay device according to claim 9, wherein the first adapting board is arranged on the external circuit board,
wherein the second adapting board is arranged on the first adapting board,
wherein the first adapting board is provided with an opening through which the second housing is inserted, and
wherein the second housing is arranged between the external circuit board and the second adapting board and houses the press-fit pins as the second connection terminals present between the external circuit board and the second adapting board.

13. The relay device according to claim 10, wherein the plurality of holes are arranged at positions farther from the plurality of external terminals than the press-fit pins as the plurality of first connection terminals.

14. The relay device according to claim 12, wherein the opening is arranged at a position farther from the plurality of external terminals than the press-fit pins as the plurality of first connection terminals.

15. The relay device according to claim 7, wherein the first adapting board includes a plurality of first-first terminal-adapting electrodes, a plurality of first-second terminal-adapting electrodes, a plurality of first-first cable-adapting electrodes, and a plurality of first-second cable-adapting electrodes and a plurality of first connection terminal-adapting electrodes,
wherein the second adapting board includes a plurality of second-first terminal-adapting electrodes, a plurality of second-second terminal-adapting electrodes, a plurality of second-first cable-adapting electrodes, and a plurality of second-second cable-adapting electrodes and a plurality of second connection terminal-adapting electrodes,
wherein the plurality of first-first terminal-adapting electrodes are electrodes for the plurality of external terminals to be connected and are provided on a first-first face of the first adapting board, wherein the plurality of first-second terminal-adapting electrodes are electrodes for the plurality of external terminals to be connected and are provided on a first-second face of the first adapting board, the first-second face being located opposite to the first-first face, wherein the plurality of first-first cable-adapting electrodes are electrodes for the plurality of external cables to be connected and are provided on the first-first face, wherein the plurality of first-second cable-adapting electrodes are electrodes for the plurality of external cables to be connected and are provided on the first-second face, wherein the plurality of first connection terminal-adapting electrodes are electrodes to which the plurality of first connection terminals of the first connection part are in connection, wherein the plurality of second-first terminal-adapting electrodes are electrodes for the plurality of external terminals to be connected and are provided on a second-first face of the second adapting board, wherein the plurality of second-second terminal-adapting electrodes are electrodes for the plurality of external terminals to be connected and are provided on a second-second face of the second adapting board, the second-second face being located opposite to the second-first face, wherein the plurality of second-first cable-adapting electrodes are electrodes for the plurality of external cables to be connected and are provided on the second-first face, wherein the plurality of second-second cable-adapting electrodes are electrodes for the plurality of external cables to be connected and are provided on the second-second face, wherein the plurality of second connection terminal-adapting electrodes are electrodes to which the plurality of second connection terminals of the second connection part are in connection, wherein some of the plurality of first-first terminal-adapting electrodes are connected to the plurality of first-first cable-adapting electrodes via a first circuit formed in the first adapting board, wherein some of the plurality of first-second terminal-adapting electrodes are connected to the plurality of first-second cable-adapting electrodes via the first circuit, wherein the plurality of first-first terminal-adapting electrodes which are not connected to the first-first cable-adapting electrodes are connected to the plurality of first connection terminal-adapting electrodes via the first circuit, wherein the plurality of first-second terminal-adapting electrodes which are not connected to the first-second cable-adapting electrodes are connected to the plurality of first connection terminal-adapting electrodes via the first circuit, wherein some of the plurality of second-first terminal-adapting electrodes are connected to the plurality of second-first cable-adapting electrodes via a second circuit formed in the second adapting board, wherein some of the plurality of second-second terminal-adapting electrodes are connected to the plurality of second-second cable-adapting electrodes via the second circuit, wherein the plurality of second-first terminal-adapting electrodes which are not connected to the second-first cable-adapting electrodes are connected to the plurality of second connection terminal-adapting electrodes via the second circuit, and wherein the plurality of second-second terminal-adapting electrodes which are not connected to the second-second cable-adapting electrodes are connected to the plurality of second connection terminal-adapting electrodes via the second circuit.

16. The relay device according to claim 15, wherein the plurality of first-first terminal-adapting electrodes are aligned along a first direction on the first-first face, wherein the plurality of first-first cable-adapting electrodes are aligned, on the first-first face, along the first direction and apart from the plurality of first-first terminal-adapting electrodes in a second direction orthogonal to the first direction, wherein the plurality of first-second terminal-adapting electrodes are aligned on the opposite side to the first-first terminal-adapting electrodes, wherein the plurality of first-second cable-adapting electrodes are aligned on the opposite side to the first-first cable-adapting electrodes, wherein the plurality of first-first cable-adapting electrodes and the plurality of first-second cable-adapting electrodes are provided, in the second direction, at positions closer to the plurality of first-first terminal-adapting electrodes and the plurality of first-second terminal-adapting electrodes than to the first connection terminal-adapting electrodes or at approximately the same positions as the plurality of first connection terminal-adapting electrodes, wherein the plurality of second-first terminal-adapting electrodes are aligned along the first direction on the second-first face, wherein the plurality of second-first cable-adapting electrodes are aligned, on the second-first face, along the first direction and apart from the plurality of second-first terminal-adapting electrodes in the second direction, wherein the plurality of second-second terminal-adapting electrodes are aligned on the opposite side to the plurality of second-first terminal-adapting electrodes, wherein the plurality of second-second cable-adapting electrodes are aligned on the opposite side to the plurality of second-first cable-adapting electrodes, and wherein the plurality of second-first cable-adapting electrodes and the plurality of second-second cable-adapting electrodes are provided, in the second direction, at positions closer to the plurality of second-first terminal-adapting electrodes and the plurality of second-second terminal-adapting electrodes than to the second connection terminal-adapting electrodes or at approximately the same positions as the plurality of second connection terminal-adapting electrodes.

17. A connector assembly comprising:

the relay device according to claim 7;

a connector including the plurality of external terminals connected to the relay device and a housing that houses the plurality of external terminals; and the plurality of external cables connected to the relay device.

18. A connector assembly electrically connected to a plurality of external cables, the connector assembly comprising:

a first adapting board;

a second adapting board; and a connector including a plurality of terminals and a housing that houses the plurality of terminals, wherein the plurality of terminals are connected to the first adapting board or the second adapting board, wherein the first adapting board electrically connects some of the plurality of terminals to the plurality of external cables, wherein the second adapting board electrically connects some of the plurality of terminals to the plurality of external cables, wherein the plurality of terminals form a first terminal line on which some of the plurality of terminals are aligned, a second terminal line on which some of the plurality of terminals are aligned, a third terminal line on which some of the plurality of terminals are aligned, and a fourth terminal line on which some of the plurality of terminals are aligned, wherein the first adapting board and the second adapting board are arranged substantially parallel to each other, wherein the first terminal line is connected to a first-first face of the first adapting board, wherein the second terminal line is connected to a first-second face of the first adapting board, the first-second face being located opposite to the first-first face, wherein the third terminal line is connected to a second-first face of the second adapting board, and wherein the fourth terminal line is connected to a second-second face of the second adapting board, the second-second face being located opposite to the second-first face.

* * * * *